(12) United States Patent
DeMartino et al.

(10) Patent No.: US 10,640,415 B2
(45) Date of Patent: May 5, 2020

(54) LITHIUM CONTAINING ALUMINOSILICATE GLASSES

(71) Applicant: CORNING INCORPORATED, Corning, NY (US)

(72) Inventors: Steven Edward DeMartino, Painted Post, NY (US); Nadja Teresia Lönnroth, Corning, NY (US); Lina Ma, Corning, NY (US); Robert Anthony Schaut, Painted Post, NY (US); Charlene Marie Smith, Corning, NY (US); Zhongzhi Tang, Painted Post, NY (US); Jamie Todd Westbrook, Sayre, PA (US)

(73) Assignee: CORNING INCORPORATED, Corning, NY (US)

(*) Notice: Subject to any disclaimer, the term of this patent is extended or adjusted under 35 U.S.C. 154(b) by 142 days.

(21) Appl. No.: 15/825,793

(22) Filed: Nov. 29, 2017

(65) Prior Publication Data

US 2018/0147114 A1 May 31, 2018

Related U.S. Application Data

(60) Provisional application No. 62/428,311, filed on Nov. 30, 2016.

(51) Int. Cl.
| | | |
|---|---|---|
| *C03C 3/087* | (2006.01) | |
| *A61J 1/00* | (2006.01) | |
| *C03C 21/00* | (2006.01) | |
| *C03C 3/076* | (2006.01) | |
| *C03C 3/078* | (2006.01) | |
| *C03C 3/083* | (2006.01) | |
| *C03C 4/20* | (2006.01) | |
| *C03C 14/00* | (2006.01) | |

(52) U.S. Cl.
CPC ............. *C03C 3/087* (2013.01); *A61J 1/00* (2013.01); *C03C 3/076* (2013.01); *C03C 3/078* (2013.01); *C03C 3/083* (2013.01); *C03C 4/20* (2013.01); *C03C 14/008* (2013.01); *C03C 21/002* (2013.01)

(58) Field of Classification Search
CPC ....... C03C 3/087; C03C 21/00; C03C 21/002; A61J 1/00
See application file for complete search history.

(56) References Cited

U.S. PATENT DOCUMENTS

| | | |
|---|---|---|
| 8,753,994 B2 | 6/2014 | Danielson et al. |
| 9,340,447 B2 | 5/2016 | Danielson et al. |
| 2013/0101853 A1 | 4/2013 | Drake et al. |
| 2015/0157533 A1 | 6/2015 | Demartino et al. |
| 2015/0246846 A1 | 9/2015 | Choju et al. |
| 2016/0095796 A1 | 4/2016 | Weeks et al. |
| 2016/0107924 A1 | 4/2016 | Yamamoto et al. |

FOREIGN PATENT DOCUMENTS

| | | | |
|---|---|---|---|
| WO | 2014196655 A1 | 12/2014 | |
| WO | WO-2014196655 A1 * | 12/2014 | ............. C03C 3/087 |

OTHER PUBLICATIONS

Day, Delbert E., "Mixed alkali glasses-their properties and uses", Journal of Non-Crystalline Solids 21, No. 3 (1976): pp. 343-372.
Jantzen, C.M., "Systems approach to nuclear waste glass development", Journal of Non-Crystalline Solids 84, No. 1 (1986): pp. 215-225.
Extended European Search Report and Opinion dated May 3, 2018, for EP Patent Application No. 17204496.8. pp. 1-6.

* cited by examiner

*Primary Examiner* — Elizabeth A. Bolden
(74) *Attorney, Agent, or Firm* — Dinsmore & Shohl LLP

(57) ABSTRACT

A glass pharmaceutical package having a glass composition of 68.00 mol % to 81.00 mol % $SiO_2$, from 4.00 mol % to 11.00 mol % $Al_2O_3$, from 0.10 mol % to 16.00 mol % $Li_2O$, from 0.10 mol % to 12.00 mol % $Na_2O$, from 0.00 mol % to 5.00 mol % $K_2O$, from 0.10 mol % to 8.00 mol % MgO, from 0.10 mol % to 5.00 mol % CaO, from 0.00 mol % to 0.20 mol % fining agent. The glass pharmaceutical package is delamination resistant, and has class 1 or class 2 chemical durability in acid, base, and water. The glass pharmaceutical package may be substantially free of $B_2O_3$, SrO, BaO, and $ZrO_2$.

58 Claims, 19 Drawing Sheets

US 10,640,415 B2

LITHIUM CONTAINING ALUMINOSILICATE GLASSES

CROSS REFERENCE TO RELATED APPLICATIONS

This application claims priority of U.S. Provisional Application No. 62/428,311 filed on Nov. 30, 2016, which is incorporated herein by reference in its entirety.

BACKGROUND

Field

The present specification generally relates to lithium containing aluminosilicate glasses. More specifically, the present specification is directed to lithium containing aluminosilicate glasses that are strengthened to have an evenly distributed compressive stress profile.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical compositions contained therein. Glasses having suitable chemical durability include those glass compositions within the ASTM standard E438.92 'Type IA' and 'Type IB' glass compositions or glass compositions within the USP <660> Type 1 compositions, which have a proven history of chemical durability. Many aluminosilicate glasses meet the criteria for chemical durability described above. In addition, these aluminosilicate glasses may have relatively greater glass transition temperatures and elastic modulus when compared to conventional borosilicate and soda-lime silicate glasses. Some aluminosilicate glasses may be strengthened, such as by an ion exchange process, to increase the damage resistance of the glass. However, even strengthened glass can be damaged, particularly by acute or sharp impact. In instances where the glass is strengthened, localized variations in the strengthened layer can be formed that cause the glass to fracture or crack in unpredictable and numerous ways.

Accordingly, a need exists for aluminosilicate glasses that can be strengthened, such as by ion exchange, in a controlled manner such that the mechanical properties of the strengthened glass are controlled.

SUMMARY

According to an embodiment, a glass pharmaceutical package has a glass composition comprising: from greater than or equal to 68.00 mol % to less than or equal to 81.00 mol % $SiO_2$; from greater than or equal to 4.00 mol % to less than or equal to 11.00 mol % $Al_2O_3$; from greater than or equal to 0.10 mol % to less than or equal to 16.00 mol % $Li_2O$; from greater than or equal to 0.10 mol % to less than or equal to 12.00 mol % $Na_2O$; from greater than or equal to 0.00 mol % to less than or equal to 5.00 mol % $K_2O$; from greater than or equal to 0.10 mol % to less than or equal to 8.00 mol % MgO; from greater than or equal to 0.10 mol % to less than or equal to 5.00 mol % CaO; from greater than or equal to 0.00 mol % to less than or equal to 0.20 mol % fining agent. The glass pharmaceutical package is delamination resistant, and has class 1 or class 2 chemical durability in acid, base, and water.

In another embodiment, a glass pharmaceutical package has a glass composition comprising: from greater than or equal to 68.00 mol % to less than or equal to 81.00 mol % $SiO_2$; from greater than or equal to 6.10 mol % to less than or equal to 7.00 mol % $Al_2O_3$; from greater than or equal to 3.10 mol % to less than or equal to 4.60 mol % $Li_2O$; from greater than or equal to 1.40 mol % to less than or equal to 3.00 mol % $Na_2O$; from greater than or equal to 0.00 mol % to less than or equal to 5.00 mol % $K_2O$; from greater than or equal to 5.10 mol % to less than or equal to 7.50 mol % MgO; from greater than or equal to 0.10 mol % to less than or equal to 5.00 mol % CaO; from greater than or equal to 0.00 mol % to less than or equal to 0.20 mol % fining agent. The glass pharmaceutical package is delamination resistant, the glass pharmaceutical package has class 1 or class 2 chemical durability in acid, base, and water, and the glass pharmaceutical package is substantially free of $B_2O_3$, SrO, BaO, and $ZrO_2$.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
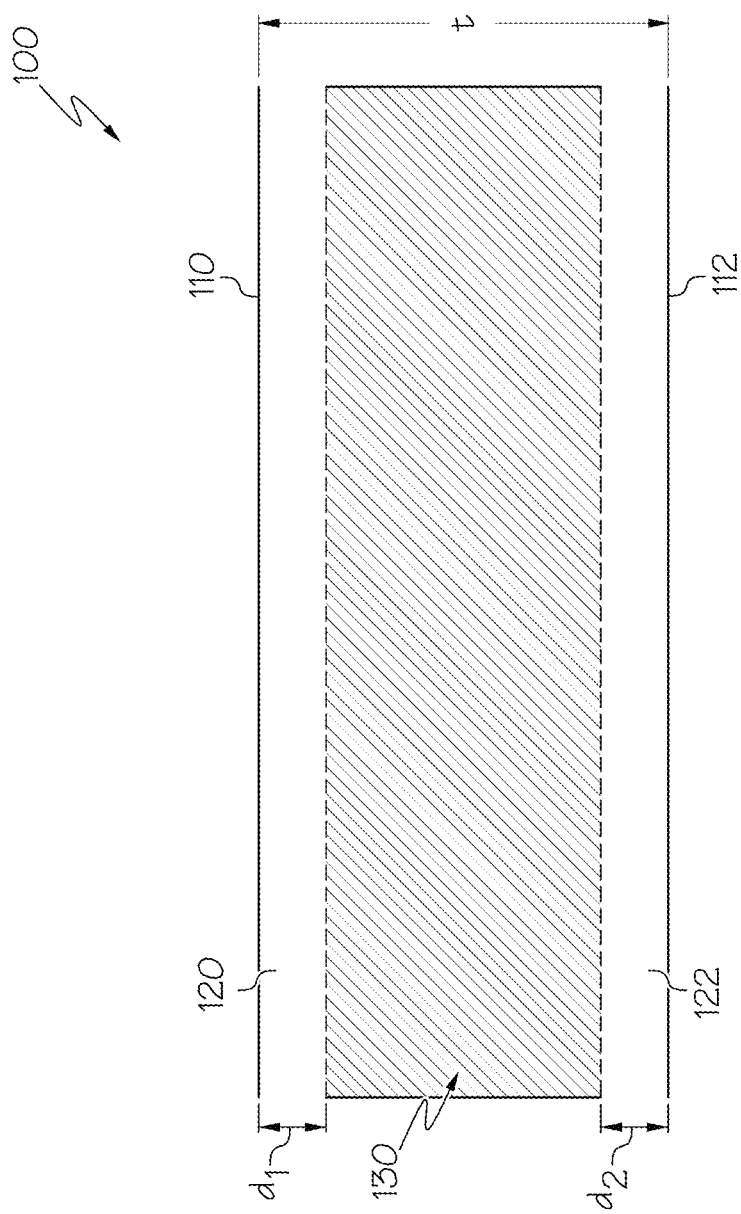
FIG. 1 schematically depicts a cross section of a glass having compressive stress layers on surfaces thereof according to embodiments disclosed and described herein.

Reference will now be made in detail to lithium containing aluminosilicate glasses according to various embodiments. The chemical durability and physical properties of aluminosilicate glasses generally may be related to the glass composition and structure. According to some embodiments, a glass pharmaceutical package has a glass composition comprising: from greater than or equal to 68.00 mol % to less than or equal to 81.00 mol % $SiO_2$; from greater than or equal to 4.00 mol % to less than or equal to 11.00 mol % $Al_2O_3$; from greater than or equal to 0.10 mol % to less than or equal to 16.00 mol % $Li_2O$; from greater than or equal to 0.10 mol % to less than or equal to 12.00 mol % $Na_2O$; from greater than or equal to 0.00 mol % to less than or equal to 5.00 mol % $K_2O$; from greater than or equal to 0.10 mol % to less than or equal to 8.00 mol % MgO; from greater than or equal to 0.10 mol % to less than or equal to 5.00 mol % CaO; from greater than or equal to 0.00 mol % to less than or equal to 0.20 mol % fining agent. The glass pharmaceutical package is delamination resistant, and has class 1 or class 2 chemical durability in acid, base, and water. In some embodiments, the glass pharmaceutical package may be substantially free of $B_2O_3$, SrO, BaO, and $ZrO_2$.

In the embodiments of the glass containers described herein, the concentration of constituent components (e.g., $SiO_2$, $Al_2O_3$, $B_2O_3$ and the like) of the glass composition from which the glass containers are formed are specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol. %.

The term "chemical durability," as used herein, refers to the ability of the glass composition to resist degradation upon exposure to specified chemical conditions. Specifically, the chemical durability of the glass compositions described herein was assessed according to 4 established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." Each standard and the classifications within each standard are described in further detail herein. Alternatively, the chemical durability of a glass composition may be assessed according to USP <660> entitled "Surface Glass Test," and or European Pharmacopeia 3.2.1 Test A-surface test, entitled "Glass Containers For Pharmaceutical Use" which assess the durability of the surface of the glass.

The term "softening point," as used herein, refers to the temperature at which the viscosity of the glass composition is $1×10^{7.6}$ poise.

The term "annealing point," as used herein, refers to the temperature at which the viscosity of the glass composition is $1×10^{13}$ poise.

The terms "strain point" and "$T_{strain}$" as used herein, refers to the temperature at which the viscosity of the glass composition is $3×10^{14}$ poise.

The term "CTE," as used herein, refers to the coefficient of thermal expansion of the glass composition over a temperature range from about room temperature (RT) to about 300° C.

The presence of various aluminum coordination states contributes to the physical properties of alkali aluminosilicate glasses by affecting the ratio between bridging oxygen and non-bridging oxygen in the glass network. The alkali species in the glass affect the initial leaching behavior and interdiffusion reactions during glass dissolution. The formation of gel or hydrated layer and precipitation on the glass surface during dissolution also generally relates to the glass composition. As used herein, the term "glass composition" refers to the glass composition of a glass article, such as, for example, glass packaging for pharmaceuticals (e.g., a vial, a syringe, and ampoule, etc.)

In addition, alkali aluminosilicate glasses have good ion exchange ability, and chemical strengthening processes have been used to achieve high strength and high toughness properties in alkali aluminosilicate glasses. For example, sodium aluminosilicate glasses are highly ion exchangeable glasses with high glass formability and quality. The substitution of $Al_2O_3$ into the silicate glass network increases the interdiffusivity of monovalent cations during ion exchange. By chemical strengthening in a molten salt bath (e.g., $KNO_3$ and/or $NaNO_3$), glasses with high strength, high toughness, and high indentation cracking resistance can be achieved.

Therefore, alkali aluminosilicate glasses with good physical properties, chemical durability, and ion exchange ability have drawn attention for pharmaceutical packaging. Embodiments disclosed and described herein include Li-containing aluminosilicate glasses, which have lower annealing and softening temperatures, lower coefficient of thermal expansion (CTE) values, and fast ion exchange ability. Through different ion exchange processes (e.g., two-step ion exchange or using one or more mixed salt bath(s)), greater central tension (CT), deeper depth of layer penetration by potassium ($DOL_k$), depth of compression (DOC), and CT values that provide favorable breakage patterns can be achieved. However, some aluminosilicate glass compositions with high $Li_2O$ contents tend to crystallize during the reheating and reforming process, and Li cations are much more extractable than Na cations, K cations, and alkaline cations during glass dissolution. So, the composition range of Li-containing aluminosilicate glasses according to some embodiments may be limited due to the requirement for acceptable Li cation leached into solution, such as pharmaceutical solutions.

The benefits of adding $Li_2O$ on the physical properties of the glass, the chemical durability of the glass, and ion exchange ability are described herein. The addition of $Li_2O$ into aluminosilicate glasses decreases the softening temperature, decreases the tube drawing and reforming temperatures, and increases the hydrolytic chemical durability. With adding a relatively small amount of $Li_2O$ (e.g., from greater than or equal to 2.00 mol % to less than or equal to 4.00 mol %) into aluminosilicate glasses, the hydrolytic chemical durability is greatly improved (e.g., from about 56 to about 54 by ISO 720 as compared to 68 in lithium-free glass) before ion exchange. Another benefit of adding $Li_2O$ is the improvement of ion exchange ability. For instance, stress profile, CT, surface CS, DOC, and $DOL_k$ could be varied to a much larger degree after ion exchange than in alkali aluminosilicate glasses containing $Na_2O$. For $Li_2O$ containing glasses, a greater CT can be achieved in shorter times compared to lithium-free glasses, and the ion exchange process can be made in several steps or by various conditions, so the stress profile can be tailored easily to suit different applications for various products.

Described herein are Li containing aluminosilicate glass compositions according to embodiments, physical properties of Li containing aluminosilicate glass compositions according to embodiments, ion exchange ability benefits of Li containing aluminosilicate glass compositions according to embodiments, and dissolution kinetics of Li containing aluminosilicate glass compositions according to embodiments before and after ion exchange.

In embodiments of glass compositions described herein, the amount of constituent components (e.g., $SiO_2$, $Al_2O_3$, $Li_2O$, and the like) are given in mole percent (mol %) on an oxide basis, unless otherwise specified. Components of the Li containing aluminosilicate glass composition according to embodiments are discussed individually below. It should be understood that any of the variously recited ranges of one component may be combined with the any of the variously recited ranges for any other component in a single glass composition.

In an exemplary Li containing aluminosilicate glass composition, $SiO_2$ is the largest constituent and, as such, $SiO_2$ is the primary constituent of the glass network formed from the glass composition. Pure $SiO_2$ has a relatively low CTE and is alkali free. However, pure $SiO_2$ has an extremely high melting point. Accordingly, if the amount of $SiO_2$ in the glass composition is too high, the formability of the glass composition may be diminished as higher amounts of $SiO_2$ increase the difficulty of melting the glass, which, in turn, adversely impacts the formability of the glass. In embodiments, the glass composition generally comprises $SiO_2$ in an amount from greater than or equal to 68.00% to less than or equal to 81.00 mol %. In some embodiments, the glass composition comprises $SiO_2$ in amounts greater than or equal to 70.00 mol %, greater than or equal to 72.00 mol %, greater than or equal to 74.00 mol %, greater than or equal to 76.00 mol %, or greater than or equal to 78.00 mol %. In some embodiments, the glass composition comprises $SiO_2$ in amounts less than or equal to 80.00 mol %, less than or equal to 78.00 mol %, less than or equal to 76.00 mol %, less than or equal to 74.00 mol %, or less than or equal to 72.00 mol %. In other embodiments, the glass composition comprises $SiO_2$ in an amount from greater than or equal to 70.00 mol % to less than or equal to 80.00 mol %, such as from greater than or equal to 72.00 mol % to less than or equal to 78.00 mol %, or from greater than or equal to 74.00 mol % to less than or equal to 76.00 mol %. In yet other embodiments, the glass composition comprises $SiO_2$ in an amount from greater than or equal to 74.00 mol % to less than or equal to 79.00 mol %.

The glass composition of embodiments may further comprise $Al_2O_3$. $Al_2O_3$ may also serve as a glass network former, similar to $SiO_2$. $Al_2O_3$ may increase the viscosity of the glass composition due to its tetrahedral coordination in a glass melt formed from a properly designed glass composition, decreasing the formability of the glass composition when the amount of $Al_2O_3$ is too high. However, when the amount of $Al_2O_3$ is balanced against the amount of $SiO_2$ and the amount of alkali oxides in the glass composition, $Al_2O_3$ can reduce the liquidus temperature of the glass melt, thereby enhancing the liquidus viscosity and improving the compatibility of the glass composition with certain forming processes, such as molding processes. In embodiments, the glass composition generally comprises $Al_2O_3$ in an amount from greater than or equal to 4.00 mol % to less than or equal to 11.00 mol %. In some embodiments, the glass composition comprises $Al_2O_3$ in amounts greater than or equal to 5.00 mol %, greater than or equal to 6.00 mol %, greater than or equal to 7.00 mol %, greater than or equal to 8.00 mol %, greater than or equal to 9.00 mol %, or greater than or equal to 10.00 mol %. In some embodiments, the glass composition comprises $Al_2O_3$ in amounts less than or equal to 10.00 mol %, less than or equal to 9.00 mol %, less than or equal to 8.00 mol %, less than or equal to 7.00 mol %, less than or equal to 6.00 mol %, or less than or equal to 5.00 mol %. In other embodiments, the glass composition comprises $Al_2O_3$ in an amount from greater than or equal to 5.00 mol % to less than or equal to 10.00 mol %, such as from greater than or equal to 6.00 mol % to less than or equal to 9.00 mol %, or from greater than or equal to 7.00 mol % to less than or equal to 8.00 mol %. In yet other embodiments, the glass composition comprises $Al_2O_3$ in an amount from greater than or equal to 5.00 mol % to less than or equal to 11.00 mol %.

The effects of $Li_2O$ in the glass composition are discussed above and discussed in further detail below. In embodiments, the glass composition generally comprises $Li_2O$ in an amount from greater than or equal to 0.10 mol % to less than or equal to 16.00 mol %. In some embodiments, the glass composition comprises $Li_2O$ in amounts greater than or equal to 0.50 mol %, greater than or equal to 1.00 mol %, greater than or equal to 1.50 mol %, greater than or equal to 2.00 mol %, greater than or equal to 2.50 mol %, greater than or equal to 3.00 mol %, greater than or equal to 3.50 mol %, greater than or equal to 4.00 mol %, greater than or equal to 4.50 mol %, greater than or equal to 5.00 mol %, greater than or equal to 5.50 mol %, greater than or equal to 6.00 mol %, greater than or equal to 6.50 mol %, greater than or equal to 7.00 mol %, greater than or equal to 7.50 mol %, greater than or equal to 8.00 mol %, greater than or equal to 8.50 mol %, greater than or equal to 9.00 mol %, greater than or equal to 9.50 mol %, greater than or equal to 10.00 mol %, greater than or equal to 10.50 mol %, greater than or equal to 11.00 mol %, greater than or equal to 11.50 mol %, greater than or equal to 12.00 mol %, greater than or equal to 12.50 mol %, greater than or equal to 13.00 mol %, greater than or equal to 13.50 mol %, greater than or equal to 14.00 mol %, greater than or equal to 14.50 mol %, greater than or equal to 15.00 mol %, or greater than or equal to 15.50 mol %. In some embodiments, the glass composition comprises $Li_2O$ in amounts less than or equal to 0.50 mol %, less than or equal to 1.00 mol %, less than or equal to 1.50 mol %, less than or equal to 2.00 mol %, less than or equal to 2.50 mol %, less than or equal to 3.00 mol %, less than or equal to 3.50 mol %, less than or equal to 4.00 mol %, less than or equal to 4.50 mol %, less than or equal to 5.00 mol %, less than or equal to 5.50 mol %, less than or equal to 6.00 mol %, less than or equal to 6.50 mol %, less than or equal to 7.00 mol %, less than or equal to 7.50 mol %, less than or equal to 8.00 mol %, less than or equal to 8.50 mol %, less than or equal to 9.00 mol %, less than or equal to 9.50 mol %, less than or equal to 10.00 mol %, less than or equal to 10.50 mol %, less than or equal to 11.00 mol %, less than or equal to 11.50 mol %, less than or equal to 12.00 mol %, less than or equal to 12.50 mol %, less than or equal to 13.00 mol %, less than or equal to 13.50 mol %, less than or equal to 14.00 mol %, less than or equal to 14.50 mol %, less than or equal to 15.00 mol %, or less than or equal to 15.50 mol %. In other embodiments, the glass composition comprises $Li_2O$ in an amount from greater than or equal to 0.50 mol % to less than or equal to 15.50 mol %, such as from greater than or equal to 1.00 mol % to less than or equal to 15.00 mol %, from greater than or equal to 1.50 mol % to less than or equal to 14.50 mol %, from greater than or equal to 2.00 mol % to less than or equal to 14.00 mol %, from greater than or equal to 2.50 mol % to less than or equal to 13.50 mol %, from greater than or equal to 3.00 mol % to less than or equal to 13.00 mol %, from greater than or equal to 3.50 mol % to less than or equal to 12.50 mol %, from greater than or equal to 4.00 mol % to less than or equal to 12.00 mol %, from greater than or equal to 4.50 mol % to less than or equal to 11.50 mol %, from greater than or equal to 5.00 mol % to less than or equal to 11.00 mol %, from greater than or equal to 5.50 mol % to less than or equal to 10.50 mol %, from greater than or equal to 6.00 mol % to less than or equal to 10.00 mol %, from greater than or equal to 6.50 mol % to less than or equal to 9.50 mol %, from greater than or equal to 7.00 mol % to less than or equal to 9.00 mol %, or from greater than or equal to 7.50 mol % to less than or equal to 8.50 mol %. In yet other embodiments, the glass composition comprises $Li_2O$ in an amount from greater than or equal to 0.10 mol % to less than or equal to 14.00 mol %.

According to embodiments, the glass composition may also comprise alkali metal oxides other than $Li_2O$, such as, for example, $Na_2O$ and $K_2O$. $Na_2O$ aids in the ion exchange ability of the glass composition, increases the melting point of the glass composition, and improves formability of the glass composition. However, if too much $Na_2O$ is added to the glass composition, the CTE may be too high, and the melting point may be too high. In embodiments, the glass composition generally comprises $Na_2O$ in an amount from greater than or equal to 0.10 mol % to less than or equal to 12.00 mol %. In some embodiments, the glass composition comprises $Na_2O$ in amounts greater than or equal to 0.50 mol %, greater than or equal to 1.00 mol %, greater than or equal to 1.50 mol %, greater than or equal to 2.00 mol %, greater than or equal to 2.50 mol %, greater than or equal to 3.00 mol %, greater than or equal to 3.50 mol %, greater than or equal to 4.00 mol %, greater than or equal to 4.50 mol %, greater than or equal to 5.00 mol %, greater than or equal to 5.50 mol %, greater than or equal to 6.00 mol %, greater than or equal to 6.50 mol %, greater than or equal to 7.00 mol %, greater than or equal to 7.50 mol %, greater than or equal to 8.00 mol %, greater than or equal to 8.50 mol %, greater than or equal to 9.00 mol %, greater than or equal to 9.50 mol %, greater than or equal to 10.00 mol %, greater than or equal to 10.50 mol %, greater than or equal to 11.00 mol %, or greater than or equal to 11.50 mol %. In some embodiments, the glass composition comprises $Na_2O$ in amounts less than or equal to 0.50 mol %, less than or equal to 1.00 mol %, less than or to 1.50 mol %, less than or equal to 2.00 mol %, less than or equal to 2.50 mol %, less than or equal to 3.00 mol %, less than or equal to 3.50 mol %, less than or equal to 4.00 mol %, less than or equal to 4.50 mol %, less than or equal to 5.00 mol %, less than or equal to 5.50 mol %, less than or equal to 6.00 mol %, less than or equal to 6.50 mol %, less than or equal to 7.00 mol %, less than or equal to 7.50 mol %, less than or equal to 8.00 mol %, less than or equal to 8.50 mol %, less than or equal to 9.00 mol %, less than or equal to 9.50 mol %, less than or equal to 10.00 mol %, less than or equal to 10.50 mol %, less than or equal to 11.00 mol %, or less than or equal to 11.50 mol %. In other embodiments, the glass composition comprises $Na_2O$ in an amount from greater than or equal to 0.50 mol % to less than or equal to 11.50 mol %, such as from greater than or equal to 1.00 mol % to less than or equal to 11.00 mol %, from greater than or equal to 1.50 mol % to less than or equal to 10.50 mol %, from greater than or equal to 2.00 mol % to less than or equal to 10.00 mol %, from greater than or equal to 2.50 mol % to less than or equal to 9.50 mol %, from greater than or equal to 3.00 mol % to less than or equal to 9.00 mol %, from greater than or equal to 3.50 mol % to less than or equal to 8.50 mol %, from greater than or equal to 4.00 mol % to less than or equal to 7.00 mol %, from greater than or equal to 4.50 mol % to less than or equal to 6.50 mol %, or from greater than or equal to 5.00 mol % to less than or equal to 6.00 mol %. In yet other embodiments, the glass composition comprises $Na_2O$ in an amount from greater than or equal to 0.10 mol % to less than or equal to 10.00 mol %.

Like $Na_2O$, $K_2O$ also promotes ion exchange and increases the DOC of a compressive stress layer. However, adding $K_2O$ in amounts greater than about 5.00 mol % may result in the CTE being too high, and the melting point may be too high. In embodiments, the glass composition generally comprises $K_2O$ in an amount from greater than or equal to 0.00 mol % to less than or equal to 5.00 mol %, or greater than or equal to 0.10 mol % to less than or equal to 5.00 mol %. In some embodiments, the glass composition comprises $K_2O$ in amounts greater than or equal to 0.50 mol %, greater than or equal to 1.00 mol %, greater than or equal to 1.50 mol %, greater than or equal to 2.00 mol %, greater than or equal to 2.50 mol %, greater than or equal to 3.00 mol %, greater than or equal to 3.50 mol %, greater than or equal to 4.00 mol %, or greater than or equal to 4.50 mol %. In some embodiments, the glass composition comprises $K_2O$ in amounts less than or equal to 0.50 mol %, less than or equal to 1.00 mol %, less than or equal to 1.50 mol %, less than or equal to 2.00 mol %, less than or equal to 2.50 mol %, less than or equal to 3.00 mol %, less than or equal to 3.50 mol %, less than or equal to 4.00 mol %, or less than or equal to 4.50 mol %. In other embodiments, the glass composition comprises $K_2O$ in an amount from greater than or equal to 0.50 mol % to less than or equal to 4.50 mol %, such as from greater than or equal to 1.00 mol % to less than or equal to 4.00 mol %, from greater than or equal to 1.50 mol % to less than or equal to 3.50 mol %, or from greater than or equal to 2.00 mol % to less than or equal to 3.00 mol %. From the above, it should be understood that some embodiments do not include $K_2O$.

MgO lowers the viscosity of a glass, which enhances the formability, the strain point, the Young's modulus, and may improve the ion exchange ability. However, when MgO is added in amounts greater than about 8.00 mol % to the glass composition, the density and the CTE of the glass composition increase. In embodiments, the glass composition generally comprises MgO in an amount from greater than or equal to 0.10 mol % to less than or equal to 8.00 mol %. In some embodiments, the glass composition comprises MgO in amounts greater than or equal to 0.50 mol %, greater than or equal to 1.00 mol %, greater than or equal to 1.50 mol %, greater than or equal to 2.00 mol %, greater than or equal to 2.50 mol %, greater than or equal to 3.00 mol %, greater than or equal to 3.50 mol %, greater than or equal to 4.00 mol %, greater than or equal to 4.50 mol %, greater than or equal to 5.00 mol %, greater than or equal to 5.50 mol %, greater than or equal to 6.00 mol %, greater than or equal to 6.50 mol %, greater than or equal to 7.00 mol %, or greater than or equal to 7.50 mol %. In some embodiments, the glass composition comprises MgO in amounts less than or equal to 0.50 mol %, less than or equal to 1.00 mol %, less than or equal to 1.50 mol %, less than or equal to 2.00 mol %, less than or equal to 2.50 mol %, less than or equal to 3.00 mol %, less than or equal to 3.50 mol %, less than or equal to 4.00 mol %, less than or equal to 4.50 mol % less than or equal to 5.00 mol %, less than or equal to 5.50 mol %, less than or equal to 6.00 mol %, less than or equal to 6.50 mol %, less than or equal to 7.00 mol %, or less than or equal to 7.50 mol %. In other embodiments, the glass composition comprises MgO in an amount from greater than or equal to 0.50 mol % to less than or equal to 7.50 mol %, such as from greater than or equal to 1.00 mol % to less than or equal to 7.00 mol %, from greater than or equal to 1.50 mol % to less than or equal to 6.50 mol %, from greater than or equal to 2.00 mol % to less than or equal to 6.00 mol %, from greater than or equal to 2.50 mol % to less than or equal to 5.50 mol %, from greater than or equal to 3.00 mol % to less than or equal to 5.00 mol %, or from greater than or equal to 3.50 mol % to less than or equal to 4.50 mol %.

CaO lowers the viscosity of a glass, which enhances the formability, the strain point and the Young's modulus. However, when too much CaO is added to the glass composition, the density and the CTE of the glass composition increase, and the ion exchange ability of the glass decreases. In embodiments, the glass composition generally comprises CaO in an amount from greater than or equal to 0.10 mol % to less than or equal to 5.00 mol %. In some embodiments, the glass composition comprises CaO in amounts greater than or equal to 0.50 mol %, greater than or equal to 1.00 mol %, greater than or equal to 1.50 mol %, greater than or equal to 2.00 mol %, greater than or equal to 2.50 mol %, greater than or equal to 3.00 mol %, greater than or equal to 3.50 mol %, greater than or equal to 4.00 mol %, or greater than or equal to 4.50 mol %. In some embodiments, the glass composition comprises CaO in amounts less than or equal to 0.50 mol %, less than or equal to 1.00 mol %, less than or equal to 1.50 mol %, less than or equal to 2.00 mol %, less than or equal to 2.50 mol %, less than or equal to 3.00 mol %, less than or equal to 3.50 mol %, less than or equal to 4.00 mol %, or less than or equal to 4.50 mol %. In other embodiments, the glass composition comprises CaO in an amount from greater than or equal to 0.50 mol % to less than or equal to 4.50 mol %, such as from greater than or equal to 1.00 mol % to less than or equal to 4.00 mol %, from greater than or equal to 1.50 mol % to less than or equal to 3.50 mol %, or from greater than or equal to 2.00 mol % to less than or equal to 3.00 mol %.

In embodiments, the glass composition may optionally include one or more fining agents. In some embodiments, the fining agents may include, for example, $SnO_2$, $CeO_2$, $As_2O_3$, $Sb_2O_3$, $Cl^-$, $S^-$, $F^-$, or $Fe_2O_3$. In such embodiments, the fining agent may be present in the glass composition in an amount from greater than or equal to 0.00 mol % to less than or equal to 0.20 mol %, such as from greater than or equal to 0.00 mol % to less than or equal to 0.10 mol %, or from greater than or equal to 0.00 mol % to less than or equal to 0.05 mol %. In other embodiments, the fining agent may be present in the glass composition in an amount from greater than or equal to 0.05 mol % to less than or equal to 0.20 mol %, such as from greater than or equal to 0.05 mol % to less than or equal to 0.10 mol %.

In some embodiments the glass compositions may further comprise minor amounts of one or more additional oxides such as, for example, ZnO, $TiO_2$, $ZrO_2$, or the like. These components may be added to further enhance the chemical durability of the glass composition and/or improve other properties, such as, for example CTE, density, ion exchange ability, and viscosity. In such embodiments, the additional oxides may be present in the glass composition in an amount from greater than or equal to 0.00 mol % to less than or equal to 0.20 mol %, such as from greater than or equal to 0.00 mol % to less than or equal to 0.10 mol %, or from greater than or equal to 0.00 mol % to less than or equal to 0.05 mol %. In other embodiments, the additional oxides may be present in the glass composition in an amount from greater than or equal to 0.05 mol % to less than or equal to 0.20 mol %, such as from greater than or equal to 0.05 mol % to less than or equal to 0.10 mol %.

In any embodiment described above, the glass composition may be substantially free of $B_2O_3$, BaO, SrO, or combinations thereof. It should be understood that in embodiments the glass composition may be substantially free of all three of these components, in other embodiments, the glass composition may be substantially free of any three of these components, in yet other embodiments, the glass composition may be substantially free of any two of these components, and in still other embodiments, the glass composition may be substantially free of any one of these components. As used herein, the term "substantially free" means that the component is not added as a component of the batch material even though the component may be present in the final glass in very small amounts as a contaminate, such as less than 0.1 mol %.

However, in other embodiments, the glass composition can contain small amounts of $B_2O_3$. In such embodiments, $B_2O_3$ may be present in amounts from greater than or equal to 0.5 mol % to less than or equal to 3.0 mol %, such as from greater than or equal to 0.5 mol % to less than or equal to 2.5 mol %, greater than or equal to 0.5 mol % to less than or equal to 2.0 mol %, greater than or equal to 0.5 mol % to less than or equal to 1.5 mol %, or greater than or equal to 0.5 mol % to less than or equal to 1.0 mol %. In some embodiments, the $B_2O_3$ may be present in the glass composition in amounts from greater than or equal to 1.0 mol % to less than or equal to 3.0 mol %, such as greater than or equal to 1.0 mol % to less than or equal to 2.5 mol %, greater than or equal to 1.0 mol % to less than or equal to 2.0 mol %, or greater than or equal to 1.0 mol % to less than or equal to 1.5 mol %.

In addition to the above, the ratio of total alkali metals to network forming components (i.e., $(Li_2O+Na_2O+K_2O)/(SiO_2+Al_2O_3)$) may also be adjusted to increase the hydrolytic durability of the glass composition. In embodiments, the ratio of total alkali metals to network forming components is from greater than or equal to 0.05 to less than or equal to 0.50, such as from greater than or equal to 0.10 to less than or equal to 0.45, from greater than or equal to 0.15 to less than or equal to 0.40, from greater than or equal to 0.20 to less than or equal to 0.35, or from greater than or equal to 0.25 to less than or equal to 0.30. In other embodiments, the ratio of total alkali metals to network forming components is from greater than or equal to 0.10 to less than or equal to 0.50, from greater than or equal to 0.15 to less than or equal to 0.50, from greater than or equal to 0.20 to less than or equal to 0.50, from greater than or equal to 0.25 to less than or equal to 0.50, from greater than or equal to 0.30 to less than or equal to 0.50, from greater than or equal to 0.35 to less than or equal to 0.50, from greater than or equal to 0.40 to less than or equal to 0.50, or from greater than or equal to 0.45 to less than or equal to 0.50. In yet other embodiments, the ratio of total alkali metals to network forming components is from greater than or equal to 0.05 to less than or equal to 0.45, from greater than or equal to 0.05 to less than or equal to 0.40, from greater than or equal to 0.05 to less than or equal to 0.35, from greater than or equal to 0.05 to less than or equal to 0.30, from greater than or equal to 0.05 to less than or equal to 0.25, from greater than or equal to 0.05 to less than or equal to 0.20, from greater than or equal to 0.05 to less than or equal to 0.15, or from greater than or equal to 0.05 to less than or equal to 0.10. In still other embodiments, the ratio of total alkali metals to network forming components is from greater than or equal to 0.05 to less than or equal to 0.15, the ratio of total alkali metals to network forming components is from greater than or equal to 0.05 to less than or equal to 0.14, the ratio of total alkali metals to network forming components is from greater than or equal to 0.05 to less than or equal to 0.13, the ratio of total alkali metals to network forming components is from greater than or equal to 0.05 to less than or equal to 0.12, the ratio of total alkali metals to network forming components is from greater than or equal to 0.05 to less than or equal to 0.11, or the ratio of total alkali metals to network forming components is from greater than or equal to 0.05 to less than or equal to 0.10.

Further, in embodiments, the glass composition may comprise a ratio of $R_2O:RO$ from greater than or equal to 0.75 to less than or equal to 4.25, where $R_2O$ is the sum of alkali metal oxides in the glass composition and RO is the sum of alkaline earth metal oxides in the glass composition. In some embodiments, the glass composition may have a $R_2O:RO$ ratio greater than or equal to 1.00, greater than or equal to 1.25, greater than or equal to 1.50, greater than or equal to 1.75, greater than or equal to 2.00, greater than or equal to 2.25, greater than or equal to 2.50, greater than or equal to 2.50, greater than or equal to 2.75, greater than or equal to 3.00, greater than or equal to 3.25, greater than or equal to 3.50, greater than or equal to 3.75, or greater than or equal to 4.00. In other embodiments, the glass composition may have a $R_2O:RO$ ratio less than or equal to 1.00, less than or equal to 1.25, less than or equal to 1.50, less than or equal to 1.75, less than or equal to 2.00, less than or equal to 2.25, less than or equal to 2.50, less than or equal to 2.50, less than or equal to 2.75, less than or equal to 3.00, less than or equal to 3.25, less than or equal to 3.50, less than or equal to 3.75, or less than or equal to 4.00. In yet other embodiments, the glass composition may have a $R_2O:RO$ ratio from greater than or equal to 1.00 to less than or equal to 4.00, from greater than or equal to 1.25 to less than or equal to 3.75, from greater than or equal to 1.50 to less than or equal to 3.50, from greater than or equal to 1.75 to less than or equal to 3.25, from greater than or equal to 2.00 to less than or equal to 3.00, or from greater than or equal to 2.25 to less than or equal to 2.75. In further embodiments, the $R_2O:RO$ ratio is from greater than or equal to 0.85 to less than or equal to 2.55, such as from greater than or equal to 0.85 to less than or equal to 2.20, or from greater than or equal to 0.95 to less than or equal to 2.20.

In embodiments, the glass composition may comprise a $Li_2O:R_2O$ ratio from greater than or equal to 0.10 to less than or equal to 1.00. In some embodiments, the $Li_2O:R_2O$ ratio is greater than or equal to 0.15, greater than or equal to 0.20, greater than or equal to 0.25, greater than or equal to 0.30, greater than or equal to 0.35, greater than or equal to 0.40, greater than or equal to 0.45, greater than or equal to 0.50, greater than or equal to 0.55, greater than or equal to 0.60, greater than or equal to 0.65, greater than or equal to 0.70, greater than or equal to 0.75, greater than or equal to 0.80, greater than or equal to 0.85, greater than or equal to 0.90, or greater than or equal to 0.95. In other embodiments, the $Li:R_2O$ ratio is less than or equal to 0.15, less than or equal to 0.20, less than or equal to 0.25, less than or equal to 0.30, less than or equal to 0.35, less than or equal to 0.40, less than or equal to 0.45, less than or equal to 0.50, less than or equal to 0.55, less than or equal to 0.60, less than or equal to 0.65, less than or equal to 0.70, less than or equal to 0.75, less than or equal to 0.80, less than or equal to 0.85, less than or equal to 0.90, or less than or equal to 0.95. In yet other embodiments, the $Li_2O:R_2O$ ratio is from greater than or equal to 0.15 to less than or equal to 0.95, from greater than or equal to 0.20 to less than or equal to 0.90, from greater than or equal to 0.25 to less than or equal to 0.85, from greater than or equal to 0.30 to less than or equal to 0.80, from greater than or equal to 0.35 to less than or equal to 0.75, from greater than or equal to 0.40 to less than or equal to 0.70, from greater than or equal to 0.45 to less than or equal to 0.65, or from greater than or equal to 0.50 to less than or equal to 0.60. In further embodiments, the $Li_2O:R_2O$ ratio is from greater than or equal to 0.55 to less than or equal to 0.85, such as from greater than or equal to 0.60 to less than or equal to 0.85, or from greater than or equal to 0.60 to less than or equal to 0.80.

In yet other embodiments, the glass composition may comprise a $Li_2O:RO$ ratio from greater than or equal to 0.25 to less than or equal to 3.50. In some embodiments, the Li:RO ratio is greater than or equal to 0.50, greater than or equal to 0.75, greater than or equal to 1.00, greater than or equal to 1.25, greater than or equal to 1.50, greater than or equal to 1.75, greater than or equal to 2.00, greater than or equal to 2.25, greater than or equal to 2.50, greater than or equal to 2.75, greater than or equal to 3.00, or greater than or equal to 3.25. In other embodiments, the $Li_2O:RO$ ratio is less than or equal to 0.50, less than or equal to 0.75, less than or equal to 1.00, less than or equal to 1.25, less than or equal to 1.50, less than or equal to 1.75, less than or equal to 2.00, less than or equal to 2.25, less than or equal to 2.50, less than or equal to 2.75, less than or equal to 3.00, or less than or equal to 3.25. In yet other embodiments, the $Li_2O$:RO ratio is from greater than or equal to 0.50 to less than or equal to 3.25, from greater than or equal to 0.75 to less than or equal to 3.00, from greater than or equal to 1.00 to less than or equal to 2.75, from greater than or equal to 1.25 to less than or equal to 2.50, from greater than or equal to 1.50 to less than or equal to 2.25, or from greater than or equal to 1.75 to less than or equal to 2.00. In further embodiments, the $Li_2O:RO$ ratio is from greater than or equal to 0.40 to less than or equal to 2.00, such as from greater than or equal to 0.40 to less than or equal to 1.80, or from greater than or equal to 0.45 to less than or equal to 1.80.

The glass composition may, in some embodiments, comprise a $Li_2O:Al_2O_3$ ratio from greater than or equal to 0.10 to less than or equal to 2.75. In some embodiments, the $Li_2O:Al_2O_3$ ratio is greater than or equal to 0.25, greater than or equal to 0.50, greater than or equal to 0.75, greater than or equal to 1.00, greater than or equal to 1.25, greater than or equal to 1.50, greater than or equal to 1.75, greater than or equal to 2.00, greater than or equal to 2.25, or greater than or equal to 2.50. In other embodiments, the $Li_2O:Al_2O_3$ ratio is less than or equal to 0.25, less than or equal to 0.50, less than or equal to 0.75, less than or equal to 1.00, less than or equal to 1.25, less than or equal to 1.50, less than or equal to 1.75, less than or equal to 2.00, less than or equal to 2.25, or less than or equal to 2.50. In yet other embodiments, the $Li_2O:Al_2O_3$ ratio is from greater than or equal to 0.25 to less than or equal to 2.50, from greater than or equal to 0.50 to less than or equal to 2.25, from greater than or equal to 0.75 to less than or equal to 2.00, from greater than or equal to 1.00 to less than or equal to 1.75, or from greater than or equal to 1.25 to less than or equal to 1.50. In further embodiments, the $Li_2O:Al_2O_3$ ratio is from greater than or equal to 0.55 to less than or equal to 2.00, such as from greater than or equal to 0.55 to less than or equal to 1.50, or from greater than or equal to 0.60 to less than or equal to 1.50.

In yet other embodiments, the glass composition may comprise a $R_2O:Al_2O_3$ ratio from greater than or equal to 0.9 to less than or equal to 2.0. In some embodiments, the $R_2O:Al_2O_3$ ratio is greater than or equal to 1.0, greater than or equal to 1.1, greater than or equal to 1.2, greater than or equal to 1.3, greater than or equal to 1.4, greater than or equal to 1.5, greater than or equal to 1.6, greater than or equal to 1.7, greater than or equal to 1.8, or greater than or equal to 1.9. In other embodiments, the $R_2O:Al_2O_3$ ratio is less than or equal to 2.0, less than or equal to 1.9, less than or equal to 1.8, less than or equal to 1.7, less than or equal to 1.6, less than or equal to 1.5, less than or equal to 1.4, less than or equal to 1.3, less than or equal to 1.2, or less than or equal to 1.1. In yet other embodiments, the $R_2O:Al_2O_3$ ratio is from greater than or equal to 0.9 to less than or equal to 1.9, from greater than or equal to 1.0 to less than or equal to 1.8, from greater than or equal to 1.1 to less than or equal to 1.7, from greater than or equal to 1.2 to less than or equal to 1.6, or from greater than or equal to 1.3 to less than or equal to 1.5. In further embodiments, the $R_2O:Al_2O_3$ ratio is from greater than or equal to 1.0 to less than or equal to 2.00, such as from greater than or equal to 1.3 to less than or equal to 1.9, or from greater than or equal to 1.3 to less than or equal to 1.5.

In some embodiments, the concentration of CaO to the sum of the concentration of CaO and the concentration of MgO in mol. % (i.e., (CaO/(CaO+MgO)) should be minimized. Specifically, it has been determined that (CaO/(CaO+MgO)) should be less than or equal to 0.5. In some embodiments (CaO/(CaO+MgO)) is less than or equal to 0.3 or even less than or equal to 0.2. In some other embodiments (CaO/(CaO+MgO)) may even be less than or equal to 0.1.

The glass composition may, in embodiments, comprise a $Li_2O:SiO_2$ ratio from greater than or equal to 0.01 to less than or equal to 0.17. In some embodiments, the $Li_2O:SiO_2$ ratio is greater than or equal to 0.02, greater than or equal to 0.04, greater than or equal to 0.06, greater than or equal to 0.08, greater than or equal to 0.10, greater than or equal to 0.12, greater than or equal to 0.14, or greater than or equal to 0.16. In other embodiments, the $Li_2O:SiO_2$ ratio is less than or equal to 0.02, less than or equal to 0.04, less than or equal to 0.06, less than or equal to 0.08, less than or equal to 0.10, less than or equal to 0.12, less than or equal to 0.14, or less than or equal to 0.16. In yet other embodiments, the $Li_2O:SiO_2$ ratio is from greater than or equal to 0.02 to less than or equal to 0.16, from greater than or equal to 0.04 to less than or equal to 0.14, from greater than or equal to 0.06 to less than or equal to 0.12, or from greater than or equal to 0.08 to less than or equal to 0.1. In further embodiments, the $Li_2O:SiO_2$ ratio may be from greater than or equal to 0.06 to less than or equal to 0.12, such as from 0.06 to less than or equal to 0.11, or even from 0.07 to less than or equal to 0.11.

The glass composition may, in embodiments, comprise a $Li_2O:(SiO_2+Al_2O_3)$ ratio from greater than or equal to 0.01 to less than or equal to 0.16. In some embodiments, the $Li_2O:SiO_2$ ratio is greater than or equal to 0.02, greater than or equal to 0.04, greater than or equal to 0.06, greater than or equal to 0.08, greater than or equal to 0.10, greater than or equal to 0.12, greater than or equal to 0.14, or greater than or equal to 0.15. In other embodiments, the $Li_2O:SiO_2$ ratio is less than or equal to 0.02, less than or equal to 0.04, less than or equal to 0.06, less than or equal to 0.08, less than or equal to 0.10, less than or equal to 0.12, less than or equal to 0.14, or less than or equal to 0.15. In yet other embodiments, the $Li:SiO_2$ ratio is from greater than or equal to 0.02 to less than or equal to 0.15, from greater than or equal to 0.04 to less than or equal to 0.14, from greater than or equal to 0.06 to less than or equal to 0.12, or from greater than or equal to 0.08 to less than or equal to 0.1. In further embodiments, the $Li_2O:SiO_2$ ratio may be from greater than or equal to 0.06 to less than or equal to 0.12, such as from 0.06 to less than or equal to 0.11, or even from 0.07 to less than or equal to 0.11.

Without limiting compositions possibly chosen individually from each of the various components recited above, in some embodiments, the glass composition may comprise from greater than or equal to 68.00 mol % to less than or equal to 81.00 mol % $SiO_2$; from greater than or equal to 4.00 mol % to less than or equal to 11.00 mol % $Al_2O_3$; from greater than or equal to 0.10 mol % to less than or equal to 16.00 mol % $Li_2O$; from greater than or equal to 0.10 mol % to less than or equal to 12.00 mol % $Na_2O$; from greater than or equal to 0.00 mol % to less than or equal to 5.00 mol % $K_2O$; from greater than or equal to 0.10 mol % to less than or equal to 8.00 mol % MgO; from greater than or equal to 0.10 mol % to less than or equal to 5.00 mol % CaO; from greater than or equal to 0.00 mol % to less than or equal to 0.20 mol % fining agent, wherein the glass pharmaceutical package is delamination resistant, and the glass pharmaceutical package has class 1 or class 2 chemical durability in acid, base, and water. In other embodiments, and without limitation, the glass composition may comprise from greater than or equal to 74.00 mol % to less than or equal to 79.00 mol % $SiO_2$, from greater than or equal to 5.00 mol % to less than or equal to 11.00 mol % $Al_2O_3$, from greater than or equal to 0.10 mol % to less than or equal to 14.00 mol % $Li_2O$, from greater than or equal to 0.10 mol % to less than or equal to 10.00 mol % $Na_2O$, from greater than or equal to 0.0 mol % to less than or equal to 5.00 mol % $K_2O$, from greater than or equal to 0.10 mol % to less than or equal to 8.00 mol % MgO, from greater than or equal to 0.10 mol % to less than or equal to 5.00 mol % CaO, and from greater than or equal to 0.00 mol % to less than or equal to 0.20 mol % fining agent.

Glass compositions disclosed in embodiments herein may be free from delamination. Delamination refers to a phenomenon in which glass particles are released from the surface of the glass following a series of leaching, corrosion, and/or weathering reactions. In general, the particles are silica-rich flakes of glass which originate from the interior surface of the container as a result of the leaching of modifier ions or weak network formers, such as, for example, sodium, into a solution contained within the container. These flakes may generally be from 1 nm to 2 µm thick with a width greater than about 50 µm. As these flakes are primarily composed of silica, the flakes generally do not further degrade after being released from the surface of the glass.

It is believed that delamination of the silica-rich glass flakes from the interior surfaces of the glass containers is due to the compositional characteristics of the glass container in its as received condition. Specifically, the high silica content of alkali aluminosilicate glasses causes the glass to have relatively high melting and forming temperatures. However, other components in the glass, such as, for example, boron, melt and/or vaporize at much lower temperatures. In particular, the boron species in conventional glasses are volatile and evaporate from the surface of the glass at the high temperatures necessary to form and reform the glass.

Specifically, glass stock, such as a glass tube or the like, is reformed into glass containers, such as, for example, glass vials or the like, at high temperatures and in direct flames. The high temperatures needed at higher equipment speeds cause the more volatile boron species to evaporate from regions of the surface of the glass. When this evaporation occurs within the interior volume of the glass container, the volatilized boron species are re-deposited in other areas of the glass container surface causing compositional heterogeneities in the glass container surface, particularly with respect to the near-surface regions of the interior of the glass container (i.e., those regions at or directly adjacent to the interior surfaces of the glass container). However, the glass compositions disclosed and described herein are formulated so that boron is not included in the glass composition, thus reducing the amount of delamination that occurs in the glass article. The delamination may be measured by the delamination factor disclosed in U.S. Pat. No. 9,428,302, which is incorporated herein by reference in its entirety. In some embodiments, the glass may have a delamination factor less than or equal to 10, such as less than or equal to 8, or even less than or equal to 6.

Physical properties of Li containing aluminosilicate glass compositions as disclosed above will now be discussed. The properties discussed below show the results of adding lithium to aluminosilicate glasses or alkali aluminosilicate glasses. These physical properties can be achieved by modifying the component amounts of the Li containing aluminosilicate glass composition, as will be discussed in more detail with reference to the examples. Heretofore, the effect that lithium has on the physical properties of glass compositions was not clearly understood.

Glass compositions according to embodiments may have a density from greater than or equal to 2.25 $g/cm^3$ to less than or equal to 2.50 $g/cm^3$, such as from greater than or equal to 2.30 $g/cm^3$ to less than or equal to 2.45 $g/cm^3$, from greater than or equal to 2.35 $g/cm^3$ to less than or equal to 2.45 $g/cm^3$, or from greater than or equal to 2.40 $g/cm^3$ to less than or equal to 2.45 $g/cm^3$. In other embodiments, the glass composition may have a density from greater than or equal to 2.25 $g/cm^3$ to less than or equal to 2.40 $g/cm^3$, from greater than or equal to 2.25 $g/cm^3$ to less than or equal to 2.35 $g/cm^3$, or from greater than or equal to 2.25 $g/cm^3$ to less than or equal to 2.30 $g/cm^3$. In some embodiments, the glass compositions may have a density of about 2.35 $g/cm^3$, about 2.36 $g/cm^3$, about 2.37 $g/cm^3$, about 2.38 $g/cm^3$, or about 2.39 $g/cm^3$. Generally, as larger, more dense alkali metal cations, such as $Na^+$ or $K^+$, are replaced with smaller alkali metal cations, such as $Li^+$, in an alkali aluminosilicate glass composition, the density of the glass composition decreases. Accordingly, the higher the amount of lithium in the glass composition, the less dense the glass composition will be.

Similarly to glass density discussed above, glass compositions according to embodiments may have a molar volume from greater than or equal to 24.00 $cm^3/mol$ to less than or equal to 27.00 $cm^3/mol$, such as from greater than or equal to 24.50 $cm^3/mol$ to less than or equal to 27.00 $cm^3/mol$, from greater than or equal to 25.00 $cm^3/mol$ to less than or equal to 27.00 $cm^3/mol$, from greater than or equal to 25.50 $cm^3/mol$ to less than or equal to 27.00 $cm^3/mol$, from greater than or equal to 26.00 $cm^3/mol$ to less than or equal to 27.00 $cm^3/mol$, or from greater than or equal to 26.50 $cm^3/mol$ to less than or equal to 27.00 $cm^3/mol$. In other embodiments, the glass composition may have a molar volume from greater than or equal to 24.00 $cm^3/mol$ to less than or equal to 26.50 $cm^3/mol$, from greater than or equal to 24.00 $cm^3/mol$ to less than or equal to 26.00 $cm^3/mol$, from greater than or equal to 24.00 $cm^3/mol$ to less than or equal to 25.50 $cm^3/mol$, from greater than or equal to 24.00 $cm^3/mol$ to less than or equal to 25.00 $cm^3/mol$, or from greater than or equal to 24.00 $cm^3/mol$ to less than or equal to 24.50 $cm^3/mol$. In yet other embodiments, the glass composition may have a molar volume of about 24.80 $cm^3/mol$, 25.00 $cm^3/mol$, about 25.20 $cm^3/mol$, about 25.40 $cm^3/mol$, about 25.60 $cm^3/mol$, about 25.80 $cm^3/mol$, or about 26.00 $cm^3/mol$. The density of the glass was measured by a buoyancy method for homogenous, nonporous, water-insoluble materials at or near 25° C., as described in ASTM C693. As was the case with density, generally as larger alkali metal ions, such as $Na^+$ and $K^+$, are replaced with smaller alkali ions, such as $Li^+$, in an alkali aluminosilicate glass composition, the molar volume of the glass composition decreases. The molar volume was calculated from glass density (ρ) and average molar weight (M) of the glass composition by the following equation: $V_M = M/\rho$.

The strain point, annealing point, and softening point of glass compositions may also be affected by the amount of lithium in the glass composition. As the amount of lithium in the glass composition increases, the amount of other, larger alkali metal cations, such as Na$^+$ and K$^+$, decreases. It has been found that a minimum strain point, a minimum annealing point, and a minimum softening point occurs where lithium has replaced sodium such that the sodium content is about 4 mol %. In embodiments, the strain point of glass compositions may be from greater than or equal to 450° C. to less than or equal to 625° C., such as from greater than or equal to 475° C. to less than or equal to 600° C., from greater than or equal to 500° C. to less than or equal to 575° C., from greater than or equal to 515° C. to less than or equal to 560° C., or from greater than or equal to 530° C. to less than or equal to 550° C. In other embodiments, the strain point of the glass composition may be from greater than or equal to 500° C. to less than or equal to 560° C., such as from greater than or equal to 510° C. to less than or equal to 560° C., from greater than or equal to 520° C. to less than or equal to 560° C., from greater than or equal to 530° C. to less than or equal to 560° C., or from greater than or equal to 540° C. to less than or equal to 560° C. In yet other embodiments, the strain point of the glass composition may be from greater than or equal to 500° C. to less than or equal to 555° C., from greater than or equal to 500° C. to less than or equal to 550° C., from greater than or equal to 500° C. to less than or equal to 540° C., from greater than or equal to 500° C. to less than or equal to 530° C., or from greater than or equal to 500° C. to less than or equal to 520° C. The beam bending viscosity method measures the viscosity of inorganic glass from 10$^{12}$ to 10$^{14}$ poise versus temperature and from this measurement estimates the strain point of the glass. This method conforms to ASTM C598

In embodiments, the annealing point of glass compositions may be from greater than or equal to 500° C. to less than or equal to 675° C., such as from greater than or equal to 525° C. to less than or equal to 650° C., from greater than or equal to 550° C. to less than or equal to 625° C., from greater than or equal to 565° C. to less than or equal to 615° C., or from greater than or equal to 580° C. to less than or equal to 600° C. In other embodiments, the annealing point of the glass composition may be from greater than or equal to 550° C. to less than or equal to 625° C., such as from greater than or equal to 560° C. to less than or equal to 625° C., from greater than or equal to 570° C. to less than or equal to 625° C., from greater than or equal to 580° C. to less than or equal to 625° C., or from greater than or equal to 590° C. to less than or equal to 625° C. In yet other embodiments, the annealing point of the glass composition may be from greater than or equal to 550° C. to less than or equal to 615° C., from greater than or equal to 550° C. to less than or equal to 610° C., from greater than or equal to 550° C. to less than or equal to 600° C., from greater than or equal to 550° C. to less than or equal to 590° C., or from greater than or equal to 550° C. to less than or equal to 580° C. The beam bending viscosity method measures the viscosity of inorganic glass from 10$^{12}$ to 10$^{14}$ poise versus temperature and from this measurement estimates the annealing point of the glass. This method conforms to ASTM C598

In embodiments, the softening point of glass compositions may be from greater than or equal to 750° C. to less than or equal to 950° C., such as from greater than or equal to 775° C. to less than or equal to 925° C., from greater than or equal to 750° C. to less than or equal to 900° C., from greater than or equal to 800° C. to less than or equal to 875° C., or from greater than or equal to 825° C. to less than or equal to 850° C. In other embodiments, the softening point of the glass composition may be from greater than or equal to 800° C. to less than or equal to 925° C., such as from greater than or equal to 815° C. to less than or equal to 925° C., from greater than or equal to 830° C. to less than or equal to 925° C., from greater than or equal to 845° C. to less than or equal to 925° C., or from greater than or equal to 860° C. to less than or equal to 925° C. In yet other embodiments, the softening point of the glass composition may be from greater than or equal to 800° C. to less than or equal to 915° C., from greater than or equal to 800° C. to less than or equal to 900° C., from greater than or equal to 800° C. to less than or equal to 885° C., from greater than or equal to 800° C. to less than or equal to 870° C., or from greater than or equal to 800° C. to less than or equal to 850° C. The parallel place viscosity method measures viscosity from 10$^7$ to 10$^9$ poise versus temperature for inorganic glass and from this estimates a "normal softening point." This method is similar to ASTM C1351M.

Additionally, the amount of lithium in the glass composition also affects the CTE of the glass composition. As lithium replaces larger alkali cations, such as Na$^+$ and K$^+$, in the alkali aluminosilicate glass composition, the CTE of the glass composition decreases. In embodiments, the CTE of the glass composition may be from greater than or equal to 4.20 ppm/° C. to less than or equal to 7.00 ppm/° C., such as from greater than or equal to 4.50 ppm/° C. to less than or equal to 6.90 ppm/° C., from greater than or equal to 4.70 ppm/° C. to less than or equal to 6.80 ppm/° C., from greater than or equal to 4.90 ppm/° C. to less than or equal to 6.70 ppm/° C., from greater than or equal to 5.00 ppm/° C. to less than or equal to 6.80 ppm/° C., from greater than or equal to 5.20 ppm/° C. to less than or equal to 6.70 ppm/° C., from greater than or equal to 5.40 ppm/° C. to less than or equal to 6.60 ppm/° C., from greater than or equal to 5.60 ppm/° C. to less than or equal to 6.50 ppm/° C., from greater than or equal to 5.80 ppm/° C. to less than or equal to 6.40 ppm/° C., or from greater than or equal to 6.00 ppm/° C. to less than or equal to 6.30 ppm/° C. In other embodiments, the glass composition may have a CTE from greater than or equal to 5.00 ppm/° C. to less than or equal to 7.00 ppm/° C., from greater than or equal to 5.20 ppm/° C. to less than or equal to 7.00 ppm/° C., from greater than or equal to 5.40 ppm/° C. to less than or equal to 7.00 ppm/° C., from greater than or equal to 5.60 ppm/° C. to less than or equal to 7.00 ppm/° C., from greater than or equal to 5.80 ppm/° C. to less than or equal to 7.00 ppm/° C., from greater than or equal to 6.00 ppm/° C. to less than or equal to 7.00 ppm/° C., from greater than or equal to 6.20 ppm/° C. to less than or equal to 7.00 ppm/° C., from greater than or equal to 6.40 ppm/° C. to less than or equal to 7.00 ppm/° C., from greater than or equal to 6.60 ppm/° C. to less than or equal to 7.00 ppm/° C., from greater than or equal to 6.80 ppm/° C. to less than or equal to 7.00 ppm/° C. In yet other embodiments, the glass composition has a CTE from the glass composition may have a CTE from greater than or equal to 5.00 ppm/° C. to less than or equal to 6.80 ppm/° C., the glass composition may have a CTE from greater than or equal to 5.00 ppm/° C. to less than or equal to 6.60 ppm/° C., the glass composition may have a CTE from greater than or equal to 5.00 ppm/° C. to less than or equal to 6.40 ppm/° C., the glass composition may have a CTE from greater than or equal to 5.00 ppm/° C. to less than or equal to 6.20 ppm/° C., the glass composition may have a CTE from greater than or equal to 5.00 ppm/° C. to less than or equal to 6.00 ppm/° C., the glass composition may have a CTE from greater than or equal to 5.00 ppm/° C. to less than or equal to 5.80 ppm/° C., the glass composition may have a CTE from greater than or equal to 5.00 ppm/° C. to less than or equal to 5.60 ppm/° C., the glass composition may have a CTE from greater than or equal to 5.00 ppm/° C. to less than or equal to 5.40 ppm/° C., the glass composition may have a CTE from greater than or equal to 5.00 ppm/° C. to less than or equal to 5.20 ppm/° C. A dilatometer method was used to determine a mean coefficient of linear thermal expansion (CTE) of a solid material, such as, for example, glass. This method conforms to ASTM E228.

The amount of lithium in a glass composition also has an effect on the liquidus temperature of the glass composition. Namely, as lithium replaces larger alkali cations, such as $Na^+$ and $K^+$, in an alkali aluminosilicate glass composition, the liquidus temperature of the glass composition increases. In embodiments, the liquidus temperature is from greater than or equal to 950° C. to less than or equal to 1250° C., such as from greater than or equal to 970° C. to less than or equal to 1230° C., from greater than or equal to 1000° C. to less than or equal to 1210° C., from greater than or equal to 1020° C. to less than or equal to 1190° C., from greater than or equal to 1040° C. to less than or equal to 1170° C., from greater than or equal to 1060° C. to less than or equal to 1150° C., from greater than or equal to 1080° C. to less than or equal to 1130° C., or from greater than or equal to 1090° C. to less than or equal to 1110° C. In other embodiments, the glass composition has a liquidus temperature from greater than or equal to 1000° C. to less than or equal to 1230° C., from greater than or equal to 1020° C. to less than or equal to 1230° C., from greater than or equal to 1040° C. to less than or equal to 1230° C., from greater than or equal to 1060° C. to less than or equal to 1230° C., from greater than or equal to 1080° C. to less than or equal to 1230° C., from greater than or equal to 1100° C. to less than or equal to 1230° C., from greater than or equal to 1120° C. to less than or equal to 1230° C., from greater than or equal to 1140° C. to less than or equal to 1230° C., from greater than or equal to 1160° C. to less than or equal to 1230° C., from greater than or equal to 1180° C. to less than or equal to 1230° C., from greater than or equal to 1200° C. to less than or equal to 1230° C. In yet other embodiments, the glass composition has a liquidus temperature from greater than or equal to 1000° C. to less than or equal to 1210° C., from greater than or equal to 1000° C. to less than or equal to 1190° C., from greater than or equal to 1000° C. to less than or equal to 1170° C., from greater than or equal to 1000° C. to less than or equal to 1150° C., from greater than or equal to 1000° C. to less than or equal to 1130° C., from greater than or equal to 1110° C. to less than or equal to 1230° C., from greater than or equal to 1000° C. to less than or equal to 1090° C., from greater than or equal to 1000° C. to less than or equal to 1070° C., from greater than or equal to 1000° C. to less than or equal to 1050° C., or from greater than or equal to 1000° C. to less than or equal to 1030° C. The liquidus temperature was measured by the gradient furnace method. This method conforms to ASTM C829-81 Standard Practices for Measurement of Liquidus Temperature of Glass.

The amount of lithium in a glass composition also has an effect on the liquidus viscosity of the glass composition. Namely, as lithium replaces larger alkali cations, such as $Na^+$ and $K^+$, in an alkali aluminosilicate glass composition, the liquidus viscosity of the glass composition increases. In embodiments, the Log of liquidus viscosity is from greater than or equal to 3.50 poise to less than or equal to 6.00 poise, such as from greater than or equal to 3.75 poise to less than or equal to 6.00 poise, greater than or equal to 4.00 poise to less than or equal to 6.00 poise, greater than or equal to 4.25 poise to less than or equal to 6.00 poise, from greater than or equal to 4.50 poise to less than or equal to 6.00 poise, greater than or equal to 4.75 poise to less than or equal to 6.00 poise, greater than or equal to 5.00 poise to less than or equal to 6.00 poise, greater than or equal to 5.25 poise to less than or equal to 6.00 poise, greater than or equal to 5.50 poise to less than or equal to 6.00 poise, or greater than or equal to 5.75 poise to less than or equal to 6.00 poise. In other embodiments, the Log of liquidus viscosity is from greater than or equal to 3.50 poise to less than or equal to 5.75 poise, such as from greater than or equal to 3.50 poise to less than or equal to 5.50 poise, greater than or equal to 3.50 poise to less than or equal to 5.25 poise, greater than or equal to 3.50 poise to less than or equal to 5.00 poise, from greater than or equal to 3.50 poise to less than or equal to 4.75 poise, greater than or equal to 3.50 poise to less than or equal to 4.50 poise, greater than or equal to 3.50 poise to less than or equal to 4.25 poise, greater than or equal to 3.50 poise to less than or equal to 4.00 poise, or greater than or equal to 3.50 poise to less than or equal to 3.75 poise. The liquidus viscosity was measured by the gradient furnace method. This method conforms to ASTM C829-81 Standard Practices for Measurement of Liquidus Temperature of Glass.

The addition of lithium to the glass composition also affects the Young's modulus, shear modulus, and Poisson's ratio of the glass composition. Namely, as lithium replaces larger alkali cations, such as $Na^+$ and $K^+$, in an alkali aluminosilicate glass composition, the Young's modulus, shear modulus, and Poisson's ratio of the glass composition increases. In embodiments, the Young's modulus of a glass composition may be from greater than or equal to 10.00 mpsi to less than or equal to 12.00 mpsi, such as from greater than or equal to 10.20 mpsi to less than or equal to 11.80 mpsi, from greater than or equal to 10.40 mpsi to less than or equal to 11.60 mpsi, from greater than or equal to 10.60 mpsi to less than or equal to 11.40 mpsi, or from greater than or equal to 10.80 mpsi to less than or equal to 11.20 mpsi. In other embodiments, the Young's modulus of the glass composition may be from greater than or equal to 10.20 mpsi to less than or equal to 12.00 mpsi, from greater than or equal to 10.40 mpsi to less than or equal to 12.00 mpsi, from greater than or equal to 10.60 mpsi to less than or equal to 12.00 mpsi, from greater than or equal to 10.80 mpsi to less than or equal to 12.00 mpsi, from greater than or equal to 11.00 mpsi to less than or equal to 12.00 mpsi, from greater than or equal to 11.20 mpsi to less than or equal to 12.00 mpsi, from greater than or equal to 11.40 mpsi to less than or equal to 12.00 mpsi, from greater than or equal to 11.60 mpsi to less than or equal to 12.00 mpsi, or from greater than or equal to 11.80 mpsi to less than or equal to 12.00 mpsi. In yet other embodiments, the Young's modulus may be from greater than or equal to 10.00 mpsi to less than or equal to 11.80 mpsi, from greater than or equal to 10.00 mpsi to less than or equal to 11.60 mpsi, from greater than or equal to 10.00 mpsi to less than or equal to 11.40 mpsi, from greater than or equal to 10.00 mpsi to less than or equal to 11.20 mpsi, from greater than or equal to 10.00 mpsi to less than or equal to 11.00 mpsi, from greater than or equal to 10.00 mpsi to less than or equal to 10.80 mpsi, from greater than or equal to 10.00 mpsi to less than or equal to 10.60 mpsi, from greater than or equal to 10.00 mpsi to less than or equal to 10.40 mpsi, or from greater than or equal to 10.00 mpsi to less than or equal to 10.20 mpsi. Young's modulus was measured by Resonant Ultrasound Spectroscopy, which conforms to ASTM C623.

According to some embodiments, the glass composition may have a shear modulus of from greater than or equal to 4.00 mpsi to less than or equal to 5.00 mpsi, such as from greater than or equal to 4.10 mpsi to less than or equal to 4.90 mpsi, from greater than or equal to 4.20 mpsi to less than or equal to 4.80 mpsi, from greater than or equal to 4.30 mpsi to less than or equal to 4.70 mpsi, or from greater than or equal to 4.40 mpsi to less than or equal to 4.50 mpsi. In other embodiments the glass composition may have a shear modulus from greater than or equal to 4.10 mpsi to less than or equal to 5.00 mpsi, from greater than or equal to 4.20 mpsi to less than or equal to 5.00 mpsi, from greater than or equal to 4.30 mpsi to less than or equal to 5.00 mpsi, from greater than or equal to 4.40 mpsi to less than or equal to 5.00 mpsi, from greater than or equal to 4.50 mpsi to less than or equal to 5.00 mpsi, from greater than or equal to 4.60 mpsi to less than or equal to 5.00 mpsi, from greater than or equal to 4.70 mpsi to less than or equal to 5.00 mpsi, from greater than or equal to 4.80 mpsi to less than or equal to 5.00 mpsi, or from greater than or equal to 4.90 mpsi to less than or equal to 5.00 mpsi. In yet other embodiments, the glass composition may have a shear modulus from greater than or equal to 4.00 mpsi to less than or equal to 4.90 mpsi, from greater than or equal to 4.00 mpsi to less than or equal to 4.80 mpsi, from greater than or equal to 4.00 mpsi to less than or equal to 4.70 mpsi, from greater than or equal to 4.00 mpsi to less than or equal to 4.60 mpsi, from greater than or equal to 4.00 mpsi to less than or equal to 4.50 mpsi, from greater than or equal to 4.00 mpsi to less than or equal to 4.40 mpsi, from greater than or equal to 4.00 mpsi to less than or equal to 4.30 mpsi, from greater than or equal to 4.00 mpsi to less than or equal to 4.20 mpsi, or from greater than or equal to 4.00 mpsi to less than or equal to 4.10 mpsi. The shear modulus was measured by Resonant Ultrasound Spectroscopy, which conforms to ASTM C623.

In addition to the physical properties discussed above, adding lithium to the glass composition may increase the chemical durability of the glass composition in acids, bases, and water (hydrolytic durability). The durability of the glass composition in acid is measured according to DIN 12116, the durability of the glass composition in a base is measured according to ISO 695, and the hydrolytic durability of the glass composition is measure by ISO 720. In embodiments, the glass compositions have class 1 or class 2 durability in acid, base, and water. In other embodiments, the glass composition may have class 1 durability in acid, base, and water.

The durability of the glass composition in acid, according to embodiments, is from greater than or equal to 0.0 $mg/dm^2$ to less than or equal to 1.5 $mg/dm^2$, such as from greater than or equal to 0.0 $mg/dm^2$ to less than or equal to 1.2 $mg/dm^2$, from greater than or equal to 0.0 $mg/dm^2$ to less than or equal to 1.0 $mg/dm^2$, from greater than or equal to 0.0 $mg/dm^2$ to less than or equal to 0.8 $mg/dm^2$, from greater than or equal to 0.0 $mg/dm^2$ to less than or equal to 0.6 $mg/dm^2$, or from greater than or equal to 0.0 $mg/dm^2$ to less than or equal to 0.4 $mg/dm^2$. In other embodiments, the durability of the glass composition to acid may be from greater than or equal to 0.0 $mg/dm^2$ to less than or equal to 0.7 $mg/dm^2$, from greater than or equal to 0.0 $mg/dm^2$ to less than or equal to 0.6 $mg/dm^2$, from greater than or equal to 0.0 $mg/dm^2$ to less than or equal to 0.5 $mg/dm^2$, from greater than or equal to 0.0 $mg/dm^2$ to less than or equal to 0.4 $mg/dm^2$, from greater than or equal to 0.0 $mg/dm^2$ to less than or equal to 0.3 $mg/dm^2$, from greater than or equal to 0.0 $mg/dm^2$ to less than or equal to 0.2 $mg/dm^2$, or from greater than or equal to 0.0 $mg/dm^2$ to less than or equal to 0.1 $mg/dm^2$. In yet other embodiments, the durability of the glass composition to acid is from greater than or equal to 0.3 $mg/dm^2$ to less than or equal to 1.5 $mg/dm^2$, from greater than or equal to 0.4 $mg/dm^2$ to less than or equal to 1.2 $mg/dm^2$, from greater than or equal to 0.5 $mg/dm^2$ to less than or equal to 1.0 $mg/dm^2$, from greater than or equal to 0.6 $mg/dm^2$ to less than or equal to 0.9 $mg/dm^2$, or from greater than or equal to 0.7 $mg/dm^2$ to less than or equal to 0.8 $mg/dm^2$.

The durability of the glass composition in a base, according to embodiments, may be from greater than or equal to 0 $mg/dm^2$ to less than or equal to 175 $mg/dm^2$, such as from greater than or equal to 0 $mg/dm^2$ to less than or equal to 150 $mg/dm^2$, from greater than or equal to 0 $mg/dm^2$ to less than or equal to 125 $mg/dm^2$, or from greater than or equal to 0 $mg/dm^2$ to less than or equal to 100 $mg/dm^2$. In other embodiments, the durability of the glass composition a base is from greater than or equal to 0 $mg/dm^2$ to less than or equal to 75 $mg/dm^2$, from greater than or equal to 0 $mg/dm^2$ to less than or equal to 65 $mg/dm^2$, from greater than or equal to 0 $mg/dm^2$ to less than or equal to 55 $mg/dm^2$, from greater than or equal to 0 $mg/dm^2$ to less than or equal to 45 $mg/dm^2$, from greater than or equal to 0 $mg/dm^2$ to less than or equal to 35 $mg/dm^2$, from greater than or equal to 0 $mg/dm^2$ to less than or equal to 25 $mg/dm^2$, or from greater than or equal to 0 $mg/dm^2$ to less than or equal to 15 $mg/dm^2$.

The hydrolytic durability of the glass composition, according to embodiments, may be from greater than or equal to 0 $\mu g/g$ to less than or equal to 100 $\mu g/g$, such as from greater than or equal to 0 $\mu g/g$ to less than or equal to 90 $\mu g/g$, from greater than or equal to 0 $\mu g/g$ to less than or equal to 80 $\mu g/g$, from greater than or equal to 0 $\mu g/g$ to less than or equal to 70 $\mu g/g$, or from greater than or equal to 0 $\mu g/g$ to less than or equal to 75 $\mu g/g$. In other embodiments, the hydrolytic durability of the glass composition may from greater than or equal to 0 $\mu g/g$ to less than or equal to 62 $\mu g/g$, from greater than or equal to 0 $\mu g/g$ to less than or equal to 60 $\mu g/g$, from greater than or equal to 0 $\mu g/g$ to less than or equal to 55 $\mu g/g$, from greater than or equal to 0 $\mu g/g$ to less than or equal to 50 $\mu g/g$, from greater than or equal to 0 $\mu g/g$ to less than or equal to 45 $\mu g/g$, from greater than or equal to 0 $\mu g/g$ to less than or equal to 40 $\mu g/g$, from greater than or equal to 0 $\mu g/g$ to less than or equal to 35 $\mu g/g$, from greater than or equal to 0 $\mu g/g$ to less than or equal to 30 $\mu g/g$, or from greater than or equal to 0 $\mu g/g$ to less than or equal to 25 $\mu g/g$. In yet other embodiments, the hydrolytic durability of the glass composition may be from greater than or equal to 10 $\mu g/g$ to less than or equal to 100 $\mu g/g$, from greater than or equal to 20 $\mu g/g$ to less than or equal to 90 $\mu g/g$, from greater than or equal to 30 $\mu g/g$ to less than or equal to 80 $\mu g/g$, from greater than or equal to 40 $\mu g/g$ to less than or equal to 70 $\mu g/g$, or from greater than or equal to 50 $\mu g/g$ to less than or equal to 60 $\mu g/g$.

The distribution of alkali metals in the glass composition also has an effect on the durability of the glass. For instance, if the total amount of alkali metals in the glass composition is kept constant, the amount of $Na_2O$ to the total alkali metals, the amount of potassium to the total alkali metals, and the amount of lithium to the total alkali metals will affect the durability of the glass. In embodiments, the best hydrolytic durability and durability in a base, in accordance with ISO 720 and ISO 695, respectively, is achieved when the amount of Li$_2$O relative to the total alkali metal content is from greater than or equal to 60% to less than or equal to 70%, the amount of Na$_2$O to the total alkali metal content is from greater than or equal to 12% to less than or equal to 22%, and the amount of potassium relative to the total alkali metal content is from greater than or equal to 12% to less than or equal to 22%. In other embodiments, the amount of Li$_2$O relative to the total alkali metal content is from greater than or equal to 62% to less than or equal to 68%, the amount of Na$_2$O to the total alkali metal content is from greater than or equal to 14% to less than or equal to 20%, and the amount of potassium relative to the total alkali metal content is from greater than or equal to 14% to less than or equal to 20%. In still other embodiments, the amount of Li$_2$O relative to the total alkali metal content is from greater than or equal to 64% to less than or equal to 66%, the amount of Na$_2$O to the total alkali metal content is from greater than or equal to 15% to less than or equal to 18%, and the amount of potassium relative to the total alkali metal content is from greater than or equal to 15% to less than or equal to 18%. It should be understood that glasses having an alkali distribution outside of the above ranges may still have sufficient hydrolytic and basic durability.

As mentioned above, in embodiments, the Li containing aluminosilicate glass compositions can be strengthened, such as by ion exchange, making a glass that is damage resistant for applications such as, but not limited to, glass packaging for pharmaceuticals. It was found that adding lithium provides many advantages, as disclosed herein. In particular, the glass compositions of conventional glass packaging have high amounts of sodium and do not include high amounts of lithium. These conventional glasses do not have good compressive stress profiles, and the compressive stress, central tension, and depth of compression is limited in conventional glass compositions. By comparison, compressive stress profiles of boroaluminosilicate glasses are more ideal than the compressive stress profiles of conventional glasses for pharmaceutical packaging. However, as discusses above, including boron in the glass composition can lead to increased delamination, which is not acceptable in pharmaceutical packaging. Thus, glasses of embodiments disclosed herein are designed to have compressive stress profiles similar to those of boroaluminosilicate glasses without the use of boron.

To improve the compressive stress profile of the glass composition, sodium is replaced with lithium. By adding lithium to the glass composition, more control can be exercised over the ion exchange process because, for example, both lithium and sodium ions in the glass can be exchanged with either sodium or potassium ions, respectively, in the ion exchange solution. This allows a quicker ion exchange process that allows one to ion exchange through a decreasing slope of the ion exchange profile to the point of central tension. This allows one to tune the CT, DOC, DOL$_k$, and CS to values suitable for a particular purpose. For instance, as disclosed in more detail below, the CS, DOC, and CT can be tuned so that a glass fractures into multiple pieces upon impact, which allows one to more easily recognize the fracture, or a glass can be made to resist multiple fractures.

In view of the above, lithium is added to glass compositions to improve the compressive stress profiles of the glass. However, it was surprisingly found that the addition of lithium to the glass composition also improved the hydrolytic durability of the glass as well as decreasing the annealing temperature and softening point, as referred to above. Lithium increases the liquidus temperature and decreases liquidus viscosity of the glass. Therefore, the amount of lithium must be balanced so that the glass is still formable while providing the benefits discussed above. The effect that lithium has on the ion exchange ability of the glass is discusses below.

With reference to FIG. 1, the glass has a first region 120 and second region 122 under compressive stress. The compressive stress of the first region 120 extends from a surface 110 to a depth of the glass di. The compressive stress of the second region 122 extends from a surface 112 to a depth of the glass d$_2$. Between the first region 120 and the second region 122 is a third region 130 that is under tension and, therefore, comprises an internal tensile stress. The third region 130 extends from one of the first region 120 and the second region 122 to the other of the first region 120 or the second region 122. The depth of compression (DOC) as used herein refers to a depth from the surface of the glass article (e.g., 110) to the region of the glass article that is under tension (e.g., 130). In other words the DOC of a glass is measured from the surface of a glass to the point where the stress changes from compressive stress to tensile stress. Herein, the DOC is referred to as a portion of the entire thickness (t) of the glass. For instance, if the DOC is 25% of the glass thickness, it will be referred to herein as 0.25t.

Figure 2:
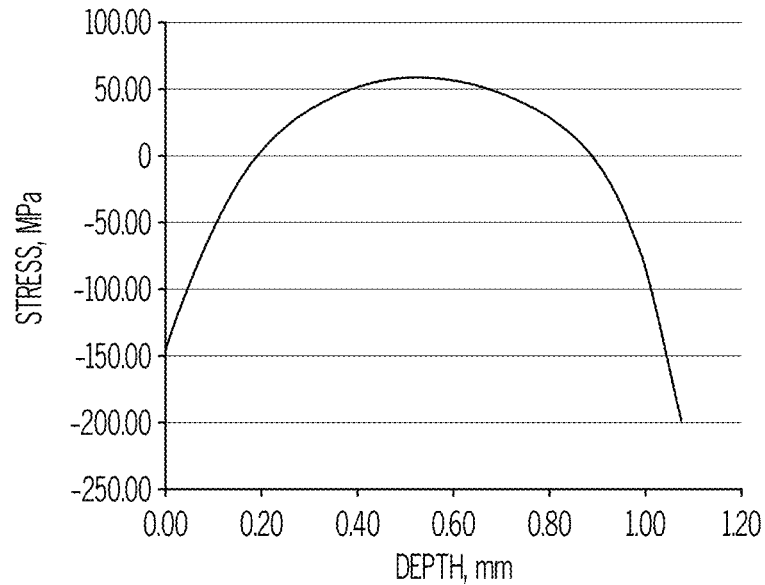
FIG. 2 is a plot of SCALP data for a compressive stress profile of a glass article according to embodiments disclosed and described herein.

The compressive stress (CS) has a maximum at the surface of the glass, and the CS varies with distance d from the surface according to a function, such as the stress function shown in FIG. 2. Referring again to FIG. 1, a first region 120 extends from first surface 110 to a depth d$_1$ and a second region 122 extends from a second surface 112 to a depth d$_2$. Together, these segments define a surface compression or surface CS of glass 100. In some embodiments, the surface CS is at least 350 MPa, such as at least 375 MPa, at least 400 MPa, at least 425 MPa, at least 450 MPa, or at least 475 MPa. In other embodiments, the surface CS is less than or equal to 525 MPa, such as less than or equal to 500 MPa. In yet other embodiments, the surface CS may be from greater than or equal to 350 MPa to less than or equal to 500 MPa, such as from greater than or equal to 375 MPa to less than or equal to 500 MPa, from greater than or equal to 400 MPa to less than or equal to 500 MPa, from greater than or equal to 425 MPa to less than or equal to 500 MPa, from greater than or equal to 450 MPa to less than or equal to 500 MPa, or from greater than or equal to 475 MPa to less than or equal to 500 MPa.

The depth of layer DOL$_k$, as used herein refers to the depth that potassium diffuses into the glass from the ion exchange process. The DOL$_k$ of each of first and second regions 120, 122 is from greater than or equal to 2 µm to less than or equal to 45 µm, such as from greater than or equal to 5 µm to less than or equal to 40 µm, from greater than or equal to 10 µm to less than or equal to 35 µm, from greater than or equal to 15 µm to less than or equal to 30 µm, or from greater than or equal to 20 µm to less than or equal to 25 µm. In other embodiments, the DOL$_k$ of each of the first and second regions 120, 122 is from greater than or equal to 10 µm to less than or equal to 40 µm, from greater than or equal to 15 µm to less than or equal to 40 µm, from greater than or equal to 20 µm to less than or equal to 40 µm, from greater than or equal to 25 µm to less than or equal to 40 µm, from greater than or equal to 30 µm to less than or equal to 40 µm, or from greater than or equal to 35 µm to less than or equal to 40 µm. In yet other embodiments, the DOL$_k$ of each of the first and second regions 120, 122 is from greater than or equal to 2 µm to less than or equal to 40 µm, from greater than or equal to 2 µm to less than or equal to 35 µm, from greater than or equal to 2 µm to less than or equal to 30 µm, from greater than or equal to 2 µm to less than or equal to 25 µm, from greater than or equal to 2 µm to less than or equal to 20 µm, from greater than or equal to 2 µm to less than or equal to 15 µm, from greater than or equal to 2 µm to less than or equal to 10 µm, or from greater than or equal to 2 µm to less than or equal to 5 µm.

It has also been determined that amount of lithium has an effect on the diffusivity of potassium ions into the glass, which can have an effect on the $DOL_k$ of the glass. Generally, as the amount of lithium in the glass increases, the diffusivity of potassium into the glass will decrease. Without being bound to any particular theory, generally potassium ions in the ion exchange solution will exchange with sodium in the glass matrix. Thus, as sodium in the glass matrix is replaced with lithium, there is less sodium in the glass matrix to be replaced with potassium ions from the ion exchange solution, thereby decreasing the diffusivity of potassium ions. In embodiments, the diffusivity of potassium into the glass at 420° C. is from greater than or equal to 0.50 $µm^2$/hr to less than or equal to 15.00 $µm^2$/hr, such as from greater than or equal to 0.60 $µm^2$/hr to less than or equal to 14.50 $µm^2$/hr, greater than or equal to 0.70 $µm^2$/hr to less than or equal to 14.00 $µm^2$/hr, greater than or equal to 1.00 $µm^2$/hr to less than or equal to 13.50 $µm^2$/hr, greater than or equal to 1.25 $µm^2$/hr to less than or equal to 13.00 $µm^2$/hr, from greater than or equal to 1.50 $µm^2$/hr to less than or equal to 12.50 $µm^2$/hr, greater than or equal to 2.00 $µm^2$/hr to less than or equal to 11.50 $µm^2$/hr, greater than or equal to 2.25 $µm^2$/hr to less than or equal to 11.00 $µm^2$/hr, greater than or equal to 2.50 $µm^2$/hr to less than or equal to 10.50 $µm^2$/hr, greater than or equal to 2.75 $µm^2$/hr to less than or equal to 10.00 $µm^2$/hr, greater than or equal to 3.00 $µm^2$/hr to less than or equal to 9.50 $µm^2$/hr, greater than or equal to 3.25 $µm^2$/hr to less than or equal to 9.00 $µm^2$/hr, greater than or equal to 3.50 $µm^2$/hr to less than or equal to 8.50 $µm^2$/hr, greater than or equal to 3.75 $µm^2$/hr to less than or equal to 8.00 $µm^2$/hr, greater than or equal to 4.00 $µm^2$/hr to less than or equal to 7.50 $µm^2$/hr, greater than or equal to 4.25 $µm^2$/hr to less than or equal to 7.00 $µm^2$/hr, greater than or equal to 4.50 $µm^2$/hr to less than or equal to 6.50 $µm^2$/hr, or greater than or equal to 4.75 $µm^2$/hr to less than or equal to 6.00 $µm^2$/hr. In other embodiments, the diffusivity of potassium into the glass at 420° C. is from greater than or equal to 6.00 $µm^2$/hr to less than or equal to 8.00 $µm^2$/hr, greater than or equal to 6.25 $µm^2$/hr to less than or equal to 7.75 $µm^2$/hr, from greater than or equal to 6.50 $µm^2$/hr to less than or equal to 7.50 $µm^2$/hr, or greater than or equal to 6.75 $µm^2$/hr to less than or equal to 7.25 $µm^2$/hr.

As mentioned above, in embodiments, the Li containing glass compositions can be strengthened, such as by ion exchange, making a glass that is damage resistant. With reference to FIG. 1, the glass has a first and second regions under compressive stress (e.g., layers 120, 122 in FIG. 1) extending from the surface to a depth of compression (DOC) of the glass and a third region (e.g., 130 in FIG. 1) under a tensile stress extending from the DOC into the central or interior region of the glass. Central tension (CT) is the maximum tensile stress, which is generally located at the center of the third region 130. As used herein, DOC refers to the depth at which the stress within the glass article changes from compressive to tensile. At the DOC, the stress crosses from a negative (compressive) stress to a positive (tensile) stress and thus exhibits a stress value of zero. The CT and DOC values are measured using a scattered light polariscope (SCALP) technique known in the art.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) has a maximum at the surface of the glass, and the CS varies with distance d from the surface according to a function. Referring again to FIG. 1, a first region 120 extends from first surface 110 to a depth $d_1$ and a second segment 122 extends from a second surface 112 to a depth $d_2$. Together, these segments define a compression or CS of glass 100. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16.

In embodiments, the glass composition may have a CT from greater than or equal to 5 MPa to less than or equal to 160 MPa, such as from greater than or equal to 10 MPa to less than or equal to 150 MPa, from greater than or equal to 20 MPa to less than or equal to 140 MPa, from greater than or equal to 30 MPa to less than or equal to 140 MPa, from greater than or equal to 40 MPa to less than or equal to 130 MPa, from greater than or equal to 50 MPa to less than or equal to 120 MPa, from greater than or equal to 60 MPa to less than or equal to 110 MPa, from greater than or equal to 60 MPa to less than or equal to 100 MPa, or from greater than or equal to 70 MPa to less than or equal to 90 MPa. In other embodiments, the glass composition may have a CT from greater than or equal to 10 MPa to less than or equal to 160 MPa, from greater than or equal to 20 MPa to less than or equal to 160 MPa, from greater than or equal to 30 MPa to less than or equal to 160 MPa, from greater than or equal to 40 MPa to less than or equal to 160 MPa, from greater than or equal to 50 MPa to less than or equal to 160 MPa, from greater than or equal to 60 MPa to less than or equal to 160 MPa, from greater than or equal to 70 MPa to less than or equal to 160 MPa, from greater than or equal to 80 MPa to less than or equal to 160 MPa, from greater than or equal to 90 MPa to less than or equal to 160 MPa, from greater than or equal to 100 MPa to less than or equal to 160 MPa, from greater than or equal to 110 MPa to less than or equal to 160 MPa, from greater than or equal to 120 MPa to less than or equal to 160 MPa, from greater than or equal to 130 MPa to less than or equal to 160 MPa, or from greater than or equal to 140 MPa to less than or equal to 160 MPa. In yet other embodiments, the glass composition may have a CT from greater than or equal to 5 MPa to less than or equal to 150 MPa, from greater than or equal to 5 MPa to less than or equal to 140 MPa, from greater than or equal to 5 MPa to less than or equal to 130 MPa, from greater than or equal to 5 MPa to less than or equal to 120 MPa, from greater than or equal to 5 MPa to less than or equal to 110 MPa, from greater than or equal to 5 MPa to less than or equal to 100 MPa, from greater than or equal to 5 MPa to less than or equal to 90 MPa, from greater than or equal to 5 MPa to less than or equal to 80 MPa, from greater than or equal to 5 MPa to less than or equal to 70 MPa, from greater than or equal to 5 MPa to less than or equal to 60 MPa, from greater than or equal to 5 MPa to less than or equal to 50 MPa, from greater than or equal to 5 MPa to less than or equal to 40 MPa, from greater than or equal to 5 MPa to less than or equal to 30 MPa, from greater than or equal to 5 MPa to less than or equal to 20 MPa, or from greater than or equal to 5 MPa to less than or equal to 10 MPa.

In embodiments, the glass compositions may have a depth of compression (DOC) relative to the total thickness (t) of the glass article that is formed. In some embodiments, the DOC may be from greater than or equal to 0.05t to less than or equal to 0.25t, such as from greater than or equal to 0.10t to less than or equal to 0.20t, or greater than or equal to 0.15t to less than or equal to 0.20t. In other embodiments, the DOC may be from greater than or equal to 0.08t to less than or equal to 0.25t, greater than or equal to 0.10t to less than or equal to 0.25t, greater than or equal to 0.12t to less than or equal to 0.25t, greater than or equal to 0.14t to less than or equal to 0.25t, greater than or equal to 0.16t to less than or equal to 0.25t, greater than or equal to 0.18t to less than or equal to 0.25t, greater than or equal to 0.20t to less than or equal to 0.25t, or greater than or equal to 0.22t to less than or equal to 0.25t. In still other embodiments, the DOC may be from greater than or equal to 0.05t to less than or equal to 0.22t, greater than or equal to 0.05t to less than or equal to 0.20t, greater than or equal to 0.05t to less than or equal to 0.18t, greater than or equal to 0.05t to less than or equal to 0.16t, greater than or equal to 0.05t to less than or equal to 0.14t, greater than or equal to 0.05t to less than or equal to 0.12t, greater than or equal to 0.05t to less than or equal to 0.10t, greater than or equal to 0.05t to less than or equal to 0.08t, or greater than or equal to 0.05t to less than or equal to 0.06t.

Compressive stress layers may be formed in the glass by exposing the glass to an ion exchange solution. In embodiments, the ion exchange solution may be molten nitrate salt, molten phosphate salt, or a molten sulfate salt. In some embodiments, the ion exchange solution may comprise molten $KNO_3$, molten $NaNO_3$, or combinations thereof. In some embodiments, molten $LiNO_3$ may be added to the molten $KNO_3$, molten $NaNO_3$, or combined molten $KNO_3$ and $NaNO_3$. In certain embodiments, the ion exchange solution may comprise about 100% molten $KNO_3$, about 95% molten $KNO_3$, about 90% molten $KNO_3$, about 80% molten $KNO_3$, about 70% molten $KNO_3$, or about 60% molten $KNO_3$. In certain embodiments, the ion exchange solution may comprise about 5% molten $NaNO_3$, about 10% molten $NaNO_3$, about 20% molten $NaNO_3$, about 30% molten $NaNO_3$, or about 40% molten $NaNO_3$. In other embodiments, the ion exchange solution may comprise about 80% molten $KNO_3$ and about 20% molten $NaNO_3$, about 75% molten $KNO_3$ and about 25% molten $NaNO_3$, about 70% molten $KNO_3$ and about 30% molten $NaNO_3$, about 65% molten $KNO_3$ and about 35% molten $NaNO_3$, or about 60% molten $KNO_3$ and about 40% molten $NaNO_3$.

The glass composition may be exposed to the ion exchange solution by dipping a glass article made from the glass composition into a bath of the ion exchange solution, spraying the ion exchange solution onto a glass article made from the glass composition, or otherwise physically applying the ion exchange solution to a glass article made from the glass composition. Upon exposure to the glass composition, the ion exchange solution may, according to embodiments, be at a temperature from greater than or equal to 350° C. to less than or equal to 500° C., such as from greater than or equal to 360° C. to less than or equal to 490° C., from greater than or equal to 370° C. to less than or equal to 480° C., from greater than or equal to 380° C. to less than or equal to 470° C., from greater than or equal to 390° C. to less than or equal to 460° C., or from greater than or equal to 400° C. to less than or equal to 420° C. In embodiments, the glass composition may be exposed to the ion exchange solution for a duration from greater than or equal to 3 hours to less than or equal to 48 hours, such as from greater than or equal to 8 hours to less than or equal to 44 hours, from greater than or equal to 12 hours to less than or equal to 40 hours, from greater than or equal to 16 hours to less than or equal to 36 hours, from greater than or equal to 20 hours to less than or equal to 32 hours, or from greater than or equal to 24 hours to less than or equal to 28 hours.

In some embodiments, a two-step ion exchange process may be used to allow more control over the ion exchange profile of a strengthened glass. In embodiments, the first step of the ion exchange may include exposing the glass to any ion exchange solution described above, and the second step may include exposing the glass to any ion exchange solution described above. In some embodiments, the ion exchange solution in the first may be compositionally different from the ion exchange solution in the second step. In other embodiments, the ion exchange solution in the first step may be compositionally the same as the ion exchange solution in the second step. It should also be realized that, in embodiments, the temperature and/or duration of the ion exchange in the first step may be the same as or different from the temperature and/or duration of the ion exchange in the second step, according to various embodiments. In a particular embodiment, in the first step, the glass composition is exposed to an ion exchange solution comprising 100% molten $NaNO_3$ at a temperature and for a duration described above. Subsequently, the glass composition is rinsed, dried, and exposed to a second ion exchange solution comprising 100% molten $KNO_3$. This two-step ion exchange process may achieve a deeper DOC and greater surface compressive stress. The improved ion exchange ability of Li containing aluminosilicate glass further enables the achievement of greater scratch resistance, increases bearing capability, and improved vial filling line performance.

Compared to glass compositions with sodium as the only alkali or other Na-rich glasses Li containing aluminosilicate glasses obtain improved ion exchange ability. For instance, in Li containing aluminosilicate glasses, after ion exchange, crack resistance during processing and usage is improved. With an increased amount of $Li_2O$ in glass compositions, greater central tension and surface compressive stress can be obtained in relatively short time. This decreases the time used for ion exchange, and saves costs in ion exchange processes.

In some embodiments, the ion exchange process may be controlled to provide increased damage resistance to the glass composition. This increased damage resistance is particularly useful when the glass composition is used as pharmaceutical packaging. In particular, the flaw population for this type of product may be uncontrolled and varies widely with flaws being induced from initial manufacture of tubing, through the forming process, as well as subsequent handling. Glass compositions having ion exchange profiles similar to those disclosed, and with various properties as disclosed above provide this increased damage resistance. The above properties and ion exchange process conditions can be used to create a spike of compression in the surface of the glass, which can increase the surface strength of the glass. In embodiments where crack generation is to be limited, the stored energy may be less than or equal to about 15.00 $J/m^2$, less than or equal to about 14.50 $J/m^2$, less than or equal to about 14.00 $J/m^2$, less than or equal to about 13.50 $J/m^2$, less than or equal to about 13.00 $J/m^2$, less than or equal to about 12.50 $J/m^2$, less than or equal to about 12.00 $J/m^2$, less than or equal to about 11.50 $J/m^2$, less than or equal to about 11.00 $J/m^2$, less than or equal to about 10.50 J/m², or less than or equal to about 10.00 J/m². However, it may be desirable to increase the stored energy in a glass composition so that when the glass cracks, multiple cracks are formed. This will allow users to better identify when cracks are present in the glass article formed from the glass composition, which may be beneficial in pharmaceutical packaging where fractures in the glass may cause unwanted contamination. In such embodiments, the stored energy in the glass composition is greater than or equal to 17.00 J/m², such as greater than or equal to 18.00 J/m², greater than or equal to 19.00 J/m², greater than or equal to 20.00 J/m², greater than or equal to 21.00 J/m², greater than or equal to 22.00 J/m², greater than or equal to 23.00 J/m², greater than or equal to 24.00 J/m², or greater than or equal to 26.00 J/m². In any of the above embodiments, the stored energy may be less than or equal to 50.00 J/m². The stored strain energy ($\Sigma_0$) is calculated from the following equation:

$$\sum_0 \frac{1-\Upsilon}{E} \int_{-z*}^{z*} \sigma^2 dz$$

where z* is (t/2)−d; σ is tension; E is Young's modulus; and γ is Poisson's ratio.

According to a first clause a glass pharmaceutical package has a glass composition comprising: from greater than or equal to 68.00 mol % to less than or equal to 81.00 mol % $SiO_2$; from greater than or equal to 4.00 mol % to less than or equal to 11.00 mol % $Al_2O_3$; from greater than or equal to 0.10 mol % to less than or equal to 16.00 mol % $Li_2O$; from greater than or equal to 0.10 mol % to less than or equal to 12.00 mol % $Na_2O$; from greater than or equal to 0.00 mol % to less than or equal to 5.00 mol % $K_2O$; from greater than or equal to 0.10 mol % to less than or equal to 8.00 mol % MgO; from greater than or equal to 0.10 mol % to less than or equal to 5.00 mol % CaO; from greater than or equal to 0.00 mol % to less than or equal to 0.20 mol % fining agent, wherein the glass pharmaceutical package is delamination resistant, and the glass pharmaceutical package has class 1 or class 2 chemical durability in acid, base, and water.

A second clause includes the glass pharmaceutical package according to the first clause, wherein the glass fining agent is selected from the group consisting of $SnO_2$, $CeO_2$, $As_2O_3$, $Sb_2O_3$, $Cl^-$, $S^-$, $F^-$, or $Fe_2O_3$.

A third clause includes the glass pharmaceutical package according to any one of the first and second clauses, wherein the glass fining agent is $SnO_2$.

A fourth clause includes the glass pharmaceutical package according to any one of first to third clauses, wherein the glass pharmaceutical package is substantially free of at least one of $B_2O_3$, SrO, BaO, $ZrO_2$, and combinations thereof.

A fifth clause includes the glass pharmaceutical package according to any one of first to fourth clauses, wherein the glass pharmaceutical package is substantially free of $B_2O_3$, SrO, BaO, and $ZrO_2$.

A sixth clause includes the glass pharmaceutical package according to any one of first to fifth clauses, wherein the glass pharmaceutical package comprises from greater than or equal to 1.50 mol % to less than or equal to 16.00 mol % $Li_2O$.

A seventh clause includes the glass pharmaceutical package according to any one of first to sixth clauses, wherein the glass pharmaceutical package comprises from greater than or equal to 0.10 mol % to less than or equal to 7.50 mol % MgO.

An eighth clause includes the glass pharmaceutical package according to any one of first to seventh clauses, wherein the glass pharmaceutical package comprises a ratio of $(Li_2O+Na_2O+K_2O)/(SiO_2+Al_2O_3)$ that is from greater than or equal to 0.05 to less than or equal to 0.50.

A ninth clause includes the glass pharmaceutical package according to any one of first to eighth clauses, wherein the glass pharmaceutical package comprises a ratio of $(Li_2O+Na_2O+K_2O)/(SiO_2+Al_2O_3)$ that is from greater than or equal to 0.05 to less than or equal to 0.15.

A tenth clause includes the glass pharmaceutical package according to any one of first to ninth clauses, wherein the glass pharmaceutical package comprises a density from greater than or equal to 2.25 g/cm³ to less than or equal to 2.50 g/cm³.

An eleventh clause includes the glass pharmaceutical package according to any one of first to tenth clauses, wherein the glass pharmaceutical package comprises a molar volume from greater than or equal to 24.00 cm³/mol to less than or equal to 27.00 cm³/mol.

A twelfth clause includes the glass pharmaceutical package according to any one of first to eleventh clauses, wherein the glass pharmaceutical package has a delamination factor less than or equal to 10.

A thirteenth clause includes the glass pharmaceutical package according to any one of first to twelfth clauses, wherein the glass pharmaceutical package comprises a strain point from greater than or equal to 450° C. to less than or equal to 625° C.

A fourteenth clause includes the glass pharmaceutical package according to any one of first to thirteenth clauses, wherein the glass pharmaceutical package comprises an annealing point from greater than or equal to 500° C. to less than or equal to 675° C.

A fifteenth clause includes the glass pharmaceutical package according to any one of first to fourteenth clauses, wherein the glass pharmaceutical package comprises a softening point from greater than or equal to 750° C. to less than or equal to 950° C.

A sixteenth clause includes the glass pharmaceutical package according to any one of first to fifteenth clauses, wherein the glass pharmaceutical package comprises a CTE from greater than or equal to 4.20 ppm/° C. to less than or equal to 7.00 ppm/° C.

A seventeenth clause includes the glass pharmaceutical package according to any one of first to sixteenth clauses, wherein the glass pharmaceutical package comprises a liquidus viscosity Log from greater than or equal to 3.50 poise to less than or equal to 6.00 poise.

An eighteenth clause includes the glass pharmaceutical package according to any one of first to seventeenth clauses, wherein the glass pharmaceutical package comprises a Young's modulus from greater than or equal to 10.00 mpsi to less than or equal to 12.00 mpsi.

A nineteenth clause includes the glass pharmaceutical package according to any one of first to eighteenth clauses, wherein the glass pharmaceutical package comprises a shear modulus from greater than or equal to 4.00 mpsi to less than or equal to 5.00 mpsi.

A twentieth clause includes the glass pharmaceutical package according to any one of first to nineteenth clauses, wherein the glass pharmaceutical package comprises a chemical durability in acid as measured by DIN 12116 from greater than or equal to 0.0 mg/dm² to less than or equal to 1.5 mg/dm².

A twenty first clause includes the glass pharmaceutical package according to any one of first to twentieth clauses, wherein the glass pharmaceutical package comprises a chemical durability in acid as measured by DIN 12116 from greater than or equal to 0.0 mg/dm² to less than or equal to 0.7 mg/dm².

A twenty second clause includes the glass pharmaceutical package according to any one of first to twenty first clauses, wherein the glass pharmaceutical package comprises a chemical durability in base as measured by ISO 695 from greater than or equal to 0 mg/dm² to less than or equal to 175 mg/dm².

A twenty third clause includes the glass pharmaceutical package according to any one of first to twenty second clauses, wherein the glass pharmaceutical package comprises a chemical durability in base as measured by ISO 695 from greater than or equal to 0 mg/dm² to less than or equal to 75 mg/dm².

A twenty fourth clause includes the glass pharmaceutical package according to any one of first to twenty third clauses, wherein the glass pharmaceutical package comprises a chemical durability in water as measured by ISO 720 from greater than or equal to 0 μg/g to less than or equal to 100 μg/g.

A twenty fifth clause includes the glass pharmaceutical package according to any one of first to twenty fourth clauses, wherein the glass pharmaceutical package comprises a chemical durability in water as measured by ISO 720 from greater than or equal to 0 μg/g to less than or equal to 62 μg/g.

A twenty sixth clause includes the glass pharmaceutical package according to any one of first to twenty fifth clauses, wherein the glass pharmaceutical package is strengthened by ion exchange and comprises a surface compressive stress of at least 350 MPa.

A twenty seventh clause includes the glass pharmaceutical package according to any one of first to twenty sixth clauses, wherein the glass pharmaceutical package is strengthened by ion exchange and comprises a depth of compression from greater than or equal to 0.05t to less than or equal to 0.25t.

A twenty eighth clause includes the glass pharmaceutical package according to any one of first to twenty seventh clauses, wherein the glass pharmaceutical package is strengthened by ion exchange and comprises a central tension from greater than or equal to 5 MPa to less than or equal to 160 MPa.

A twenty ninth clause includes the glass pharmaceutical package according to any one of first to twenty eighth clauses, wherein the glass pharmaceutical package comprises a diffusivity of potassium ions at 420° C. is from greater than or equal to 0.50 μm²/hr to less than or equal to 15.00 μm²/hr.

A thirtieth clause includes the glass pharmaceutical package according to any one of first to twenty ninth clauses, wherein the glass pharmaceutical package is strengthened by ion exchange and comprises a stored energy of less than or equal to about 15.00 J/m².

A thirty first clause includes the glass pharmaceutical package according to any one of first to thirtieth clauses, wherein the glass pharmaceutical package is strengthened by ion exchange and comprises a stored energy of greater than or equal to 17.00 J/m².

A thirty second clause includes a glass pharmaceutical package having a glass composition comprising: from greater than or equal to 68.00 mol % to less than or equal to 81.00 mol % $SiO_2$; from greater than or equal to 6.10 mol % to less than or equal to 7.00 mol % $Al_2O_3$; from greater than or equal to 3.10 mol % to less than or equal to 6.60 mol % $Li_2O$; from greater than or equal to 1.40 mol % to less than or equal to 3.00 mol % $Na_2O$; from greater than or equal to 0.00 mol % to less than or equal to 5.00 mol % $K_2O$; from greater than or equal to 5.10 mol % to less than or equal to 7.50 mol % MgO; from greater than or equal to 0.10 mol % to less than or equal to 5.00 mol % CaO; from greater than or equal to 0.00 mol % to less than or equal to 0.20 mol % fining agent, wherein the glass pharmaceutical package is delamination resistant, the glass pharmaceutical package has class 1 or class 2 chemical durability in acid, base, and water, and the glass pharmaceutical package is substantially free of $B_2O_3$, SrO, BaO, and $ZrO_2$.

A thirty third clause includes the glass pharmaceutical package according to the thirty second clause, wherein the glass fining agent is selected from the group consisting of $SnO_2$, $CeO_2$, $As_2O_3$, $Sb_2O_3$, $Cl^-$, $S^-$, $F^-$, or $Fe_2O_3$.

A thirty fourth clause includes the glass pharmaceutical package according to any one of the thirty second and thirty third clauses, wherein the glass fining agent is $SnO_2$.

A thirty fifth clause includes the glass pharmaceutical package according to any one of the thirty second to thirty fourth clauses, wherein the glass pharmaceutical package comprises a ratio of $(Li_2O+Na_2O+K_2O)/(SiO_2+Al_2O_3)$ that is greater than or equal to 0.05 to less than or equal to 0.50.

A thirty sixth clause includes the glass pharmaceutical package according to any one of the thirty second to thirty fifth clauses, wherein the glass pharmaceutical package a ratio of $(Li_2O+Na_2O+K_2O)/(SiO_2+Al_2O_3)$ that is greater than or equal to 0.05 to less than or equal to 0.15.

A thirty seventh clause includes the glass pharmaceutical package according to any one of the thirty second to thirty sixth clauses, wherein the glass pharmaceutical package comprises a density from greater than or equal to 2.25 g/cm³ to less than or equal to 2.50 g/cm³.

A thirty eighth clause includes the glass pharmaceutical package according to any one of the thirty second to thirty seventh clauses, wherein the glass pharmaceutical package comprises a molar volume from greater than or equal to 24.00 cm³/mol to less than or equal to 27.00 cm³/mol.

A thirty ninth clause includes the glass pharmaceutical package according to any one of the thirty second to thirty eighth clauses, wherein the glass pharmaceutical package has a delamination factor less than or equal to 10.

A fortieth clause includes the glass pharmaceutical package according to any one of the thirty second to thirty ninth clauses, wherein the glass pharmaceutical package comprises a strain point from greater than or equal to 450° C. to less than or equal to 625° C.

A forty first clause includes the glass pharmaceutical package according to any one of the thirty second to fortieth clauses, wherein the glass pharmaceutical package comprises an annealing point from greater than or equal to 500° C. to less than or equal to 675° C.

A forty second clause includes the glass pharmaceutical package according to any one of the thirty second to forty first clauses, wherein the glass pharmaceutical package comprises a softening point from greater than or equal to 750° C. to less than or equal to 950° C.

A forty third clause includes the glass pharmaceutical package according to any one of the thirty second to forty second clauses, wherein the glass pharmaceutical package comprises a CTE from greater than or equal to 4.20 ppm/° C. to less than or equal to 7.00 ppm/° C.

A forty fourth clause includes the glass pharmaceutical package according to any one of the thirty second to forty third clauses, wherein the glass pharmaceutical package comprises a liquidus viscosity Log from greater than or equal to 3.50 poise to less than or equal to 6.00 poise.

A forty fifth clause includes the glass pharmaceutical package according to any one of the thirty second to forty fourth clauses, wherein the glass pharmaceutical package comprises a Young's modulus from greater than or equal to 10.00 mpsi to less than or equal to 12.00 mpsi.

A forty sixth clause includes the glass pharmaceutical package according to any one of the thirty second to forty fifth clauses, wherein the glass pharmaceutical package comprises a shear modulus from greater than or equal to 4.00 mpsi to less than or equal to 5.00 mpsi.

A forty seventh clause includes the glass pharmaceutical package according to any one of the thirty second to forty sixth clauses, wherein the glass pharmaceutical package comprises a chemical durability in acid as measured by DIN 12116 from greater than or equal to 0.0 mg/dm$^2$ to less than or equal to 1.5 mg/dm$^2$.

A forty eighth clause includes the glass pharmaceutical package according to any one of the thirty second to forty seventh clauses, wherein the glass pharmaceutical package comprises a chemical durability in acid as measured by DIN 12116 from greater than or equal to 0.0 mg/dm$^2$ to less than or equal to 0.7 mg/dm$^2$.

A forty ninth clause includes the glass pharmaceutical package according to any one of the thirty second to forty eighth clauses, wherein the glass pharmaceutical package comprises a chemical durability in base as measured by ISO 695 from greater than or equal to 0 mg/dm$^2$ to less than or equal to 175 mg/dm$^2$.

A fiftieth clause includes the glass pharmaceutical package according to any one of the thirty second to forty ninth clauses, wherein the glass pharmaceutical package comprises a chemical durability in base as measured by ISO 695 from greater than or equal to 0 mg/dm$^2$ to less than or equal to 75 mg/dm$^2$.

A fifty first clause includes the glass pharmaceutical package according to any one of the thirty second to fiftieth clauses, wherein the glass pharmaceutical package comprises a chemical durability in water as measured by ISO 720 from greater than or equal to 0 μg/g to less than or equal to 100 μg/g.

A fifty second clause includes the glass pharmaceutical package according to any one of the thirty second to fifty first clauses, wherein the glass pharmaceutical package comprises a chemical durability in water as measured by ISO 720 from greater than or equal to 0 μg/g to less than or equal to 62 μg/g.

A fifty third clause includes the glass pharmaceutical package according to any one of the thirty second to fifty second clauses, wherein the glass pharmaceutical package is strengthened by ion exchange and comprises a surface compressive stress of at least 350 MPa.

A fifty fourth clause includes the glass pharmaceutical package according to any one of the thirty second to fifty third clauses, wherein the glass pharmaceutical package comprises is strengthened by ion exchange and a depth of compression from greater than or equal to 0.05t to 0.25t.

A fifty fifth clause includes the glass pharmaceutical package according to any one of the thirty second to fifty fourth clauses, wherein the glass pharmaceutical package is strengthened by ion exchange and comprises a central tension from greater than or equal to 5 MPa to less than or equal to 160 MPa.

A fifty sixth clause includes the glass pharmaceutical package according to any one of the thirty second to fifty fifth clauses, wherein the glass pharmaceutical package comprises a diffusivity of potassium ions at 420° C. is from greater than or equal to 0.50 μm$^2$/hr to less than or equal to 15.00 μm$^2$/hr.

A fifty seventh clause includes the glass pharmaceutical package according to any one of the thirty second to fifty sixth clauses, wherein the glass pharmaceutical package is strengthened by ion exchange and comprises a stored energy of less than or equal to about 15.00 J/m$^2$.

A fifty eighth clause includes the glass pharmaceutical package according to any one of the thirty second to fifty seventh clauses, wherein the glass pharmaceutical package is strengthened by ion exchange and comprises a stored energy of greater than or equal to 17.00 J/m$^2$.

EXAMPLES

Embodiments will be further clarified by the following examples. It should be understood that these examples are not limiting to the embodiments described above.

Example 1

Glass Samples 1-38 were formed from compositions provided in TABLE 1 below. The glasses having compositions as listed in TABLE 1 below were made from batches of conventional source or starting materials and were melted in a platinum crucible at temperatures from 1570° C. to 1650° C. in air with an aluminum cover.

TABLE 1

| Sample | mol % | | | | | | | |
|---|---|---|---|---|---|---|---|---|
| | SiO$_2$ | Al$_2$O$_3$ | Na$_2$O | K$_2$O | MgO | CaO | SnO$_2$ | Li$_2$O |
| 1 | 76.3 | 6.4 | 9.8 | 0.03 | 5.4 | 0.2 | 0.2 | 1.7 |
| 2 | 76.5 | 6.4 | 7.9 | 0.02 | 5.3 | 0.2 | 0.2 | 3.6 |
| 3 | 76.3 | 6.4 | 5.9 | 0.02 | 5.4 | 0.2 | 0.2 | 5.6 |
| 4 | 76.4 | 6.4 | 3.9 | 0.02 | 5.3 | 0.2 | 0.2 | 7.5 |
| 5 | 76.3 | 6.4 | 2.0 | 0.03 | 5.3 | 0.2 | 0.2 | 9.5 |
| 6 | 76.7 | 6.5 | 2.1 | 0.03 | 4.9 | 0.2 | 0.2 | 9.5 |
| 7 | 74.2 | 6.3 | 4.0 | 0.03 | 5.3 | 0.2 | 0.2 | 9.7 |
| 8 | 78.1 | 6.4 | 4.0 | 0.02 | 5.3 | 0.2 | 0.2 | 5.8 |
| 9 | 76.2 | 4.4 | 4.0 | 0.03 | 5.3 | 0.2 | 0.2 | 9.7 |
| 10 | 76.3 | 8.3 | 4.0 | 0.03 | 5.4 | 0.2 | 0.2 | 5.7 |
| 11 | 76.2 | 6.4 | 4.0 | 2.04 | 5.3 | 0.2 | 0.2 | 5.6 |
| 12 | 76.2 | 6.4 | 3.9 | 4.02 | 5.3 | 0.2 | 0.2 | 3.7 |
| 13 | 76.3 | 6.3 | 4.0 | 0.08 | 3.3 | 0.2 | 0.2 | 9.6 |
| 14 | 76.3 | 6.4 | 4.0 | 0.04 | 7.2 | 0.2 | 0.2 | 5.7 |
| 15 | 76.2 | 6.4 | 4.0 | 0.04 | 5.4 | 2.0 | 0.2 | 5.7 |
| 16 | 76.1 | 6.5 | 3.9 | 0.04 | 5.3 | 4.1 | 0.2 | 3.8 |
| 17 | 74.8 | 6.5 | 2.0 | 0.02 | 4.8 | 0.2 | 0.2 | 11.5 |
| 18 | 78.3 | 6.3 | 2.0 | 0.01 | 5.3 | 0.2 | 0.2 | 7.7 |
| 19 | 76.7 | 4.5 | 2.0 | 0.01 | 5.1 | 0.2 | 0.2 | 11.4 |
| 20 | 76.2 | 8.4 | 2.0 | 0.01 | 5.4 | 0.2 | 0.2 | 7.6 |
| 21 | 76.4 | 6.4 | 1.9 | 1.93 | 5.2 | 0.2 | 0.2 | 7.7 |
| 22 | 76.5 | 6.3 | 1.9 | 3.98 | 5.2 | 0.2 | 0.2 | 5.7 |
| 23 | 76.2 | 6.4 | 2.0 | 0.04 | 3.2 | 0.2 | 0.2 | 11.7 |
| 24 | 76.0 | 6.4 | 2.0 | 0.03 | 7.4 | 0.1 | 0.2 | 7.8 |
| 25 | 76.3 | 6.4 | 2.0 | 0.03 | 5.2 | 2.1 | 0.2 | 7.7 |
| 26 | 76.4 | 6.4 | 2.0 | 0.03 | 5.3 | 4.0 | 0.2 | 5.7 |
| 27 | 78.2 | 6.3 | 2.0 | 2.03 | 5.3 | 0.2 | 0.2 | 5.8 |
| 28 | 78.2 | 6.3 | 2.0 | 1.04 | 5.4 | 1.1 | 0.2 | 5.7 |
| 29 | 78.3 | 6.4 | 2.0 | 0.03 | 5.3 | 2.1 | 0.2 | 5.7 |
| 30 | 76.2 | 8.3 | 2.0 | 2.00 | 5.3 | 0.2 | 0.2 | 5.8 |
| 31 | 76.3 | 8.4 | 2.0 | 1.03 | 5.4 | 1.2 | 0.2 | 5.6 |
| 32 | 76.2 | 8.4 | 1.9 | 0.04 | 5.5 | 2.2 | 0.2 | 5.5 |
| 33 | 76.7 | 6.2 | 1.0 | 1.93 | 5.1 | 0.2 | 0.2 | 8.7 |
| 34 | 76.7 | 6.2 | 3.0 | 2.02 | 5.1 | 0.2 | 0.2 | 6.6 |
| 35 | 76.7 | 6.1 | 2.0 | 1.01 | 5.1 | 0.2 | 0.2 | 8.7 |
| 36 | 76.8 | 6.1 | 2.0 | 2.91 | 5.2 | 0.2 | 0.2 | 6.6 |
| 37 | 76.6 | 6.2 | 5.9 | 1.98 | 5.2 | 0.1 | 0.2 | 3.6 |
| 38 | 76.8 | 6.2 | 1.0 | 0.99 | 5.1 | 0.2 | 0.2 | 9.5 |

Various measured properties of Samples 1-38 are provided below in TABLE 2.

TABLE 2

| Sample | Strain Point °C. | Annealing Point °C. | Softening Point °C. | Liquidus Temp. Internal °C. | Log (viscosity at liquidus) Log (poise) | Temp. at 35000 Poise °C. | CTE (RT-300° C.) ppm/°C. | SOC nm/mm/Mpa | ISO 720 µg Na₂O per gram glass tested | DIN 12116 (acid) Mean of half mass loss mg/dm² | ISO 695 (base) Mean of mass loss mg/dm² |
|---|---|---|---|---|---|---|---|---|---|---|---|
| 1 | 547 | 600 | 861 | 1070 | 5.5 | 1200 | 6.9 | 3.1 | 56 | −0.4 | −60 |
| 2 | 529 | 579 | 841 | 1070 | 5.2 | 1169 | 6.5 | 3.1 | 54 | −0.3 | −59 |
| 3 | 519 | 567 | 819 | 1095 | 4.9 | 1147 | 6.2 | 3.0 | 52 | −0.4 | −58 |
| 4 | 516 | 564 | 812 | 1090 | 4.9 | 1136 | 5.6 | 2.9 | 55 | −0.4 | −56 |
| 5 | 513 | 561 | NA | | | | 5.5 | | 52 | −0.3 | −58 |
| 6 | 518 | 565 | NA | 1140 | 4.5 | 1130 | 5.6 | 2.9 | | | |
| 7 | 490 | 534 | 763 | 1045 | 4.7 | 1065 | 6.5 | 2.9 | 73 | −0.5 | −56 |
| 8 | 554 | 606 | NA | 1170 | 4.9 | 1224 | 5.1 | 3.1 | 50 | −0.5 | −54 |
| 9 | 472 | 515 | 737 | 1095 | 4.3 | 1048 | 6.4 | 2.9 | 92 | −0.3 | −57 |
| 10 | 591 | 642 | NA | 1195 | 4.9 | 1248 | 5.3 | 3.0 | 47 | −0.4 | −46 |
| 11 | 517 | 567 | 822 | 1080 | 5.1 | 1163 | 6.5 | 3.0 | 52 | −0.3 | −53 |
| 12 | 530 | 581 | 849 | 1065 | 5.50 | 1204 | 6.9 | 3.0 | 52 | −0.4 | −64 |
| 13 | 484 | 529 | 770 | 1020 | 5.0 | 1087 | 6.3 | 2.9 | 74 | −0.4 | −52 |
| 14 | 558 | 608 | 879 | 1220 | 4.3 | 1180 | 5.4 | 3.0 | 55 | −0.3 | −59 |
| 15 | 540 | 589 | 846 | 1095 | 5.0 | 1161 | 5.5 | 3.0 | 57 | −0.3 | −52 |
| 16 | 577 | 625 | 875 | 1145 | 4.9 | 1198 | 5.4 | 3.0 | 43 | −0.5 | −51 |
| 17 | 496 | 539 | 761 | 1135 | 4.1 | 1064 | 6.0 | 2.8 | 66 | −0.4 | −51 |
| 18 | 553 | 604 | NA | 1185 | 4.7 | 1203 | 5.0 | 3.0 | 42 | −0.4 | −43 |
| 19 | 477 | 520 | NA | 1165 | 3.8 | 1045 | 6.3 | 2.9 | 76 | −0.3 | −41 |
| 20 | 590 | 639 | NA | 1215 | 4.6 | 1227 | 4.9 | 3.0 | 41 | −0.4 | −46 |
| 21 | 517 | 566 | 818 | 1105 | 4.9 | 1153 | 6.0 | 2.9 | 42 | −0.4 | −48 |
| 22 | 525 | 575 | 836 | 1065 | 5.3 | 1180 | 6.0 | 2.9 | 49 | −0.4 | −53 |
| 23 | 490 | 534 | NA | | | | 6.0 | 2.9 | 67 | −0.4 | −51 |
| 24 | 556 | 605 | NA | 1210 | 4.3 | 1173 | 5.1 | 2.9 | 50 | −0.3 | −45 |
| 25 | 539 | 586 | NA | 1130 | 4.7 | 1149 | 5.1 | 2.9 | 53 | −0.4 | −44 |
| 26 | 570 | 616 | NA | 1185 | 4.5 | 1176 | 4.9 | 2.9 | 48 | −0.4 | −43 |
| 27 | 560 | 611 | 879.1 | 1170 | 5.0 | 1236 | 5.3 | 3.0 | 39 | | −57 |
| 28 | 567 | 618 | 893.9 | 1160 | 5.0 | 1233 | 5.0 | 3.0 | 40 | | −52 |
| 29 | | | | 1225 | 4.6 | 1231 | | | 38 | | −52 |
| 30 | | | | 1205 | 4.9 | 1260 | | | 45 | | −61 |
| 31 | 599 | 651 | NA | 1185 | 5.0 | 1251 | 4.9 | 3.0 | 43 | | −57 |
| 32 | 613 | 664 | 932.1 | 1170 | 5.1 | 1247 | 4.5 | 3.0 | 46 | −0.4 | −56 |
| 33 | 518 | 565 | NA | 1095 | 4.9 | 1141 | 5.7 | | 47 | −0.4 | −55 |
| 34 | 515 | 564 | 826.2 | 1095 | 4.9 | 1155 | 6.3 | | 48 | −0.4 | −56 |
| 35 | 517 | 564 | NA | 1090 | 4.9 | 1138 | 5.7 | | 50 | −0.4 | −54 |
| 36 | 519 | 567 | 824.5 | 1095 | 5.0 | 1162 | 6.1 | | 47 | −0.4 | −57 |
| 37 | 522 | 574 | 836.8 | 1050 | 5.5 | 1182 | 6.7 | | 51 | −0.4 | −56 |
| 38 | 520 | 567 | NA | 1160 | 4.4 | 1129 | 5.5 | | 54 | −0.3 | −53 |

The compositions of glasses of Comparative Samples C1-C21 are provided in TABLE 3 below.

TABLE 3

| Sample | SiO₂ | Al₂O₃ | Na₂O | K₂O | MgO | CaO | SnO₂ | Li₂O |
|---|---|---|---|---|---|---|---|---|
| | | | | mol % | | | | |
| C1 | 70.4 | 5.4 | 3.5 | 0.0 | 5.1 | 0.0 | 0.2 | 15.5 |
| C2 | 68.7 | 9.7 | 6.7 | 0.0 | 4.8 | 0.0 | 0.2 | 9.9 |
| C3 | 74.7 | 5.8 | 9.0 | 0.0 | 5.2 | 0.0 | 0.2 | 5.0 |
| C4 | 76.5 | 6.4 | 11.5 | 0.03 | 5.3 | 0.1 | 0.2 | 0.0 |
| C5 | 74.4 | 6.4 | 0.0 | 0.02 | 5.1 | 0.2 | 0.2 | 13.6 |
| C6 | 78.2 | 6.4 | 0.0 | 0.03 | 5.3 | 0.1 | 0.2 | 9.6 |
| C7 | 77.2 | 4.4 | 0.0 | 0.03 | 4.5 | 0.2 | 0.2 | 13.5 |
| C8 | 76.4 | 8.4 | 0.0 | 0.03 | 5.2 | 0.2 | 0.2 | 9.6 |
| C9 | 75.9 | 6.5 | 0.0 | 1.99 | 5.6 | 0.2 | 0.2 | 9.6 |
| C10 | 76.4 | 6.4 | 0.0 | 3.95 | 5.3 | 0.2 | 0.2 | 7.6 |
| C11 | 76.1 | 6.4 | 0.0 | 0.04 | 3.4 | 0.2 | 0.2 | 13.7 |
| C12 | 76.3 | 6.3 | 0.0 | 0.03 | 7.2 | 0.2 | 0.2 | 9.8 |
| C13 | 76.1 | 6.4 | 0.0 | 0.03 | 5.4 | 2.1 | 0.2 | 9.7 |
| C14 | 76.5 | 6.3 | 0.0 | 0.03 | 5.3 | 4.0 | 0.2 | 7.6 |
| C15 | 80.5 | 6.3 | 0.0 | 2.01 | 5.2 | 0.2 | 0.2 | 5.6 |
| C16 | 80.4 | 6.3 | 0.0 | 1.01 | 5.2 | 1.1 | 0.2 | 5.7 |
| C17 | 80.5 | 6.2 | 0.0 | 0.03 | 5.3 | 2.1 | 0.2 | 5.6 |
| C18 | 76.4 | 10.2 | 0.0 | 1.99 | 5.4 | 0.2 | 0.2 | 5.5 |
| C19 | 76.5 | 10.3 | 0.0 | 0.99 | 5.3 | 1.1 | 0.2 | 5.6 |
| C20 | 76.4 | 10.4 | 0.0 | 0.03 | 5.2 | 2.1 | 0.2 | 5.6 |
| C21 | 76.3 | 6.4 | 0.0 | 0.02 | 5.4 | 0.2 | 0.2 | 11.5 |

Various measured properties of Comparative Samples C1-C21 are provided below in TABLE 4.

TABLE 4

| Sample | Strain Point °C. | Annealing Point °C. | Softening Point °C. | Liquidus Temp. Internal °C. | Log (viscosity at liquidus) Log (poise) | Temp. at 35000 Poise °C. | CTE (RT-300° C.) ppm/°C. | SOC nm/mm/Mpa | ISO 720 µg Na$_2$O per gram glass tested | DIN 12116 (acid) Mean of half mass loss mg/dm$^2$ | ISO 695 (base) Mean of mass loss mg/dm$^2$ |
|---|---|---|---|---|---|---|---|---|---|---|---|
| C1 | | | | | | | | | 153 | −0.4 | −72 |
| C2 | | | | | | | | | 105 | −0.4 | −66 |
| C3 | | | | | | | | | 80 | −0.5 | −59 |
| C4 | 595 | 648 | 905 | 1040 | 6.6 | 1222 | 6.9 | 3.1 | 68 | −0.4 | −68 |
| C5 | 504 | 547 | NA | | | | 5.6 | 2.8 | 64 | −0.4 | −50 |
| C6 | 563 | 612 | NA | 1155 | 4.5 | 1142 | 4.5 | 3.0 | 50 | | −51 |
| C7 | 488 | 529 | NA | | | | 6.0 | 2.8 | 69 | | −58 |
| C8 | 595 | 644 | NA | | | | 4.6 | 3.0 | 75 | | −54 |
| C9 | 524 | 571 | 827 | 1250 | 4.2 | 1189 | 5.6 | 3.0 | 46 | | −58 |
| C10 | 528 | 575 | 823 | | | | 5.9 | 2.9 | 71 | −0.4 | −43 |
| C11 | 501 | 546 | NA | | | | 5.5 | 2.8 | 67 | −0.4 | −49 |
| C12 | 561 | 608 | NA | 1265 | 3.9 | 1161 | 4.6 | 2.9 | 57 | −0.4 | −48 |
| C13 | 544 | 590 | NA | 1235 | 4.0 | 1138 | 4.6 | 2.9 | 52 | −0.4 | −38 |
| C14 | 569 | 615 | NA | 1275 | 3.9 | 1163 | 4.6 | 2.9 | 54 | −0.3 | −46 |
| C15 | | | | 1285 | 4.7 | 1304 | | | 30 | | −54 |
| C16 | | | | 1255 | 4.9 | 1304 | | | 30 | | −59 |
| C17 | | | | >1295 | <4.6 | 1298 | | | 31 | | −54 |
| C18 | | | | 1240 | 5.1 | 1317 | | | 38 | | −69 |
| C19 | | | | 1255 | 4.9 | 1303 | | | 40 | | −66 |
| C20 | | | | 1285 | 4.6 | 1292 | | | 37 | | −62 |
| C21 | 530 | 576 | NA | 1230 | 3.9 | 1120 | 5.2 | 2.9 | 51 | −0.3 | −56 |

Figure 3A:
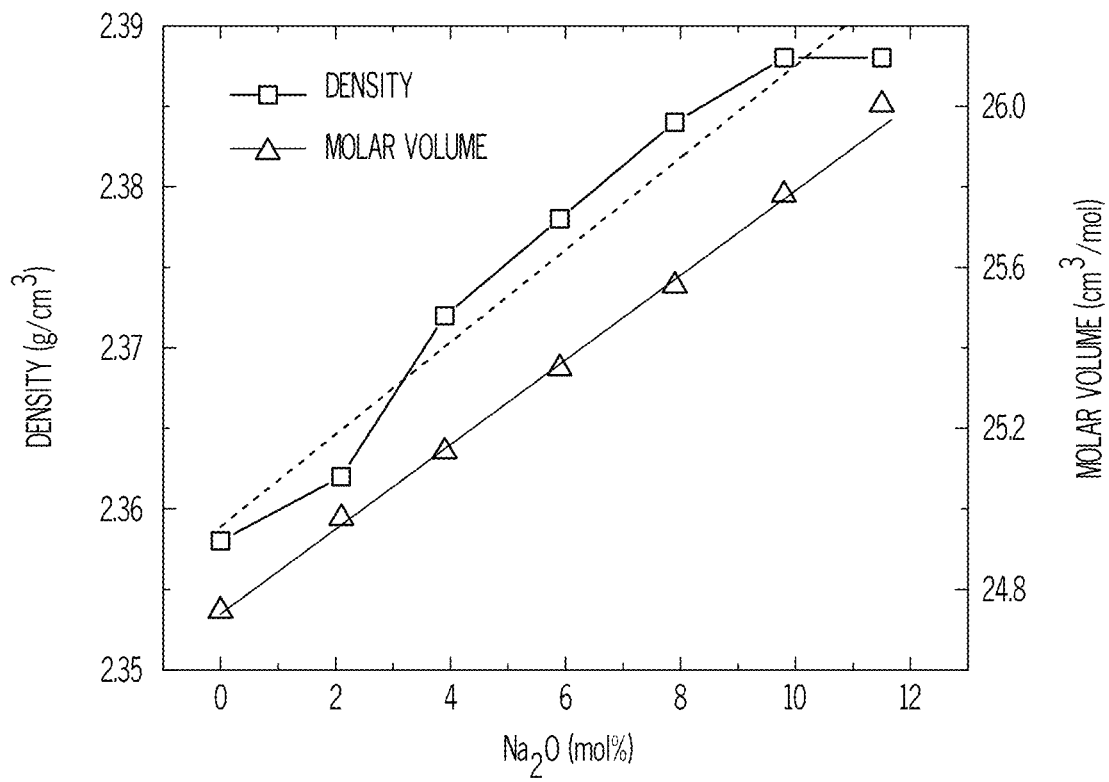
FIG. 3A is a plot of density and molar volume versus $Na_2O$ mol % according to embodiments disclosed and described herein.
Figure 3B:
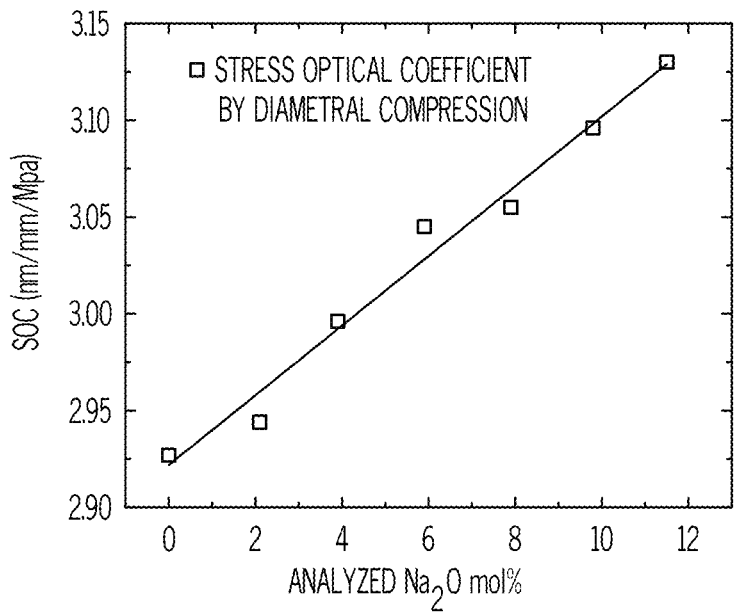
FIG. 3B is a plot of SOC versus $Na_2O$ mol % according to embodiments disclosed and described herein.
Figure 3C:
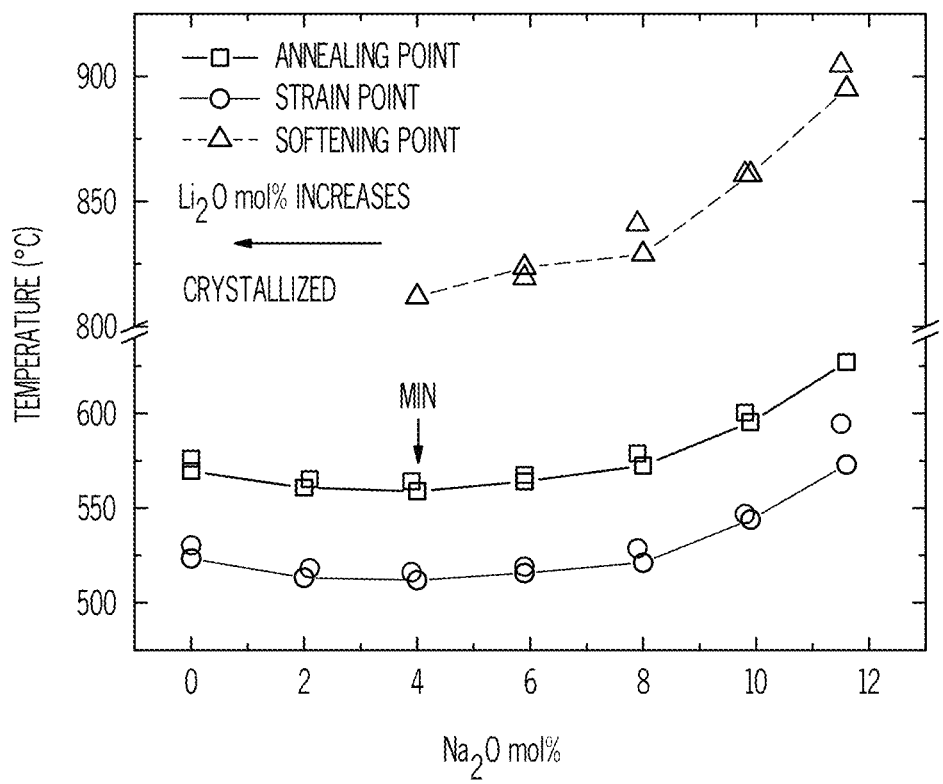
FIG. 3C is a plot of annealing point, strain point, and softening point versus $Na_2O$ mol % according to embodiments disclosed and described herein.
Figure 3D:
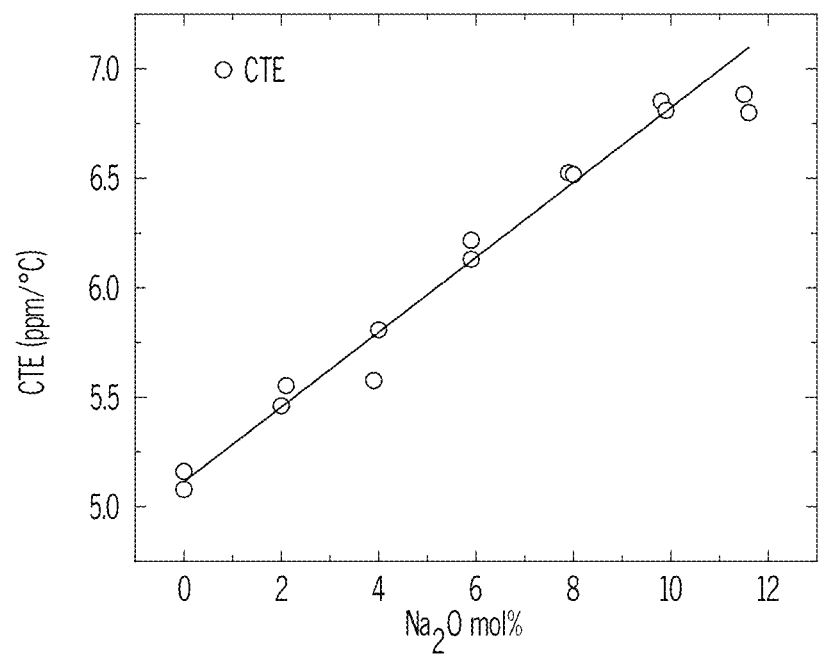
FIG. 3D is a plot of CTE versus $Na_2O$ mol % according to embodiments disclosed and described herein.
Figure 3E:
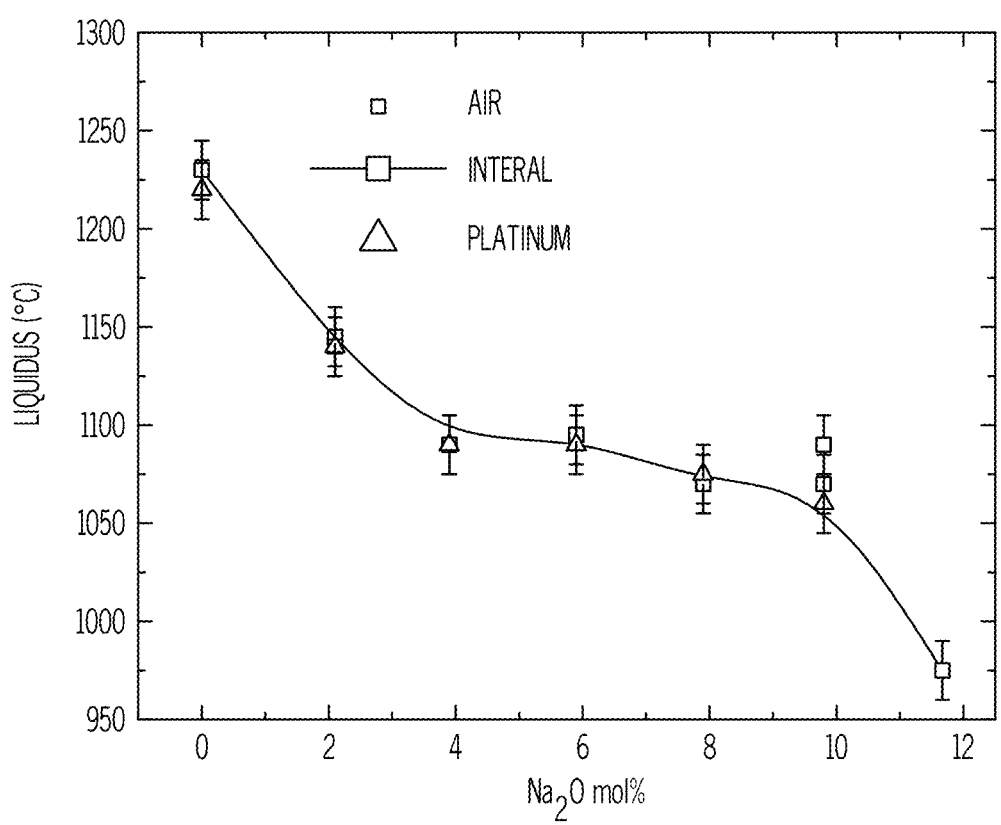
FIG. 3E is a plot of liquidus temperature versus $Na_2O$ mol % according to embodiments disclosed and described herein.
Figure 3F:
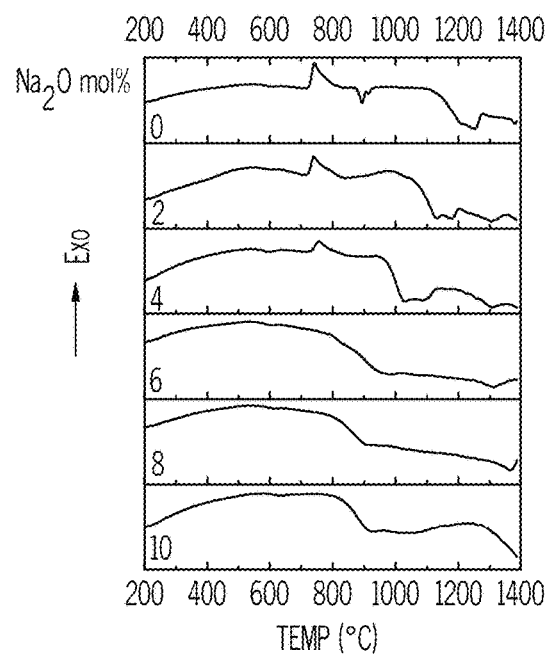
FIG. 3F is a plot of the crystallization tendency measured by DSC according to embodiments disclosed and described herein.
Figure 3G:
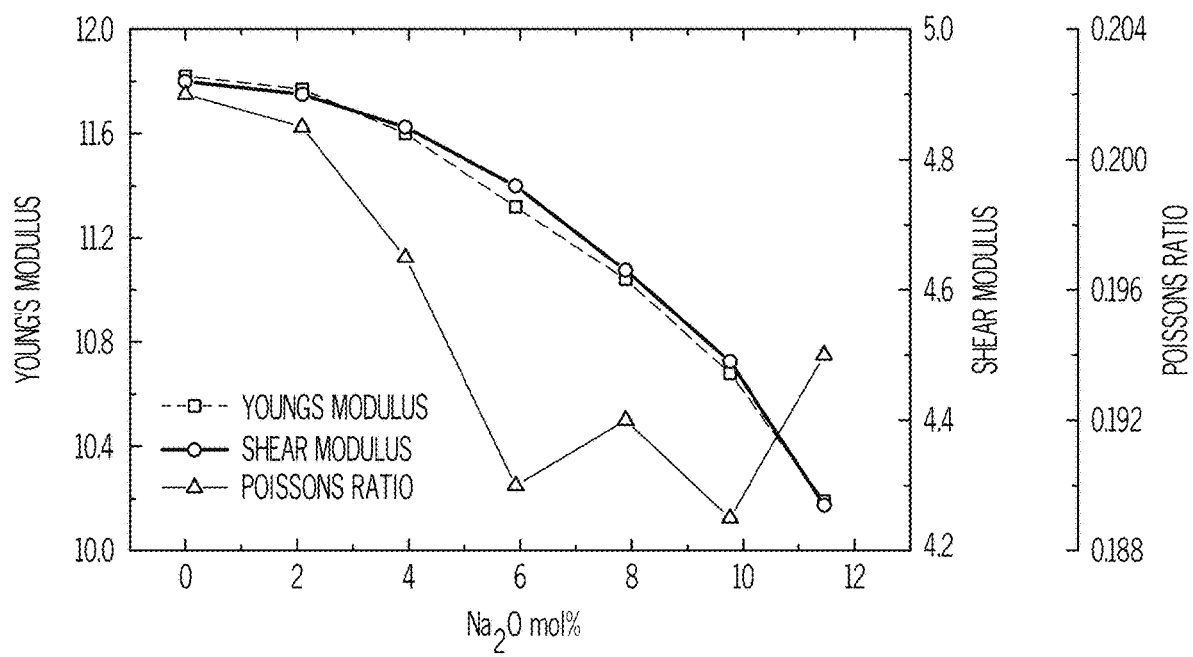
FIG. 3G is a plot of Young's modulus, shear modulus, and Poisson's ratio versus $Na_2O$ mol % according to embodiments disclosed and described herein.

In the above samples, the amount of Li$_2$O in the glass is increased in Samples 1-6 (as shown in Table 1), where Comparative Sample 4 is used as a control without Li$_2$O, and the physical properties of various sample glasses are shown in FIG. 3A-FIG. 3G. With the increase in Li$_2$O content it was observed that: as shown in FIG. 3A, which is a plot of density and molar volume versus Na$_2$O mol %, density decreases as the amount of Li$_2$O increases (it should be noted that in FIG. 3A-FIG. 3G the amount of Li$_2$O has a negative correlation with the amount of Na$_2$O, such that in these figures higher amounts of Na$_2$O indicate lower amounts of Li$_2$O and vice versa); as also shown in FIG. 3A, the molar volume decreases linearly as Li$_2$O increases, which can be used to predict molar volume as well as density for other compositions; as shown in FIG. 3B, which is a plot of SOC versus Na$_2$O mol %, SOC decreases linearly as the amount of Li$_2$O increases, which relates with elastic modulus and atomic bonding in the glass network; as shown in FIG. 3C, which is a plot of annealing point, strain point, and softening point versus Na$_2$O mol %, the strain point, annealing point, and softening temperature all generally decrease as Li$_2$O is added, but as shown in FIG. 3C these properties all reach minimum points where the amount of Na$_2$O is about 4 mol %, showing that merely adding Li$_2$O is not sufficient; as shown in FIG. 3D, which is a plot of CTE versus Na$_2$O mol %, CTE<300° C. on heating decreases linearly with an increase in the amount of Li$_2$O, which can also be used to predict CTE for other compositions; liquidus temperature also increases greatly with small additions of Li$_2$O as shown in FIG. 3E, which is a plot of liquidus temperature versus Na$_2$O mol %; as shown in FIG. 3F, which is a plot of heat flow (where Exo means exotherm) plotted by Na$_2$O mol % versus temperature, primary crystallization phases at liquidus temperature evolve from protoenstatite (MgSiO$_3$, when Na$_2$O≥4 mol %) to spodumene (LiAl(SiO$_3$)$_2$ when Na$_2$O<4 mol %), crystallization tendency increases with the exothermic activity as shown by DSC measurements in FIG. 3F, and the main crystalline phase is lithium aluminum silicate LiAl(SiO$_3$)$_2$ and is more clearly defined as the amount of lithium increases; as shown in FIG. 3G, which is a plot of Young's modulus, shear modulus, and Poisson's ratio versus Na$_2$O mol %, Young's modulus, shear modulus, and Poisson's Ratio increase when Li$_2$O is added in amounts over 5 mol %.

Figure 4A:
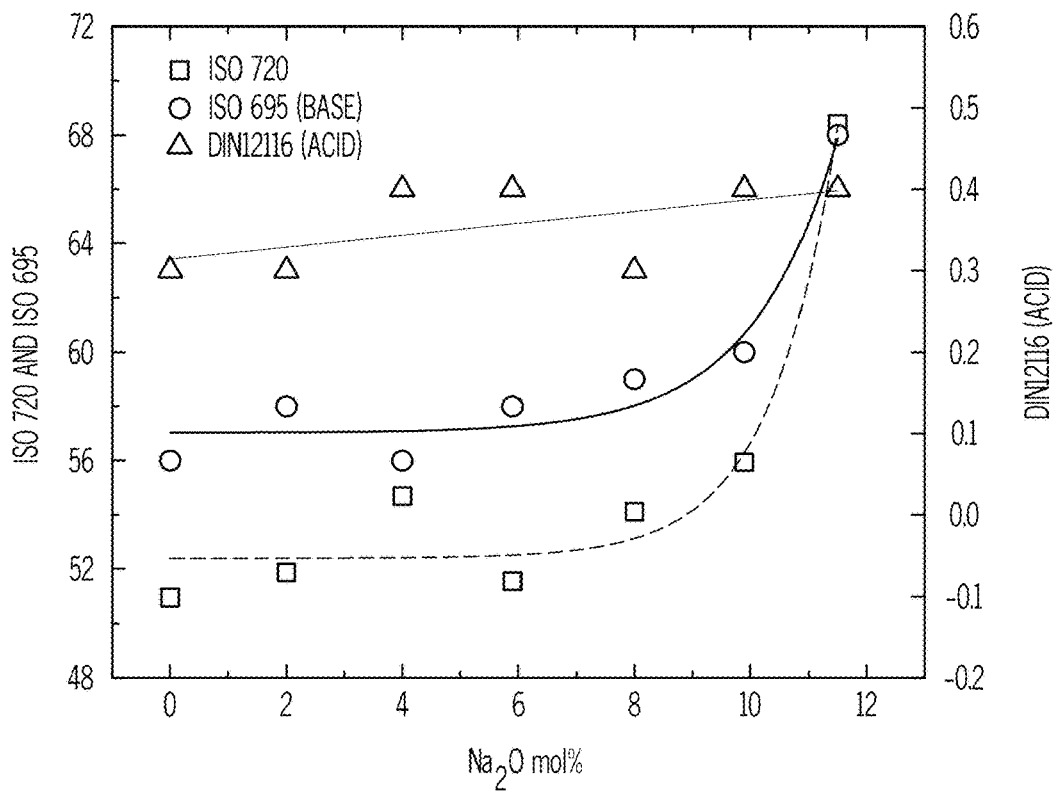
FIG. 4A is a plot of DIN 12116, ISO 695, and ISO 720 results versus $Na_2O$ mol % according to embodiments disclosed and described herein.
Figure 4B:
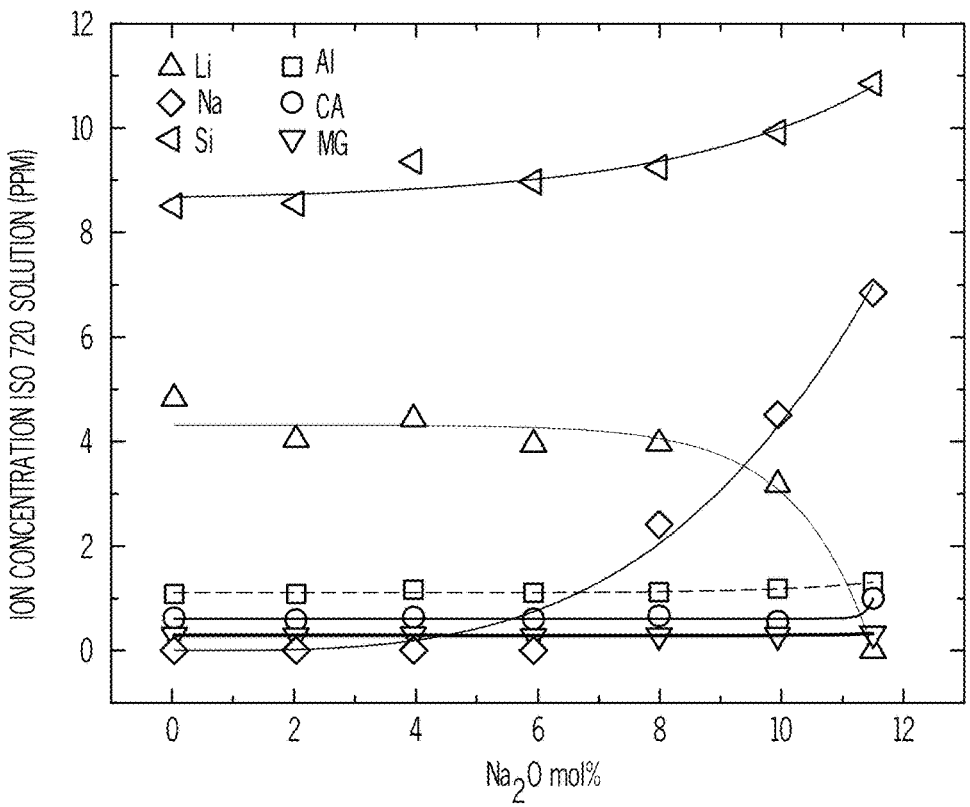
FIG. 4B is a plot of ion concentration in ISO 720 solution versus $Na_2O$ mol % according to embodiments disclosed and described herein.
Figure 4C:
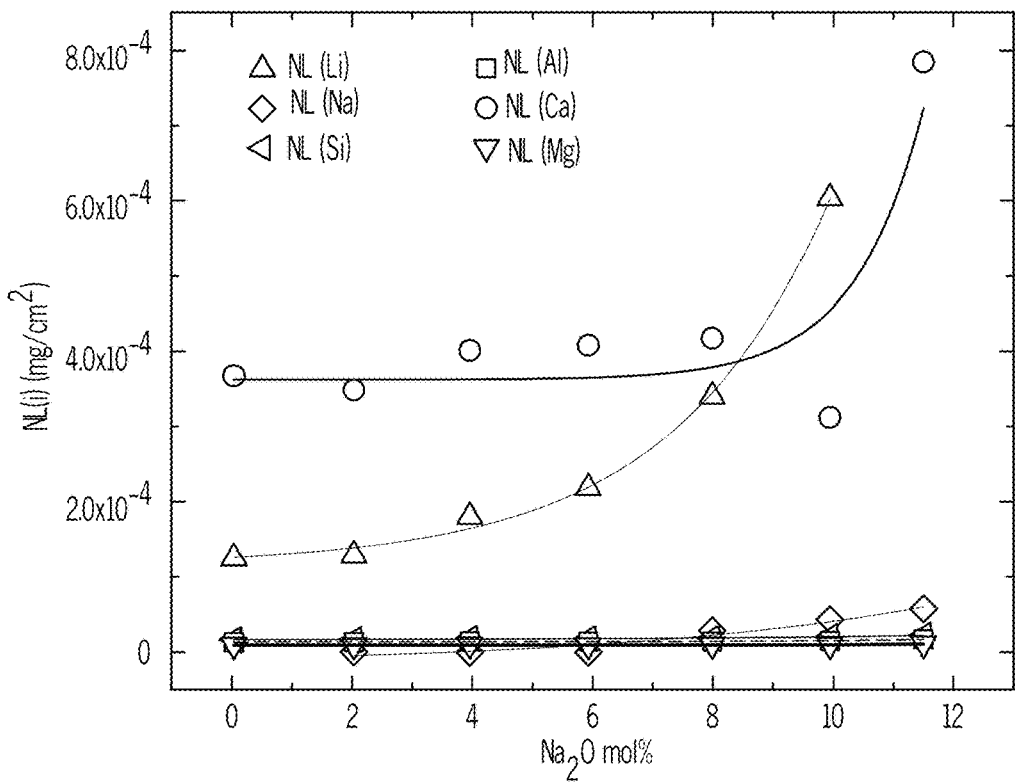
FIG. 4C is a plot of normalized concentrations of leached components in ISO 720 solution versus $Na_2O$ mol % according to embodiments disclosed and described herein.

The durability of glasses of Samples 1-6 was also tested for chemical durability in acid, a base, and water (hydrolytic durability) according to DIN 12116, ISO 695, and ISO 720, respectively, where Comparative Example 4 is a non-Li$_2$O containing control sample. As shown in FIG. 4A, which is a plot of DIN 12116, ISO 695 and ISO 720 results versus Na$_2$O mol %, Samples 1-6 all show improved chemical durability than Comparative Sample 4. With the initial replacement of Na$_2$O with Li$_2$O, hydrolytic and base durability improve dramatically, and there is a slight improvement in acid durability. FIG. 4B, which is a plot of ion concentration in ISO 720 versus Na$_2$O, shows the absolute ion concentrations in ISO 720 solutions measured by ICP-MS. FIG. 4C, which is a plot of ion concentrations versus Na$_2$O mol %, shows normalized leached ion concentrations measured on the solutions recovered from the ISO 720 test, and it shows that Li$^+$ and Ca$_2^+$ are preferentially leached out from the glass network, and Li$^+$ and Ca$^{2+}$ preferentially leached out from an Na-rich composition than from a Li-rich composition.

Additional glass compositions were adjusted by fixing the Na$_2$O mol % at 4 mol % (Samples 7 to 16), fixing the Na$_2$O mol % at 2 mol % (Samples 17 to 26), and comparing them to glass samples with the Na$_2$O mol % at 0 mol % (Comparative Samples 5 to 14), and fixing Li$_2$O mol % at 5.6 mol % and fixing MgO at 5.3 mol % (Samples 27 to 32 and Comparative Samples 14 to 19). Composition adjustments are listed in TABLES 1 and 3 above. Physical properties as well as chemical durability were measured and listed in TABLES 2 and 4 above.

By varying the amounts of SiO$_2$, Al$_2$O$_3$, MgO, CaO, and K$_2$O, the Li-containing glass composition of various samples were able to lower the crystallization tendency of the glass as shown by the softening temperatures measured by PPV (e.g., Samples 7, 9, 11-17, 21, 22, 27, 28, and 32); improving properties for glass processing, (e.g., temperature for viscosity at 35000 poise is above liquidus temperature and also below 1200° C. for tube forming and vial making (e.g., examples 7, 11-13, 15, 16, 18, 21, 22, and 25); improving chemical durability in acid by DIN 12116 (class S1, half the mass loss per unit area of total surface of the glass, in $mg/dm^2$, 0 to 0.7 $mg/dm^2$), in a base by ISO 695 (class A1, mass loss per unit area of total surface of the glass, in $mg/dm^2$, up to 75 $mg/dm^2$), and in water by ISO 720 (HGA1, equivalent of alkali expressed as mass of $Na_2O$ per gram of glass grains, in µg/g, up to and including 62 µg/g)—e.g., Samples 8, 10-12, 14, 15, 16, 18, 20-22, 24, 25, 26, and 27-32; and samples with particularly lower crystallization tendency, preferred properties for glass processing, and good chemical durability before ion exchange are Samples 1-4, 11, 12, 15, 16, 21 and 22.

Figure 5:
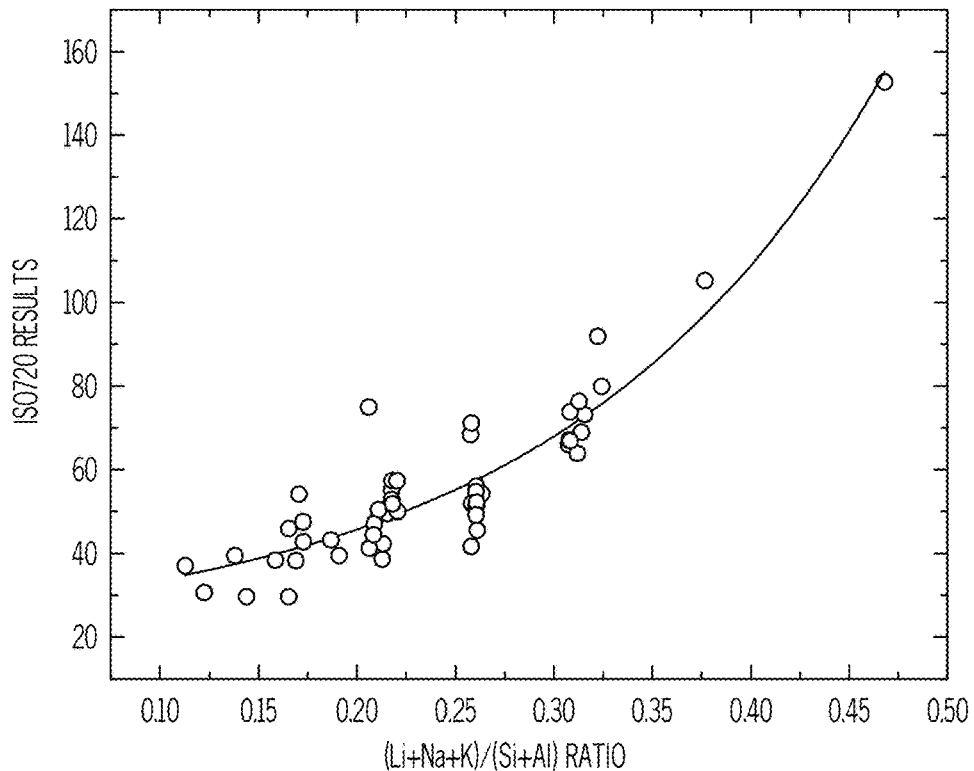
FIG. 5 is a plot of ISO 720 results versus a ratio of $(Li_2O+Na_2O+K_2O)/(SiO_2+Al_2O_3)$ according to embodiments disclosed and described herein.
Figure 6:
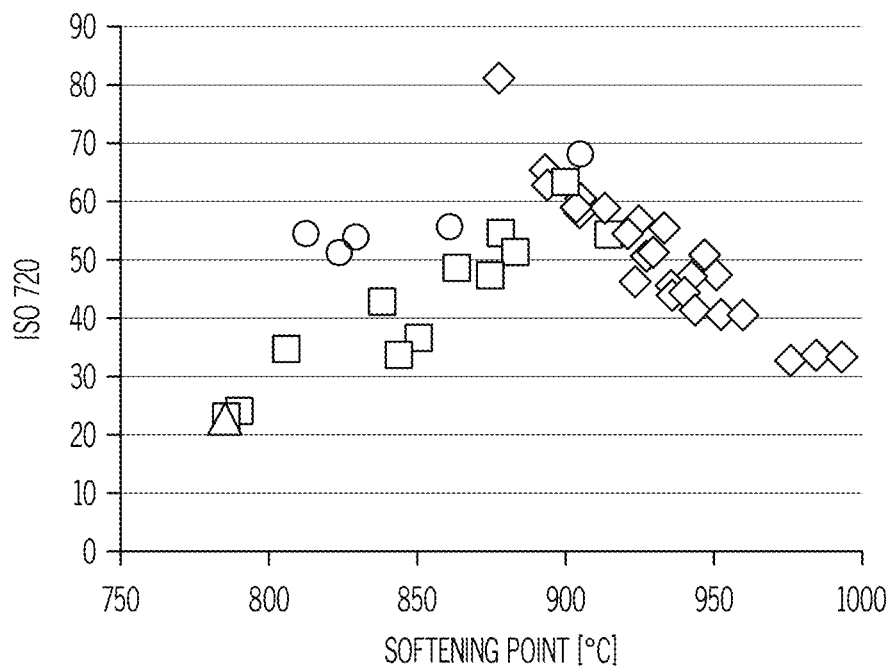
FIG. 6 is a plot of ISO 720 results versus softening point according to embodiments disclosed and described herein.

FIG. 5, which is a plot of ISO 720 results versus the ratio of alkali metals to network forming components, shows that ISO 720 results changing (Li+Na+K)/(Si+Al) ratio for glasses in this disclosure, with an increase in alkali contents, hydrolytic chemical durability decreases. FIG. 6, which is a plot of ISO 720 results versus softening points, shows the hydrolytic chemical durability by ISO 720 of various glasses changing with the glass softening temperatures. FIG. 6 shows that when glass composition (solid squares) transiting from Li-free and B-free aluminosilicate glasses (solid diamonds) towards Type 1B borosilicate glasses (solid triangle), softening temperature greatly decreases and hydrolytic chemical durability improves. However, for borosilicate glasses, there is delamination probability of inner surfaces when contacting with aqueous solutions (e.g., pharmaceutical solutions). FIG. 6 indicates that by introducing $Li_2O$ in glass composition, it is possible to get properties similar to B-free aluminosilicate glasses close to a Type 1B borosilicate without the addition of boron. Thus, improving physical properties for tube reforming without delamination problems for chemical durability.

Figure 7A:
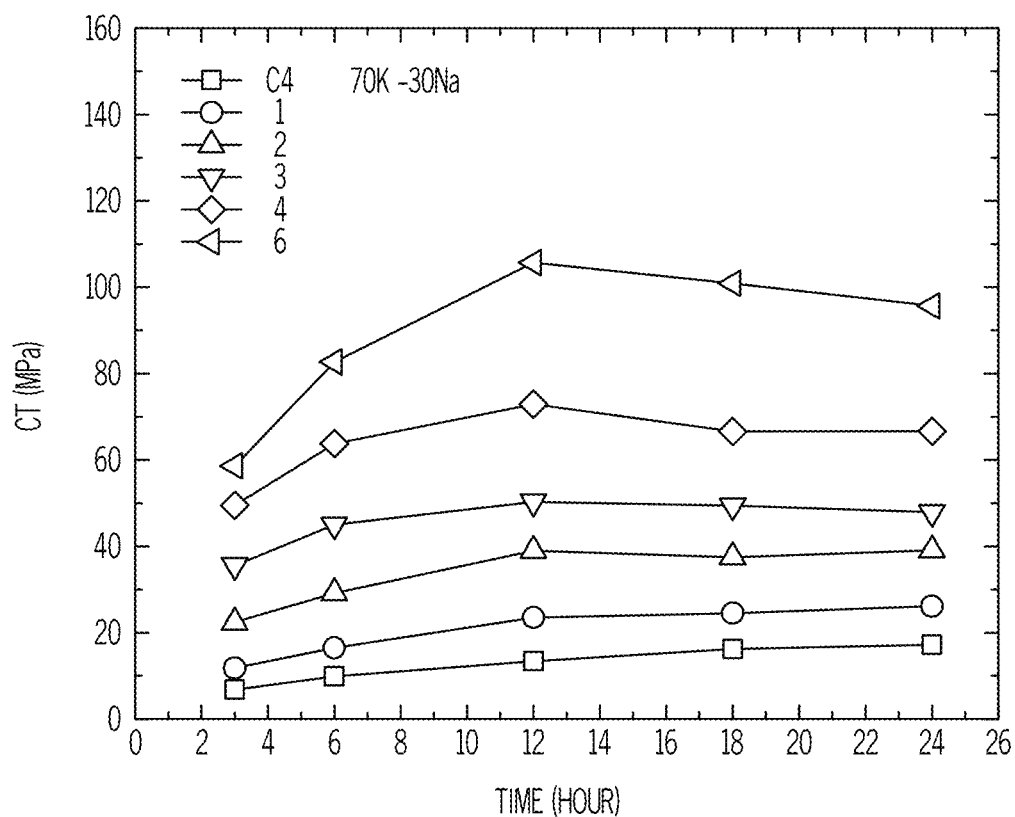
FIG. 7A is a plot of CT versus the duration of an ion exchange treatment according to embodiments disclosed and described herein.
Figure 7B:
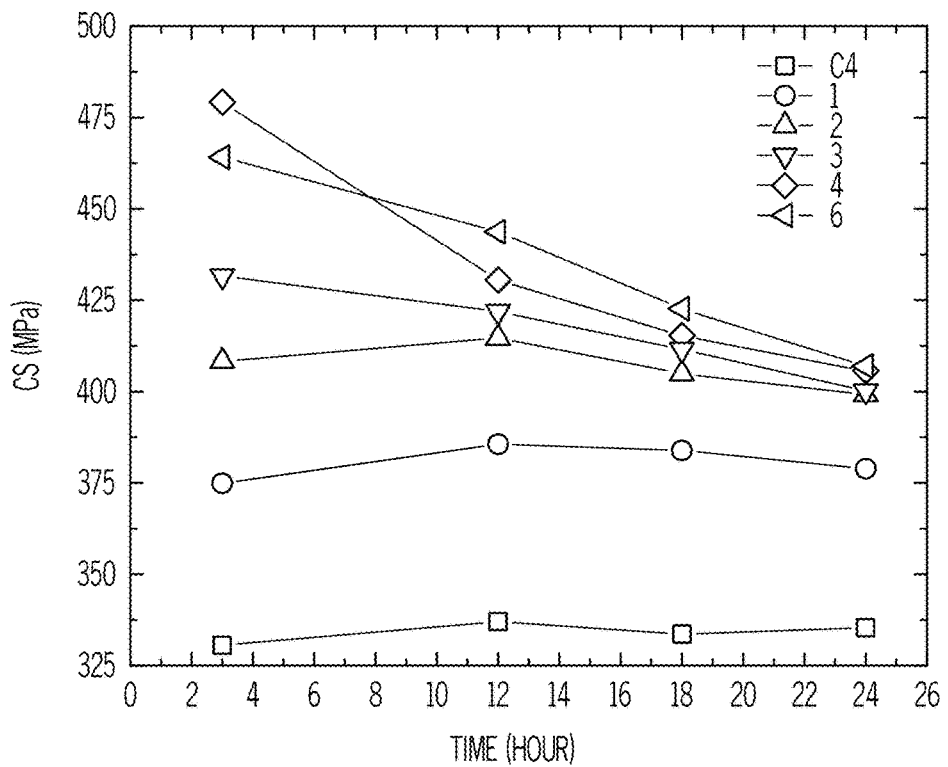
FIG. 7B is a plot of CS versus the duration of an ion exchange treatment according to embodiments disclosed and described herein.
Figure 7C:
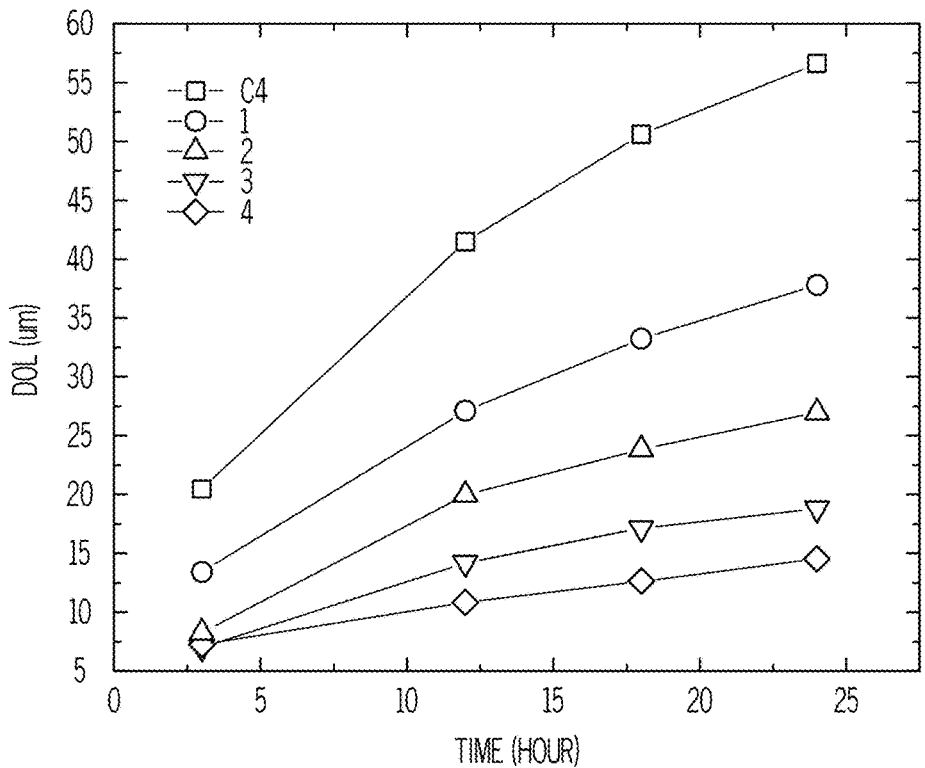
FIG. 7C is a plot of $DOL_K$ versus the duration of an ion exchange treatment according to embodiments disclosed and described herein.

The ion exchange ability of Li containing glass compositions are also shown in the samples and comparative samples. After ion exchange, crack resistance during processing and usage is improved. FIG. 7A to FIG. 7C, which are plots of CT, CS, $DOL_k$ versus duration of ion exchange treatment for Samples C4, 1, 2, 3, 4, and 6, show the properties of ion exchange ability varied with glass composition. With an increase in the amount of $Li_2O$ in the glass composition ($Li_2O$ increases from Sample 1 to Sample 6), greater central tension and surface compressive stress can be obtained in relatively short time. TABLE 5 shows the glass sample, ion exchange temperature and duration of the ion exchange for glass samples exposed to an ion exchange solution comprising 70 wt % $KNO_3$ and 30 wt % $NaNO_3$. The CT, stored energy, compressive stress, and $DOL_k$ of the samples are also given in TABLE 5.

TABLE 5

| Sample | Ion Exchange Temperature (° C.) | Ion Exchange Durations (hrs) | CT (MPa) | SSE/area (J/m²) | CS (MPa) | $DOL_k$ (µm) |
|---|---|---|---|---|---|---|
| 1 | 450 | 18 | 65.2 | 13.5 | 345 | 16.0 |
| 2 | 420 | 12 | 38.9 | 6.0 | 415 | 20.0 |
| 2 | 480 | 6 | 32.9 | 3.6 | 372 | 30.8 |
| 3 | 420 | 18 | 49.4 | 9.0 | 412 | 17.2 |
| 3 | 450 | 12 | 45.3 | 7.0 | 404 | 21.0 |
| 3 | 480 | 6 | 40.9 | 6.0 | 369 | 23.5 |
| 4 | 450 | 6 | 67.0 | 13.0 | 423 | 11.0 |
| 11 | 480 | 6 | 50.1 | 9.2 | 391 | 20.6 |
| 12 | 420 | 18 | 72.2 | 15.7 | 405 | 10.7 |
| 15 | 480 | 6 | 53.5 | 9.4 | 405 | 17.3 |
| 16 | 420 | 18 | 61.1 | 12.4 | 366 | 13.7 |
| 16 | 450 | 6 | 53.2 | 9.9 | 328 | 12.1 |
| 21 | 420 | 18 | 60.4 | 14.6 | 390 | 18.5 |
| 21 | 450 | 12 | 61.5 | 14.6 | 360 | 23.4 |
| 21 | 480 | 6 | 54.2 | 10.6 | 319 | 27.8 |

TABLE 6 shows the glass sample, ion exchange temperature and duration of the ion exchange for glass samples exposed to an ion exchange solution comprising 95 wt % $KNO_3$ and 5 wt % $NaNO_3$. The CT, stored energy, compressive stress and $DOL_k$ of the samples are also given in TABLE 6.

TABLE 6

| Sample | Ion Exchange Temperature (° C.) | Ion Exchange Durations (hrs) | CT (MPa) | SSE/area (J/m²) | CS (MPa) | $DOL_k$ (µm) |
|---|---|---|---|---|---|---|
| 1 | 420 | 24 | 25.8 | 4.3 | 571 | 40.4 |
| 2 | 420 | 12 | 23.7 | 2.5 | 582 | 21.4 |
| 3 | 420 | 18 | 28.9 | 3.3 | 571 | 18.6 |

Figure 8A:
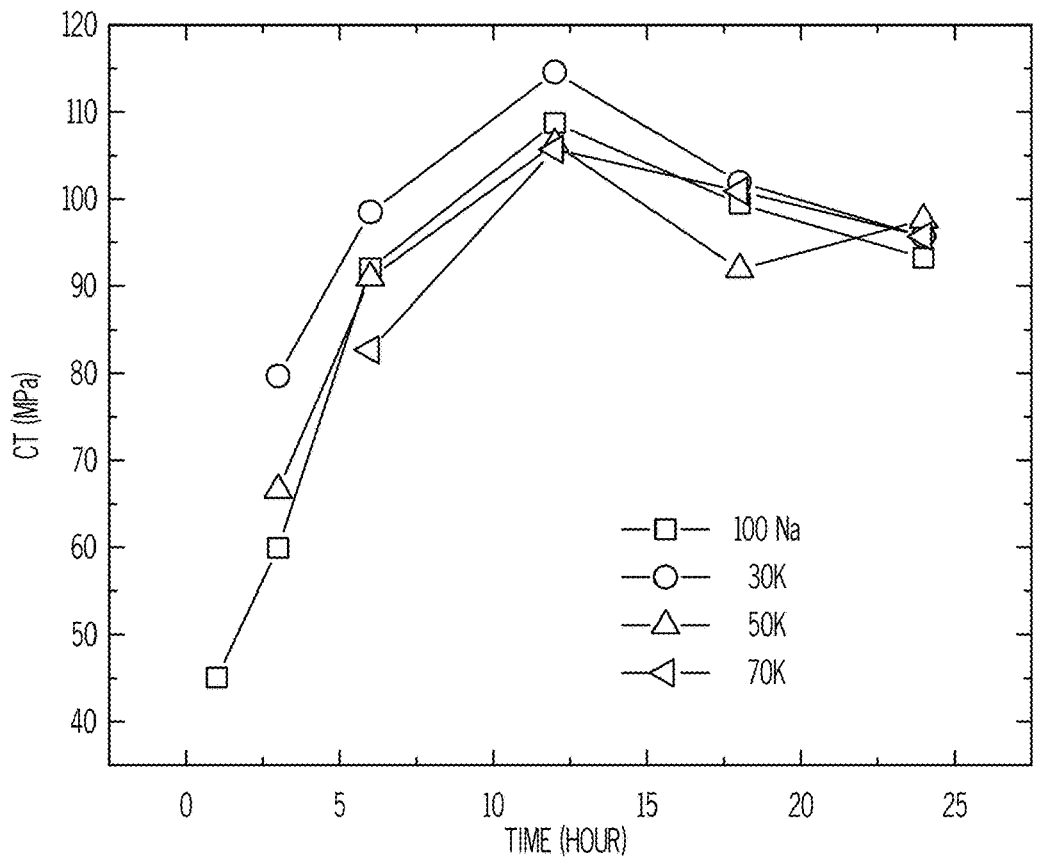
FIG. 8A is a plot of CT versus the duration of an ion exchange treatment according to embodiments disclosed and described herein.
Figure 8B:
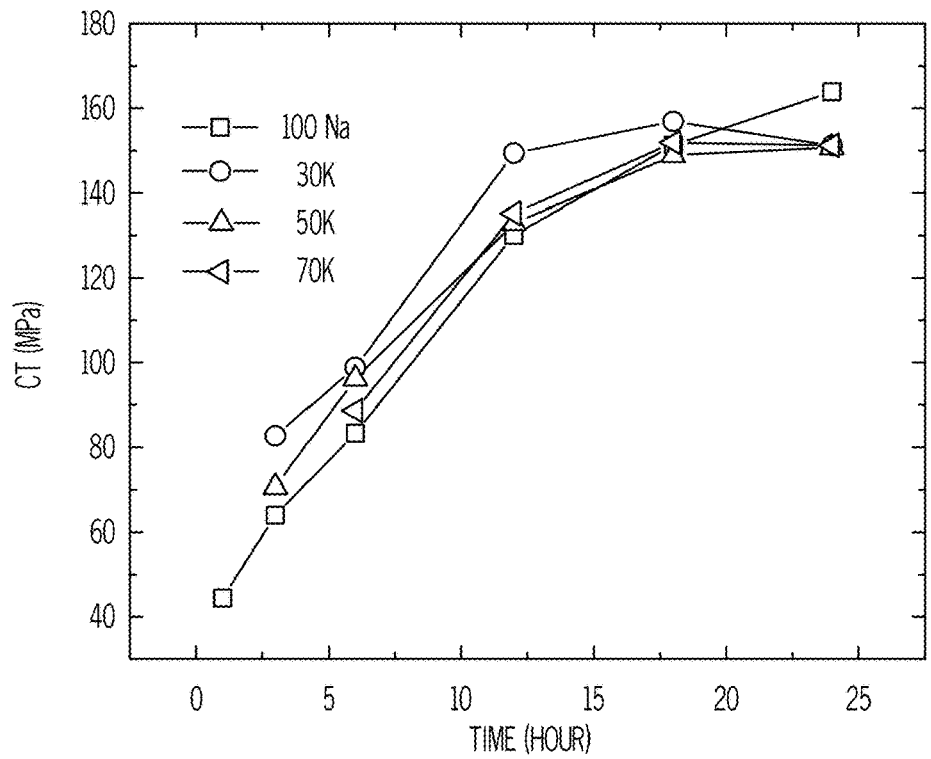
FIG. 8B is a plot of CT versus the duration of an ion exchange treatment according to embodiments disclosed and described herein.

FIG. 8A and FIG. 8B, which are plots of CT versus duration of the ion exchange treatment performed on glass Samples 6 and 7, respectively, show the effects of different salt bath type on CT, for high $Li_2O$ containing glasses (e.g., Samples 6 and 7), there is little effect of salt bath type with $NaNO_3>30$ wt % on CT.

Figure 9A:
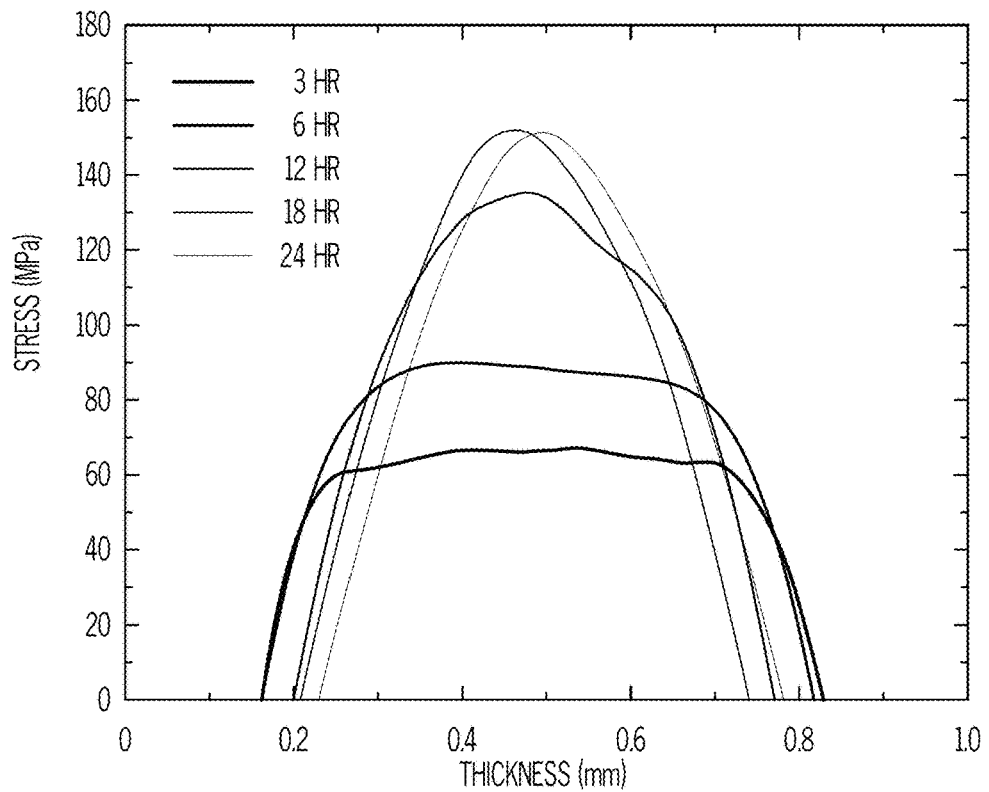
FIGS. 9A-9D are plots of stress versus thickness of glass articles according to embodiments disclosed and described herein.
Figure 9B:
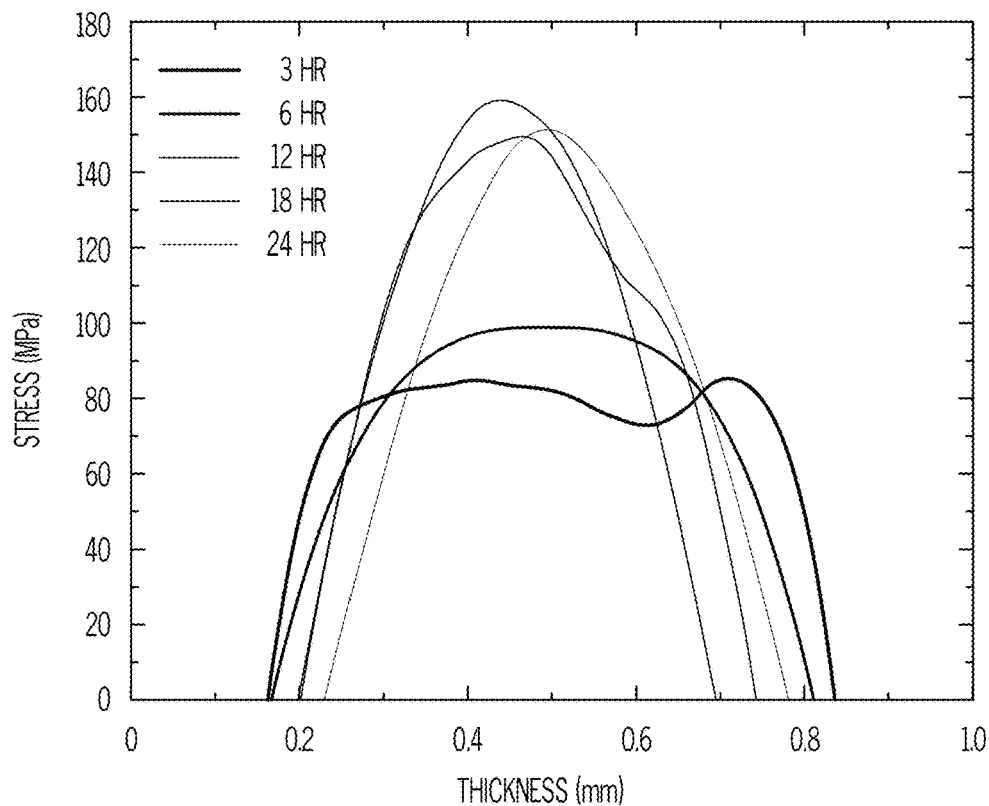
Figure 9C:
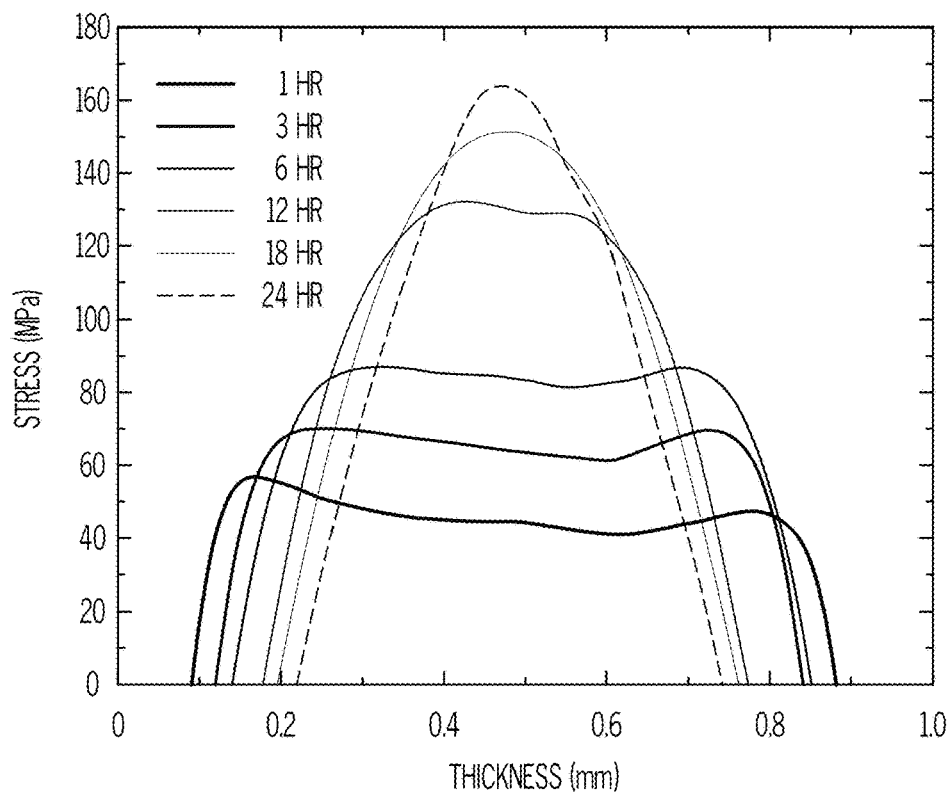
Figure 9D:
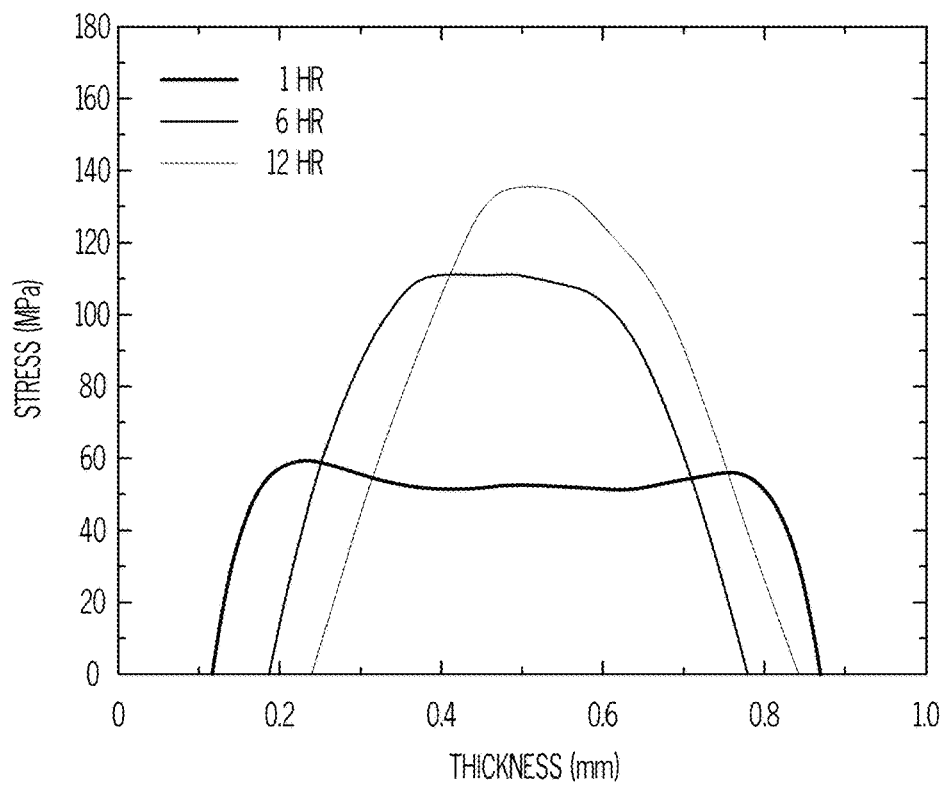

FIG. 9A to FIG. 9D are ion exchange profiles for a glass composition of Sample 7 in various ion exchange solutions. FIG. 9A is an ion exchange solution of 70 wt % $KNO_3$ and 30 wt % $NaNO_3$ at 420° C.; FIG. 9B is an ion exchange solution of 30 wt % $KNO_3$ and 70 wt % $NaNO_3$ at 420° C.; FIG. 9C is an ion exchange solution of 100 wt % $NaNO_3$ at 420° C.; and FIG. 9D is an ion exchange solution of 100 wt % $NaNO_3$ at 450° C. These ion exchange profiles show the effects of ion exchange solution type, ion exchange temperature, and ion exchange duration on stress profile in the glass. For example, after short ion exchange duration (e.g., 6 hours) at 420° C., Sample 7 treated in mixed salt bath (FIG. 9A and FIG. 9B) has relatively smaller positive area under stress profile than glass treated in 100% $NaNO_3$ (FIG. 9C). After the same ion exchange time duration, greater CT was obtained at higher ion exchange temperature (450° C., FIG. 9D) than CT for glass treated at lower temperature (420° C., FIG. 9C).

Figure 10:
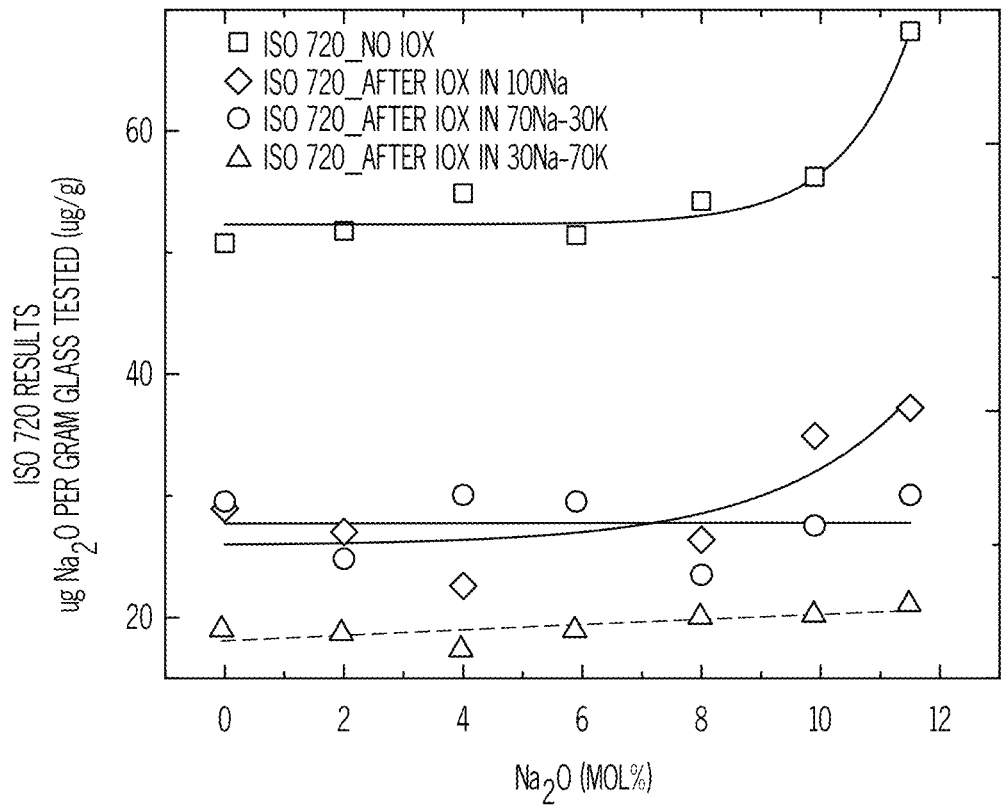
FIG. 10 is a plot of ISO 720 results versus $Na_2O$ mol % according to embodiments disclosed and described herein.
Figure 11A:
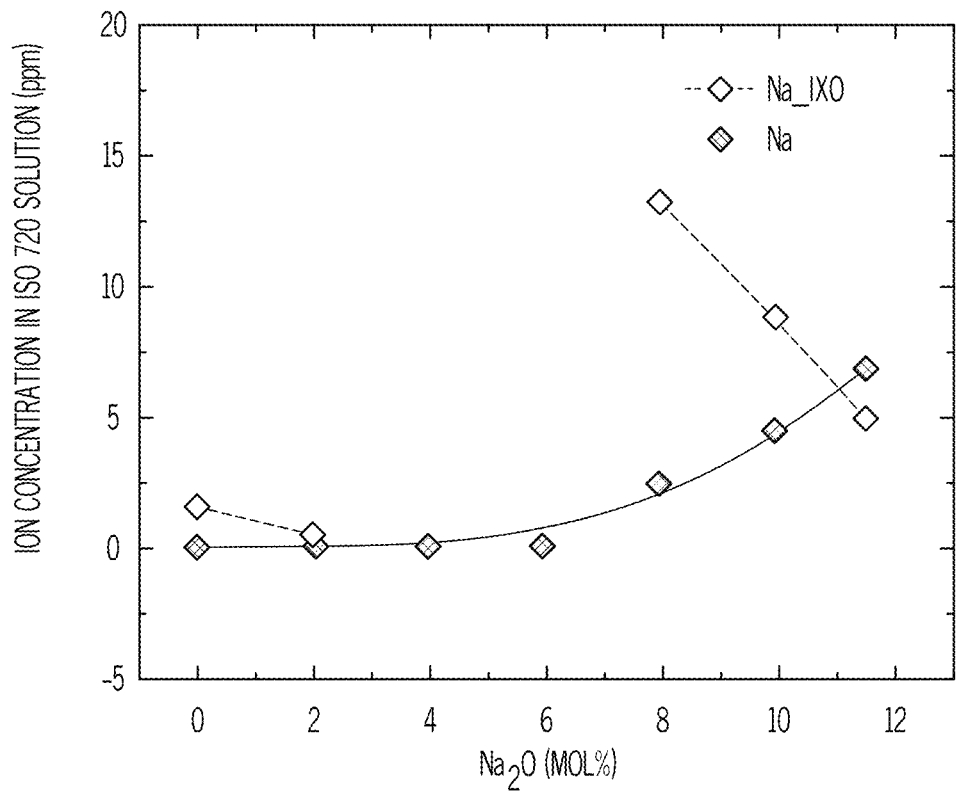
FIGS. 11A-11D are plots of ion concentration in ISO 720 solution versus $Na_2O$ mol % according to embodiments disclosed and described herein.

FIG. 10, which is a plot of ISO 720 results versus $Na_2O$ mol %, shows that the hydrolytic chemical durability (ISO 720) of Li-containing aluminosilicate glasses is greatly improved by the ion exchange process. The hydrolytic chemical durability of Comparative Sample 4 is improved from 68 µg/g (on the border line of class HGA1) to 37 µg/g by ion exchange, and the hydrolytic chemical durability of Li-containing glasses get down to below 30 µg/g. Thus, FIG. 10 shows that when $Li_2O$ is added beyond a certain amount, the advantages of adding $Li_2O$ diminish. FIG. 11A to FIG.

11D, which are plots of ion concentrations in ISO 720 solutions versus Na$_2$O mol %, show the ion concentration and normalized leach ion concentrations in ISO 720 solutions by ICP-MS analysis for glasses before and after ion exchange. After ion exchange, Li, Ca, and Al cations leached into solution are much less than glass as-made (FIG. 11B, FIG. 11C, and FIG. 11D).

Figure 11B:
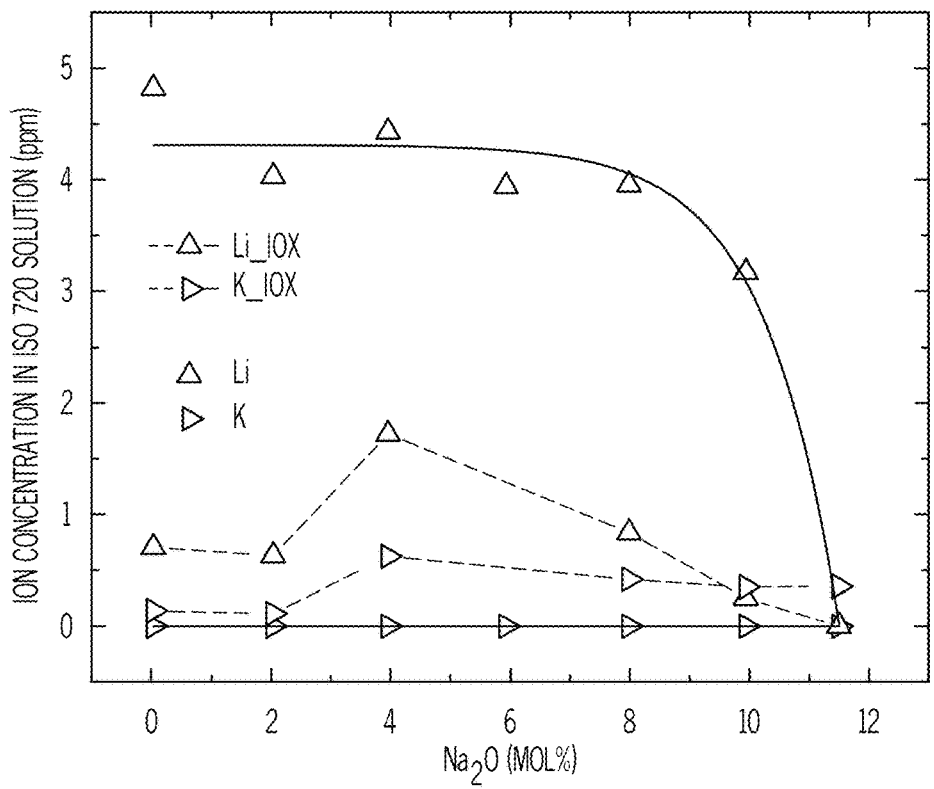
Figure 11C:
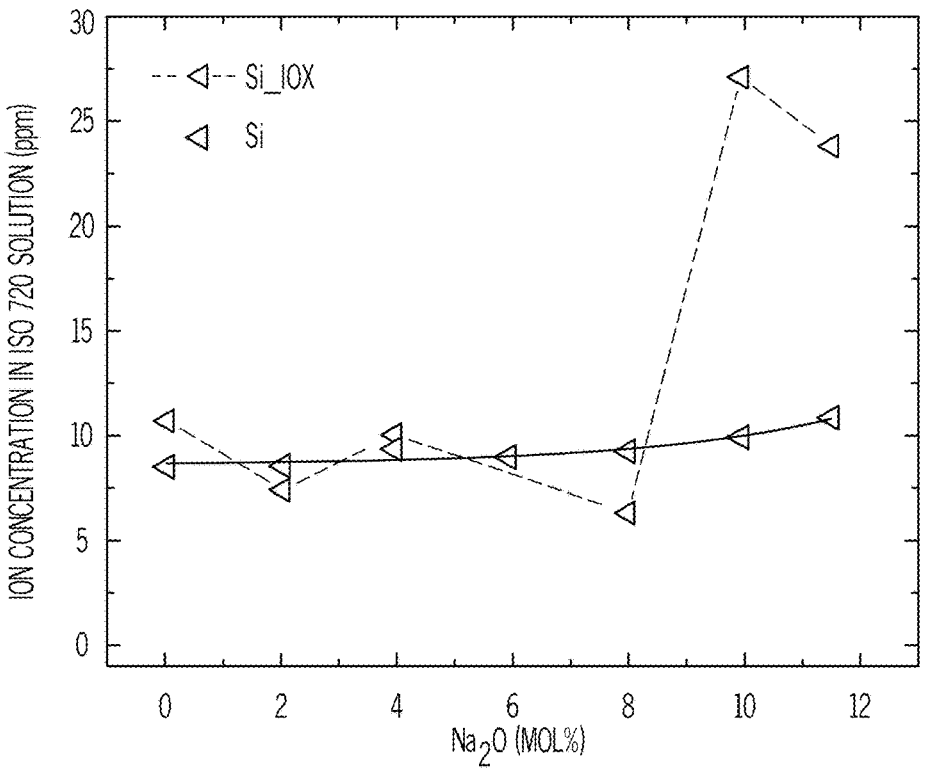
Figure 11D:
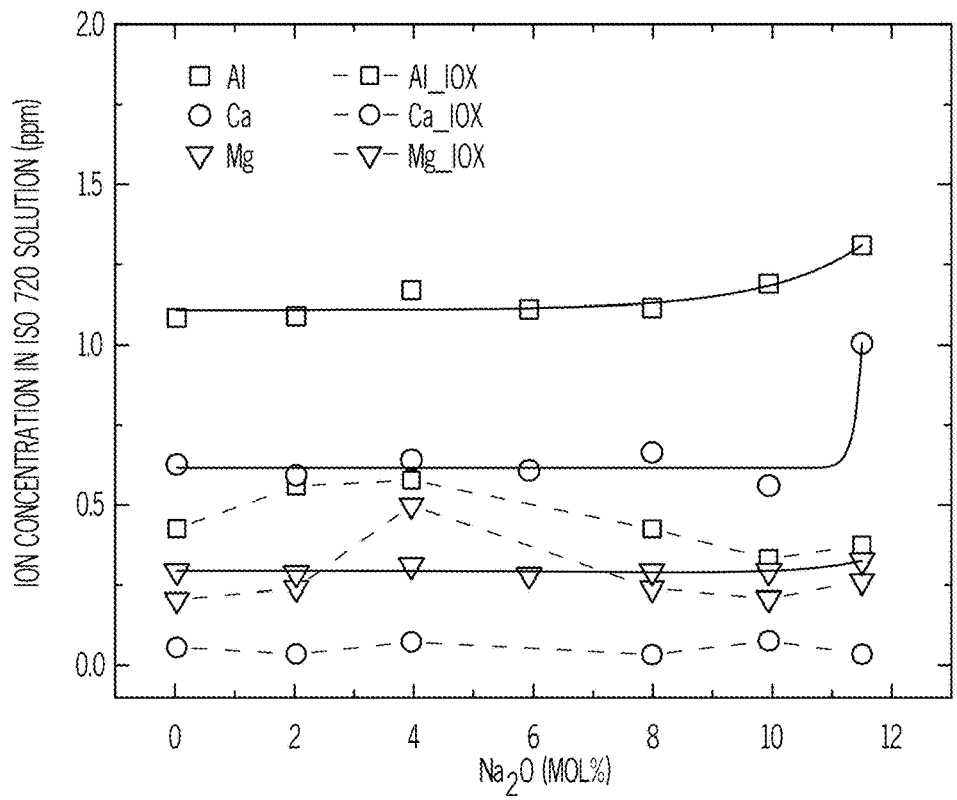

The ion exchange process greatly reduces the amount of Li, Ca, and Al cations leached out from glass into solution (as shown in FIG. 11B, FIG. 11C, and FIG. 11D). The structure on the glass surface is condensed after ion exchange through lithium exchanged for sodium or potassium, which reduces the overall dissolution rates of ions as well as glass, so the hydrolytic resistance of ion exchanged glasses is much better than that of the as-made glasses (FIG. 10).

Figure 12A:
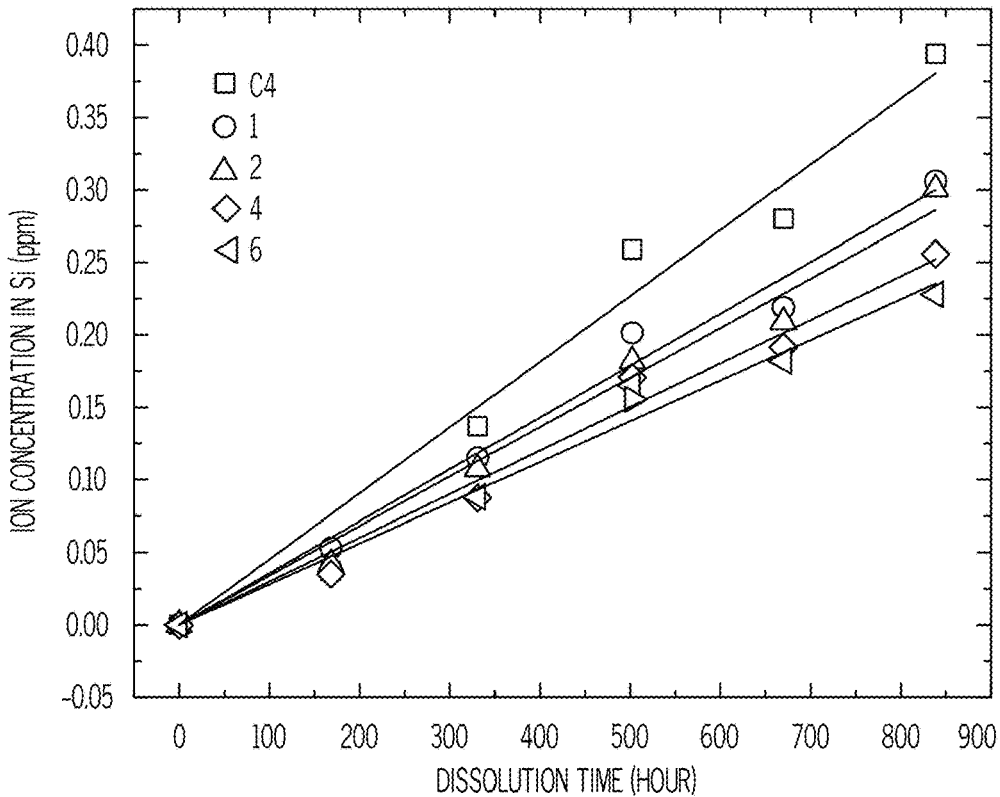
FIG. 12A is a plot of ion concentration of Si versus dissolution time according to embodiments disclosed and described herein.
Figure 12B:
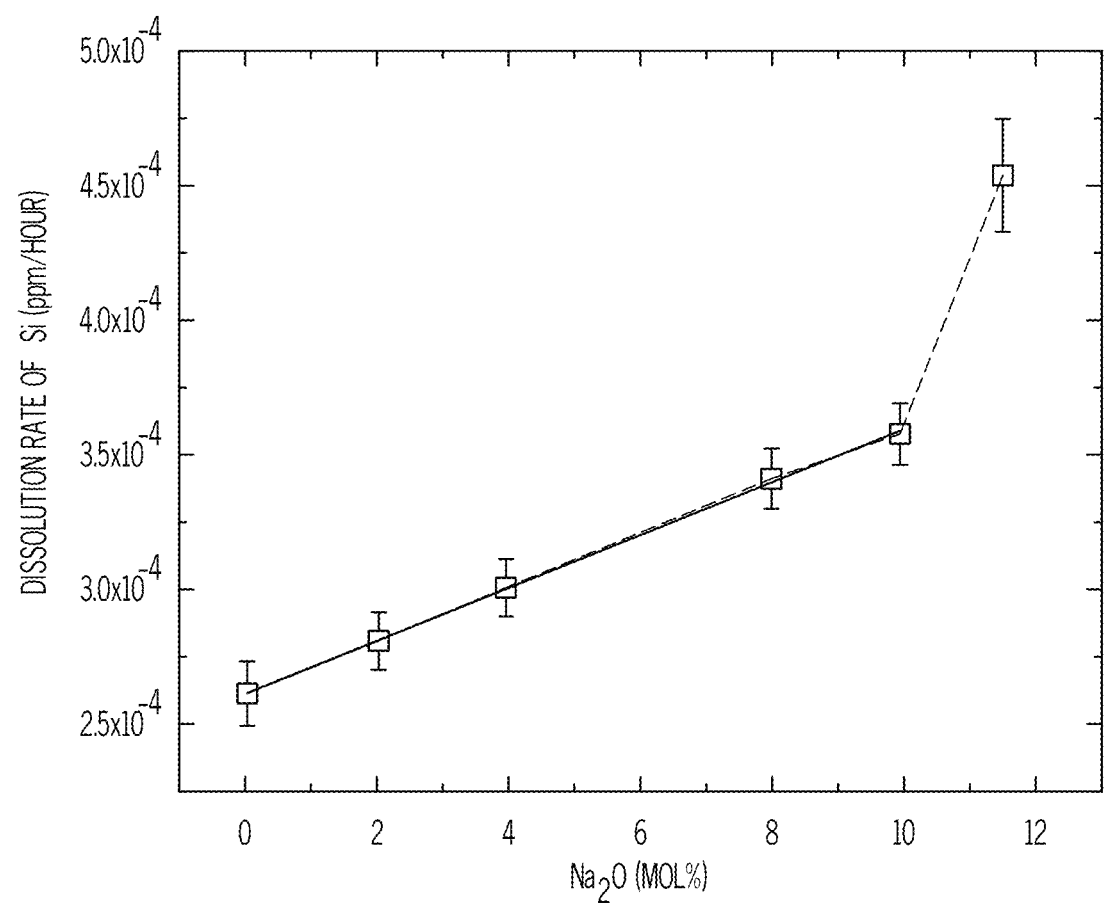
FIG. 12B is a plot of dissolution rate of $SiO_2$ versus $Na_2O$ mol % according to embodiments disclosed and described herein.

FIG. 12A and FIG. 12B, which are plots of ion concentrations versus dissolution time, shows one example of the dissolution kinetics study for glasses before ion exchange. Glasses having compositions of Samples 1-7 and Comparative Sample 4 with dimension of 25.47 mm×25.47 mm×1 mm were immersed in 200 ml DI H$_2$O at 95° C. for 5 weeks. At each time interval, 2 mL solutions were taken and analyzed by ICP-MS, then refilled with 2 mL DI water. FIG. 12A shows the Si concentration (ppm) measured by ICP-MS and linear fitted with $R_2 \geq 0.98$ for Samples C4, 1, 2, 4, and 6. FIG. 12B shows the dissolution rate of Si (ppm/hour) changed with glass composition (Na$_2$O mol %). The trend of dissolution rate of Si is consistent with the results of standard tests shown in FIG. 4A. For Comparative Sample 4 and Samples 1-7, the dissolution kinetics of glass network former (Si) shows linear time dependence. The dissolution rates of glass network former (Si) show linear composition dependence on Na$_2$O content for Samples 1, 2, 4, 6, and 7).

Example 2

Various glass samples as formed above in Example 1 were subjected to ion exchange to examine the diffusivity of potassium under various ion exchange conditions. TABLE 7 shows the glass sample, ion exchange solution used, and ion exchange temperature used for this example. The diffusivity of potassium at the various ion exchange conditions is also given in TABLE 7.

TABLE 7

| Sample | Salt Bath (wt %) | | Diffusivity (μm$^2$/hr) | | |
| --- | --- | --- | --- | --- | --- |
| | KNO$_3$ | NaNO$_3$ | 420° C. | 450° C. | 480° C. |
| 1 | 95 | 5 | 9.38 | | |
| 2 | 95 | 5 | 4.81 | | |
| 3 | 95 | 5 | 2.54 | | |
| 4 | 95 | 5 | 1.40 | | |
| 6 | 95 | 5 | 0.77 | | |
| C4 | 95 | 5 | 1.46 | | |
| 1 | 70 | 30 | 7.90 | | 33.85 |
| 2 | 70 | 30 | 3.86 | 8.28 | 19.49 |
| 3 | 70 | 30 | 2.10 | 4.65 | 11.86 |
| 4 | 70 | 30 | 1.48 | 2.82 | 8.15 |
| 6 | 70 | 30 | 0.68 | | 5.09 |
| C4 | 70 | 30 | 18.28 | | |
| 11 | 70 | 30 | 1.94 | 3.78 | 9.01 |
| 12 | 70 | 30 | | 2.68 | |
| 15 | 70 | 30 | 1.13 | 2.56 | 6.46 |
| 16 | 70 | 30 | 1.23 | 3.34 | |
| 21 | 70 | 30 | 2.63 | 5.91 | 13.51 |
| 1 | 50 | 50 | 6.78 | | |
| 2 | 50 | 50 | 3.45 | | |
| 3 | 50 | 50 | 2.06 | | |
| 4 | 50 | 50 | 1.13 | | |
| 6 | 50 | 50 | 0.66 | | |
| C4 | 50 | 50 | 15.80 | | |
| 1 | 30 | 70 | 5.52 | | |
| 2 | 30 | 70 | 2.65 | | |
| 3 | 30 | 70 | 1.46 | | |
| 4 | 30 | 70 | 0.86 | | |
| C4 | 30 | 70 | 12.84 | | |

Example 3

Figure 15:
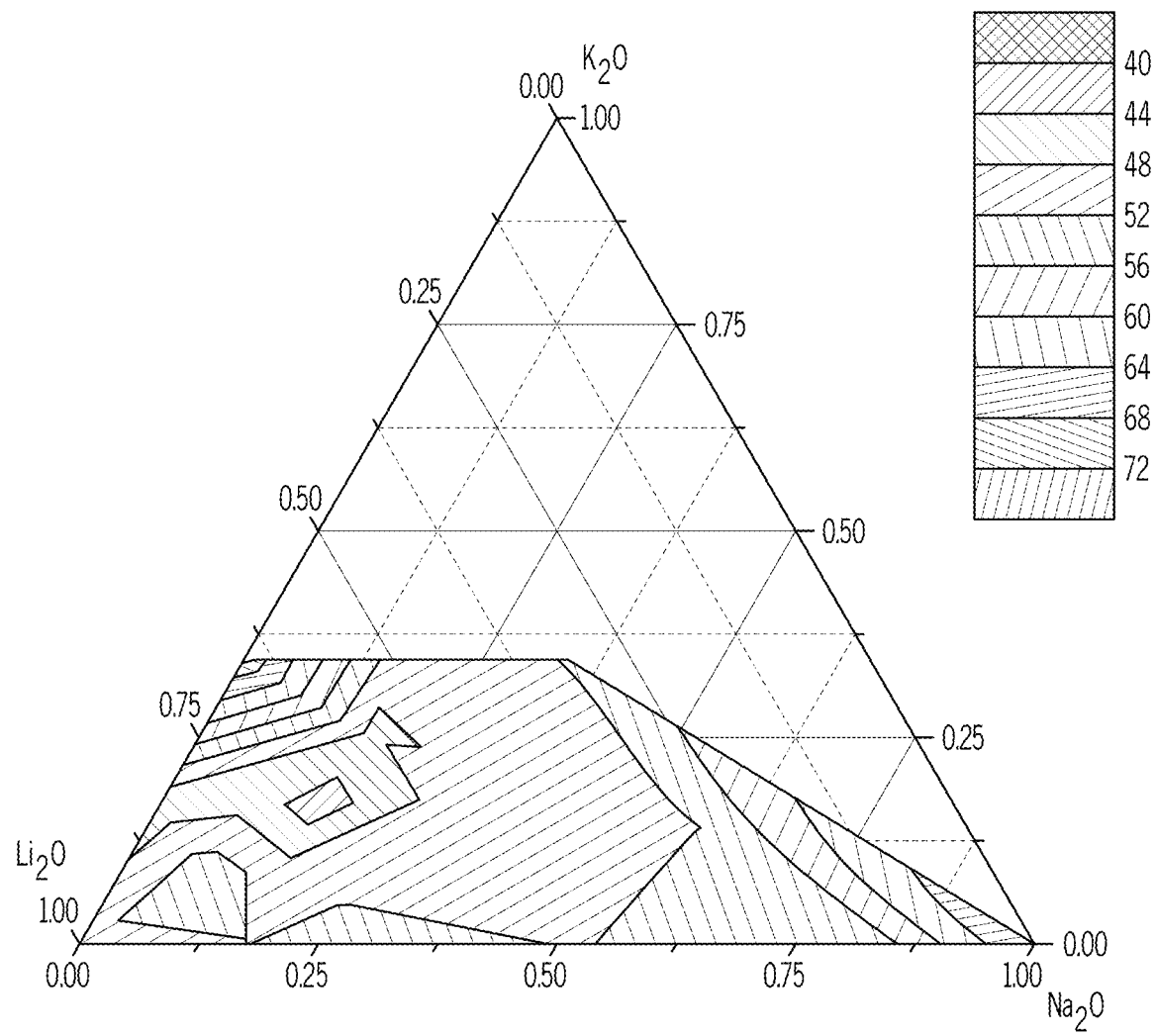
FIG. 15 is a triangular plot showing hydrolytic durability of glasses versus the distribution of alkali metals according to embodiments disclosed and described herein.
Figure 16:
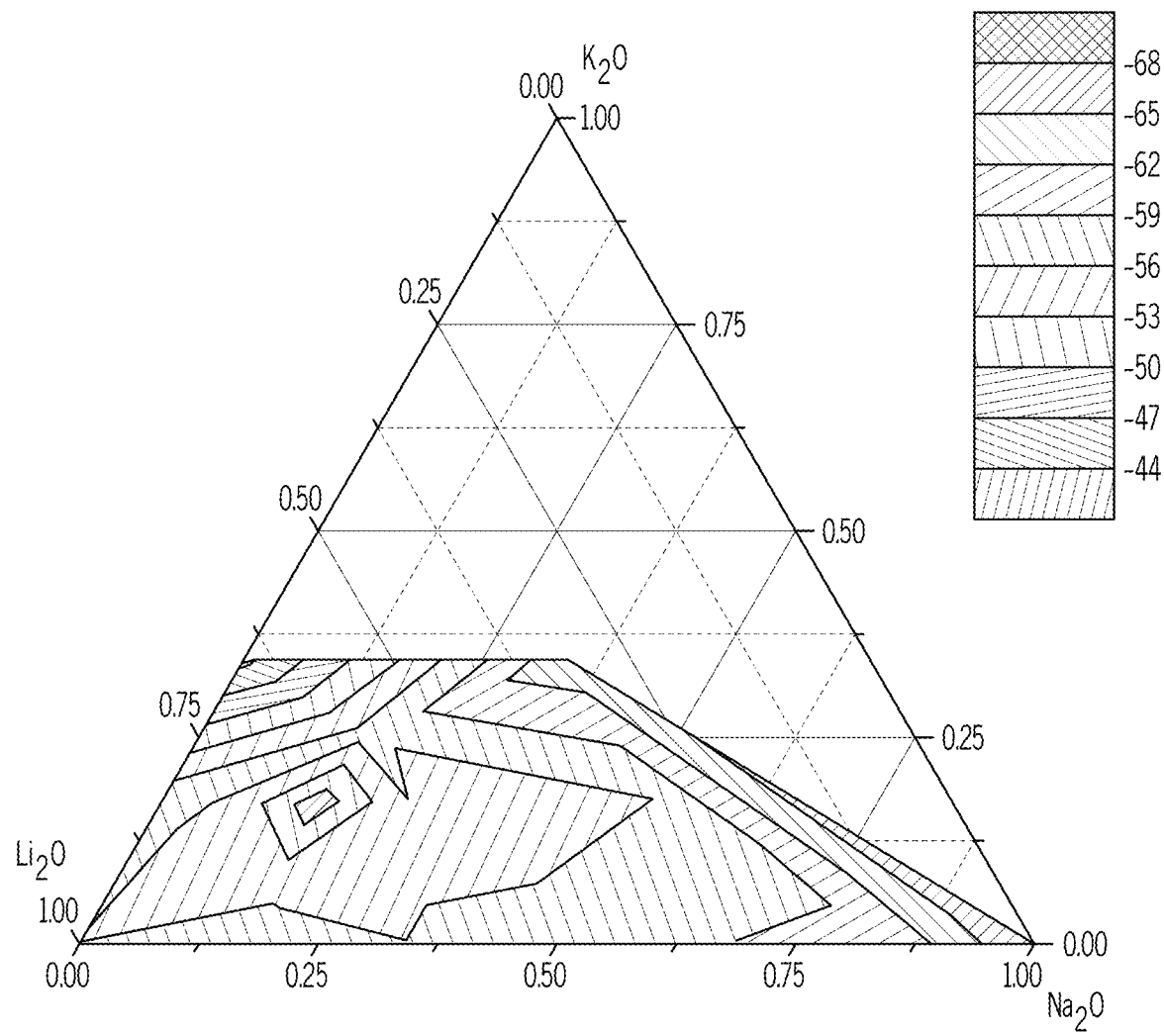
FIG. 16 is a triangular plot showing durability of glasses in a base versus the distribution of alkali metals according to embodiments disclosed and described herein.

The effect of alkali distribution on hydrolytic and basic durability in accordance with ISO 720 and ISO 695, respectively was determined for various samples of the glasses formed in accordance with Example 1. The samples used in this example all had a total alkali metal amount of 11.69 mol %. Within this total alkali metal content of 11.69 mol %, samples were selected where the amount of lithium relative to the total amount of alkali metal, the amount of sodium relative to the total amount of alkali metal, and the amount of potassium relative to the total amount of alkali metal was different. The hydrolytic and basic durability of the glass was measured for each of these samples. The results of the hydrolytic durability according to ISO 720 is shown in the triangular plot of FIG. 15, and the results of the basic chemical durability according to ISO 695 is shown in the triangular plot of FIG. 16. As shown in FIGS. 15 and 16, samples having about 66% lithium relative to the total amount of alkali metal, about 17% sodium relative to the total amount of alkali metal, and about 17% of potassium relative to the total amount of alkali metal showed the best durability in both water and base.

Example 4

Figure 13:
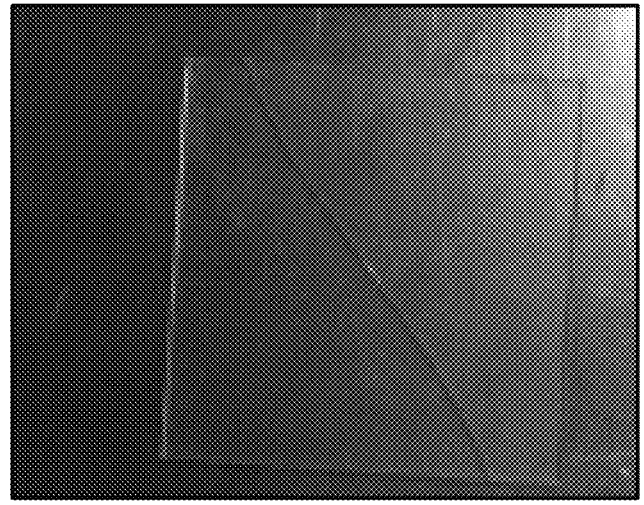
FIG. 13 is a picture of a 50×50×1.1 mm thick ion-exchanged part after a poke testing with a sharp WC tip according to embodiments disclosed and described herein.
Figure 14:
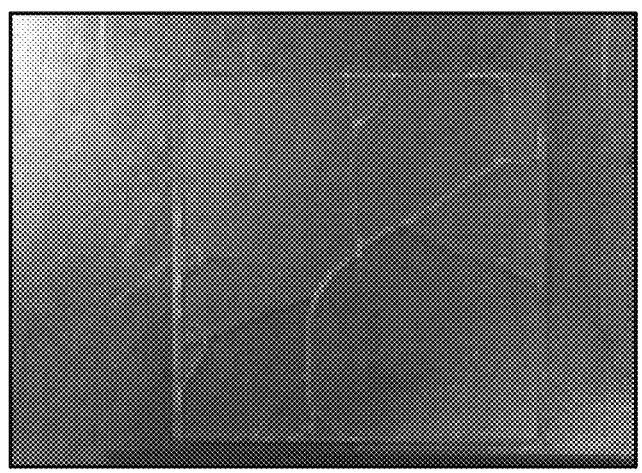
FIG. 14 is a picture of a 50×50×1.1 mm thick ion-exchanged part after a poke testing with a sharp WC tip according to embodiments disclosed and described herein.

A Li$_2$O containing glass was ion-exchanged in a mixed molten salt bath comprising 80% KNO$_3$ and 20% NaNO$_3$. FIG. 2 shows the SCALP data of the stress associated with sodium ion concentration. The ion exchange also yielded a 'spike' of compression at the surface of the glass, with a value of 675 MPa and a DOL$_k$ of 19 μm. The ability to provide a thin layer of high compression increases the load bearing capability of the part allowing it to perform better against random, high level, stress events that can occur on the manufacturing line. FIG. 13 shows a picture of a 50×50×1.1 mm thick part ion-exchanged using this particular schedule, after poke testing with a sharp WC tip. The part breaks into only 2 parts, consistent with the stored strain energy/area (SSE/area) of 13.9 J/m$^2$. The SSE/area can also be tuned to yield a more fragmented break pattern, as shown in FIG. 14. The stress profile parameters associated with this condition (23 hour ion exchange duration) are shown in TABLE 8 below.

TABLE 8

| Ion Exchange Duration (hrs) | CT (MPa) | SSE/area (J/m$^2$) | DOC (μm) | CS (MPa) | DOL$_k$ (μm) |
| --- | --- | --- | --- | --- | --- |
| 16 | 98.70 | 33.13 | 222 | 693.6 | 12.2 |
| 23 | 83.29 | 24.18 | 217 | 674.5 | 15.0 |
| 32 | 67.10 | 16.02 | 208 | 639.2 | 18.3 |

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass pharmaceutical package having a glass composition comprising:
   from greater than or equal to 68.00 mol % to less than or equal to 81.00 mol % $SiO_2$;
   from greater than or equal to 4.00 mol % to less than or equal to 11.00 mol % $Al_2O_3$;
   from greater than or equal to 0.10 mol % to less than or equal to 16.00 mol % $Li_2O$;
   from greater than or equal to 0.10 mol % to less than or equal to 12.00 mol % $Na_2O$;
   from greater than or equal to 0.00 mol % to less than or equal to 5.00 mol % $K_2O$;
   from greater than or equal to 0.10 mol % to less than or equal to 8.00 mol % MgO;
   from greater than or equal to 0.10 mol % to less than or equal to 5.00 mol % CaO;
   from greater than or equal to 0.00 mol % to less than or equal to 0.20 mol % fining agent, wherein
   the glass pharmaceutical package is delamination resistant,
   the glass pharmaceutical package has class 1 or class 2 chemical durability in acid, base, and water,
   the amount of $Li_2O$ relative to the total alkali metal content is from greater than or equal to 60% to less than or equal to 70%, and
   the amount of $Na_2O$ to the total alkali metal content is from greater than or equal to 12% to less than or equal to 22%.

2. The glass pharmaceutical package according to claim 1, wherein the glass composition comprises greater than 0.00 mol % of the fining agent, and the fining agent is selected from the group consisting of $SnO_2$, $CeO_2$, $As_2O_3$, $Sb_2O_3$, $Cl^-$, $S^-$, $F^-$, or $Fe_2O_3$.

3. The glass pharmaceutical package according to claim 2, wherein the fining agent consists of $SnO_2$.

4. The glass pharmaceutical package according to claim 1, wherein the glass pharmaceutical package is substantially free of at least one of $B_2O_3$, SrO, BaO, $ZrO_2$.

5. The glass pharmaceutical package according to claim 1, wherein the glass pharmaceutical package is substantially free of $B_2O_3$, SrO, BaO, and $ZrO_2$.

6. The glass pharmaceutical package according to claim 1, wherein the glass pharmaceutical package comprises from greater than or equal to 1.50 mol % to less than or equal to 16.00 mol % $Li_2O$.

7. The glass pharmaceutical package according to claim 1, wherein the glass pharmaceutical package comprises from greater than or equal to 0.10 mol % to less than or equal to 7.50 mol % MgO.

8. The glass pharmaceutical package according to claim 1, wherein the glass pharmaceutical package comprises a ratio of $(Li_2O+Na_2O+K_2O)/(SiO_2+Al_2O_3)$ that is from greater than or equal to 0.05 to less than or equal to 0.50.

9. The glass pharmaceutical package according to claim 1, wherein the glass pharmaceutical package comprises a ratio of $(Li_2O+Na_2O+K_2O)/(SiO_2+Al_2O_3)$ that is from greater than or equal to 0.05 to less than or equal to 0.15.

10. The glass pharmaceutical package according to claim 1, wherein the glass pharmaceutical package comprises a density from greater than or equal to 2.25 g/cm³ to less than or equal to 2.50 g/cm³.

11. The glass pharmaceutical package according to claim 1, wherein the glass pharmaceutical package comprises a molar volume from greater than or equal to 24.00 cm³/mol to less than or equal to 27.00 cm³/mol.

12. The glass pharmaceutical package according to claim 1, wherein the glass pharmaceutical package has a delamination factor less than or equal to 10.

13. The glass pharmaceutical package according to claim 1, wherein the glass pharmaceutical package comprises a strain point from greater than or equal to 450° C. to less than or equal to 625° C.

14. The glass pharmaceutical package according to claim 1, wherein the glass pharmaceutical package comprises an annealing point from greater than or equal to 500° C. to less than or equal to 675° C.

15. The glass pharmaceutical package according to claim 1, wherein the glass pharmaceutical package comprises a softening point from greater than or equal to 750° C. to less than or equal to 950° C.

16. The glass pharmaceutical package according to claim 1, wherein the glass pharmaceutical package comprises a coefficient of thermal explanation (CTE) from greater than or equal to 4.20 ppm/° C. to less than or equal to 7.00 ppm/° C.

17. The glass pharmaceutical package according to claim 1, wherein the glass pharmaceutical package comprises a Log of liquidus viscosity from greater than or equal to 3.50 poise to less than or equal to 6.00 poise.

18. The glass pharmaceutical package according to claim 1, wherein the glass pharmaceutical package comprises a Young's modulus from greater than or equal to 10.00 mpsi to less than or equal to 12.00 mpsi.

19. The glass pharmaceutical package according to claim 1, wherein the glass pharmaceutical package comprises a shear modulus from greater than or equal to 4.00 mpsi to less than or equal to 5.00 mpsi.

20. The glass pharmaceutical package according to claim 1, wherein the glass pharmaceutical package comprises a chemical durability in acid as measured by DIN 12116 from greater than or equal to 0.0 mg/dm² to less than or equal to 1.5 mg/dm².

21. The glass pharmaceutical package according to claim 1, wherein the glass pharmaceutical package comprises a chemical durability in acid as measured by DIN 12116 from greater than or equal to 0.0 mg/dm² to less than or equal to 0.7 mg/dm².

22. The glass pharmaceutical package according to claim 1, wherein the glass pharmaceutical package comprises a chemical durability in base as measured by ISO 695 from greater than or equal to 0 mg/dm² to less than or equal to 175 mg/dm².

23. The glass pharmaceutical package according to claim 1, wherein the glass pharmaceutical package comprises a chemical durability in base as measured by ISO 695 from greater than or equal to 0 mg/dm² to less than or equal to 75 mg/dm².

24. The glass pharmaceutical package according to claim 1, wherein the glass pharmaceutical package comprises a chemical durability in water as measured by ISO 720 from greater than or equal to 0 μg/g to less than or equal to 100 μg/g.

25. The glass pharmaceutical package according to claim 1, wherein the glass pharmaceutical package comprises a chemical durability in water as measured by ISO 720 from greater than or equal to 0 μg/g to less than or equal to 62 μg/g.

26. The glass pharmaceutical package according to claim 1, wherein the glass pharmaceutical package is strengthened by ion exchange and comprises a surface compressive stress of at least 350 MPa.

27. The glass pharmaceutical package according to claim 1, wherein the glass pharmaceutical package is strengthened by ion exchange and comprises a depth of compression from greater than or equal to 0.05t to less than or equal to 0.25t.

28. The glass pharmaceutical package according to claim 1, wherein the glass pharmaceutical package is strengthened by ion exchange and comprises a central tension from greater than or equal to 5 MPa to less than or equal to 160 MPa.

29. The glass pharmaceutical package according to claim 1, wherein the glass pharmaceutical package comprises a diffusivity of potassium ions at 420° C. is from greater than or equal to 0.50 μm$^2$/hr to less than or equal to 15.00 μm$^2$/hr.

30. The glass pharmaceutical package according to claim 1, wherein the glass pharmaceutical package is strengthened by ion exchange and comprises a stored energy of less than or equal to about 15.00 J/m$^2$.

31. The glass pharmaceutical package according to claim 1, wherein the glass pharmaceutical package is strengthened by ion exchange and comprises a stored energy of greater than or equal to 17.00 J/m$^2$.

32. A glass pharmaceutical package having a glass composition comprising:
    from greater than or equal to 68.00 mol % to less than or equal to 81.00 mol % $SiO_2$;
    from greater than or equal to 6.10 mol % to less than or equal to 7.00 mol % $Al_2O_3$;
    from greater than or equal to 3.10 mol % to less than or equal to 6.60 mol % $Li_2O$;
    from greater than or equal to 1.40 mol % to less than or equal to 3.00 mol % $Na_2O$;
    from greater than or equal to 0.00 mol % to less than or equal to 5.00 mol % $K_2O$;
    from greater than or equal to 5.10 mol % to less than or equal to 7.50 mol % MgO;
    from greater than or equal to 0.10 mol % to less than or equal to 5.00 mol % CaO;
    from greater than or equal to 0.00 mol % to less than or equal to 0.20 mol % fining agent, wherein
    the glass pharmaceutical package is delamination resistant,
    the glass pharmaceutical package has class 1 or class 2 chemical durability in acid, base, and water,
    the glass pharmaceutical package is substantially free of 8203, SrO, BaO, and $ZrO_2$,
    the amount of $Li_2O$ relative to the total alkali metal content is from greater than or equal to 60% to less than or equal to 70%, and
    the amount of $Na_2O$ to the total alkali metal content is from greater than or equal to 12% to less than or equal to 22%.

33. The glass pharmaceutical package according to claim 32, wherein the glass composition comprises greater than 0.00 mol % of the fining agent, and the fining agent is selected from the group consisting of $SnO_2$, $CeO_2$, $As_2O_3$, $Sb_2O_3$, $Cl^-$, $S^-$, $F^-$, or $Fe_2O_3$.

34. The glass pharmaceutical package according to claim 33, wherein the fining agent consists of $SnO_2$.

35. The glass pharmaceutical package according to claim 32, wherein the glass pharmaceutical package comprises a ratio of $(Li_2O+Na_2O+K_2O)/(SiO_2+Al_2O_3)$ that is greater than or equal to 0.05 to less than or equal to 0.50.

36. The glass pharmaceutical package according to claim 32, wherein the glass pharmaceutical package a ratio of $(Li_2O+Na_2O+K_2O)/(SiO_2+Al_2O_3)$ that is greater than or equal to 0.05 to less than or equal to 0.15.

37. The glass pharmaceutical package according to claim 32, wherein the glass pharmaceutical package comprises a density from greater than or equal to 2.25 g/cm$^3$ to less than or equal to 2.50 g/cm$^3$.

38. The glass pharmaceutical package according to claim 32, wherein the glass pharmaceutical package comprises a molar volume from greater than or equal to 24.00 cm$^3$/mol to less than or equal to 27.00 cm$^3$/mol.

39. The glass pharmaceutical package according to claim 32, wherein the glass pharmaceutical package has a delamination factor less than or equal to 10.

40. The glass pharmaceutical package according to claim 32, wherein the glass pharmaceutical package comprises a strain point from greater than or equal to 450° C. to less than or equal to 625° C.

41. The glass pharmaceutical package according to claim 32, wherein the glass pharmaceutical package comprises an annealing point from greater than or equal to 500° C. to less than or equal to 675° C.

42. The glass pharmaceutical package according to claim 32, wherein the glass pharmaceutical package comprises a softening point from greater than or equal to 750° C. to less than or equal to 950° C.

43. The glass pharmaceutical package according to claim 32, wherein the glass pharmaceutical package comprises a coefficient of thermal expansion (CTE) from greater than or equal to 4.20 ppm/° C. to less than or equal to 7.00 ppm/° C.

44. The glass pharmaceutical package according to claim 32, wherein the glass pharmaceutical package comprises a Log of liquidus viscosity from greater than or equal to 3.50 poise to less than or equal to 6.00 poise.

45. The glass pharmaceutical package according to claim 32, wherein the glass pharmaceutical package comprises a Young's modulus from greater than or equal to 10.00 mpsi to less than or equal to 12.00 mpsi.

46. The glass pharmaceutical package according to claim 32, wherein the glass pharmaceutical package comprises a shear modulus from greater than or equal to 4.00 mpsi to less than or equal to 5.00 mpsi.

47. The glass pharmaceutical package according to claim 32, wherein the glass pharmaceutical package comprises a chemical durability in acid as measured by DIN 12116 from greater than or equal to 0.0 mg/dm$^2$ to less than or equal to 1.5 mg/dm$^2$.

48. The glass pharmaceutical package according to claim 32, wherein the glass pharmaceutical package comprises a chemical durability in acid as measured by DIN 12116 from greater than or equal to 0.0 mg/dm$^2$ to less than or equal to 0.7 mg/dm$^2$.

49. The glass pharmaceutical package according to claim 32, wherein the glass pharmaceutical package comprises a chemical durability in base as measured by ISO 695 from greater than or equal to 0 mg/dm$^2$ to less than or equal to 175 mg/dm$^2$.

50. The glass pharmaceutical package according to claim 32, wherein the glass pharmaceutical package comprises a chemical durability in base as measured by ISO 695 from greater than or equal to 0 mg/dm$^2$ to less than or equal to 75 mg/dm$^2$.

51. The glass pharmaceutical package according to claim 32, wherein the glass pharmaceutical package comprises a chemical durability in water as measured by ISO 720 from greater than or equal to 0 µg/g to less than or equal to 100 µg/g.

52. The glass pharmaceutical package according to claim 32, wherein the glass pharmaceutical package comprises a chemical durability in water as measured by ISO 720 from greater than or equal to 0 µg/g to less than or equal to 62 µg/g.

53. The glass pharmaceutical package according to claim 32, wherein the glass pharmaceutical package is strengthened by ion exchange and comprises a surface compressive stress of at least 350 MPa.

54. The glass pharmaceutical package according to claim 32, wherein the glass pharmaceutical package comprises is strengthened by ion exchange and a depth of compression from greater than or equal to 0.05t to 0.25t.

55. The glass pharmaceutical package according to claim 32, wherein the glass pharmaceutical package is strengthened by ion exchange and comprises a central tension from greater than or equal to 5 MPa to less than or equal to 160 MPa.

56. The glass pharmaceutical package according to claim 32, wherein the glass pharmaceutical package comprises a diffusivity of potassium ions at 420° C. is from greater than or equal to 0.50 $\mu m^2$/hr to less than or equal to 15.00 $\mu m^2$/hr.

57. The glass pharmaceutical package according to claim 32, wherein the glass pharmaceutical package is strengthened by ion exchange and comprises a stored energy of less than or equal to about 15.00 $J/m^2$.

58. The glass pharmaceutical package according to claim 32, wherein the glass pharmaceutical package is strengthened by ion exchange and comprises a stored energy of greater than or equal to 17.00 $J/m^2$.

* * * * *

UNITED STATES PATENT AND TRADEMARK OFFICE
CERTIFICATE OF CORRECTION

PATENT NO. : 10,640,415 B2
APPLICATION NO. : 15/825793
DATED : May 5, 2020
INVENTOR(S) : Steven Edward DeMartino et al.

Page 1 of 1

It is certified that error appears in the above-identified patent and that said Letters Patent is hereby corrected as shown below:

In the Claims

In Column 45, Line 52, Claim 32, delete "8203," and insert -- $B_2O_3$, --, therefor.

Signed and Sealed this
First Day of September, 2020

Andrei Iancu
*Director of the United States Patent and Trademark Office*